(12) United States Patent
Sakai

(10) Patent No.: US 9,104,037 B2
(45) Date of Patent: *Aug. 11, 2015

(54) LIQUID CRYSTAL DISPLAY DEVICE

(75) Inventor: Akira Sakai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 406 days.

This patent is subject to a terminal disclaimer.

(21) Appl. No.: 13/387,194

(22) PCT Filed: Mar. 18, 2010

(86) PCT No.: PCT/JP2010/054697
§ 371 (c)(1),
(2), (4) Date: Jan. 26, 2012

(87) PCT Pub. No.: WO2011/013399
PCT Pub. Date: Feb. 3, 2011

(65) Prior Publication Data
US 2012/0120349 A1 May 17, 2012

(30) Foreign Application Priority Data
Jul. 30, 2009 (JP) .................. 2009-178238

(51) Int. Cl.
*G02F 1/13363* (2006.01)
*G02F 1/1335* (2006.01)
(Continued)

(52) U.S. Cl.
CPC ........ *G02B 27/286* (2013.01); *G02F 1/133634* (2013.01); *G02F 1/133502* (2013.01);
(Continued)

(58) Field of Classification Search
CPC .......................................... G02F 2001/133638
USPC ......................................................... 349/102
See application file for complete search history.

(56) References Cited

U.S. PATENT DOCUMENTS 6,922,222 B2  7/2005  Miyachi et al.
7,215,839 B2  5/2007  Kawahara et al.
(Continued)

FOREIGN PATENT DOCUMENTS

CN    101042442 A    9/2007
JP    2002-040428   2/2002
(Continued)

OTHER PUBLICATIONS
International Search Report for PCT/JP2010/054697, mailed Jun. 15, 2010.
(Continued)

*Primary Examiner* — Edward Glick
*Assistant Examiner* — Alexander Gross
(74) *Attorney, Agent, or Firm* — Nixon & Vanderhye P.C.

(57) ABSTRACT

The present invention provides a circularly polarizing VA mode liquid crystal display device having an excellent gray scale viewing angle from an intermediate gray scale to a high gray scale at an azimuth angle of 45°. The liquid crystal display device according to the present invention includes: a first polarizer; a first λ/4 plate; liquid crystal cell; a second λ/4 plate; and a second polarizer in this order, wherein when an azimuth of an absorption axis of the second polarizer is defined as 0°, an in-plane slow axis of the second λ/4 plate forms an angle of approximately 45°; an in-plane slow axis of the first λ/4 plate forms an angle of approximately 135°; the absorption axis of the first polarizer forms an angle of approximately 90°, and wherein a display brightness is varied by changing an alignment state of liquid crystal molecules in a liquid crystal layer from a state that the liquid crystal molecules are approximately vertically aligned to a substrate surface, to a state that the liquid crystal molecules are tilted to the substrate surface; and the liquid crystal layer has a domain in which the liquid crystal molecules are tilted in an azimuth angle range of 12.5° to 32.5°, a domain in which the liquid crystal molecules are tilted in an azimuth angle range of 102.5° to 122.5°, and a domain in which the liquid crystal molecules are tilted in an azimuth angle range of 192.5° to 212.5°, and a domain in which the liquid crystal molecules are tilted in an azimuth angle range of 282.5° to 302.5°.

19 Claims, 21 Drawing Sheets

(51) Int. Cl.
  *G02F 1/1337* (2006.01)
  *G02B 27/28* (2006.01)
(52) U.S. Cl.
  CPC ............... *G02F2001/133541* (2013.01); *G02F 2001/133638* (2013.01); *G02F 2001/133742* (2013.01); *G02F 2001/133757* (2013.01); *G02F 2413/02* (2013.01); *G02F 2413/03* (2013.01); *G02F 2413/08* (2013.01)

(56) References Cited

U.S. PATENT DOCUMENTS

| | | | |
|---|---|---|---|
| 7,643,117 B2 | 1/2010 | Iida et al. | |
| 7,961,276 B2 | 6/2011 | Matsushima et al. | |
| 8,194,212 B2 | 6/2012 | Sakai | |
| 8,314,908 B2* | 11/2012 | Sakai | 349/119 |
| 8,416,377 B2* | 4/2013 | Sakai | 349/117 |
| 8,488,091 B2* | 7/2013 | Sakai | 349/118 |
| 2001/0048497 A1* | 12/2001 | Miyachi et al. | 349/117 |
| 2002/0044351 A1 | 4/2002 | Nilsen | |
| 2002/0047968 A1* | 4/2002 | Yoshida et al. | 349/117 |
| 2003/0071952 A1 | 4/2003 | Yoshida | |
| 2004/0100607 A1* | 5/2004 | Kawata et al. | 349/141 |
| 2005/0185124 A1 | 8/2005 | Kadoya | |
| 2005/0225706 A1 | 10/2005 | Miyachi | |
| 2006/0203162 A1* | 9/2006 | Ito et al. | 349/117 |
| 2007/0076152 A1 | 4/2007 | Ito | |
| 2007/0159585 A1 | 7/2007 | Yoshida et al. | |
| 2007/0188686 A1* | 8/2007 | Yano et al. | 349/119 |
| 2007/0216997 A1 | 9/2007 | Noguchi et al. | |
| 2007/0284991 A1* | 12/2007 | Egi et al. | 313/479 |
| 2008/0049178 A1 | 2/2008 | Kisara et al. | |
| 2009/0059145 A1 | 3/2009 | Nishioka et al. | |
| 2009/0096970 A1 | 4/2009 | Sakai | |
| 2009/0169822 A1 | 7/2009 | Chen et al. | |
| 2009/0213313 A1 | 8/2009 | Iwamoto | |
| 2009/0225263 A1 | 9/2009 | Miyachi | |
| 2010/0289988 A1 | 11/2010 | Sakai et al. | |
| 2011/0025966 A1 | 2/2011 | Sakai | |
| 2011/0181814 A1 | 7/2011 | Sakai | |

FOREIGN PATENT DOCUMENTS

| | | |
|---|---|---|
| JP | 2002-055342 | 2/2002 |
| JP | 2003-186017 | 7/2003 |
| JP | 2003-207782 | 7/2003 |
| JP | 2003-302532 A | 10/2003 |
| JP | 2005-099467 A | 4/2005 |
| JP | 2006-251050 | 9/2006 |
| JP | 2007-101874 | 4/2007 |
| JP | 2008-46003 | 6/2008 |
| JP | 2009-037049 | 2/2009 |
| JP | 2009-075555 | 4/2009 |
| WO | 2008/001582 | 1/2008 |

OTHER PUBLICATIONS

Ge, Z. et al., "Wide-View Circular Polarizers for Mobile Liquid Crystal Displays", IDRC08, (2008), pp. 266-268.
International Search Report for PCT/JP2010/053351, mailed Jun. 15, 2010.
U.S. Office Action mailed May 31, 2011 in parent U.S. Appl. No. 12/936,471.
U.S. Office Action mailed Jul. 21, 2011 in U.S. Appl. No. 12/936,471.
Hiroshi, "Kessyo Kogaku", Morikita Publishing Co., Ltd., 1975, pp. 146-163 (including partial translation).
Notice of Allowance mailed Nov. 14, 2011 in U.S. Appl. No. 12/936,471.
Restriction Requirement issued in U.S. Appl. No. 13/360,070 dated Jun. 13, 2012.
Supplementary European Search Report issued in Application No. EP 09 83 9247 dated Jun. 5, 2012.
Hong, et al., Extraordinarily High-Contrast and Wide-View Liquid Crystal Displays, Applied Physics Letters, AIP, American Institute of Physics, vol. 86, No. 12, Mar. 15, 2005, pp. 12107-1 through 12107-3.
International Search Report for PCT/JP2009/067660, mailed Dec. 15, 2009.
International Search Report for PCT/JP2009/054451, mailed Dec. 15, 2009.
Office Action mailed Jan. 10, 2013 in U.S. Appl. No. 13/120,043.
Notice of Allowance mailed Apr. 23, 2013 in U.S. Appl. No. 13/120,043.
Office Action mailed Oct. 19, 2012 in U.S. Appl. No. 13/064,580.
Notice of Allowance mailed Feb. 6, 2013 in U.S. Appl. No. 13/064,580.
Notice of Allowance mailed Jul. 30, 2012 in U.S. Appl. No. 13/360,070.

* cited by examiner (a)

(b)

(c)

(a) Ambient light (b)

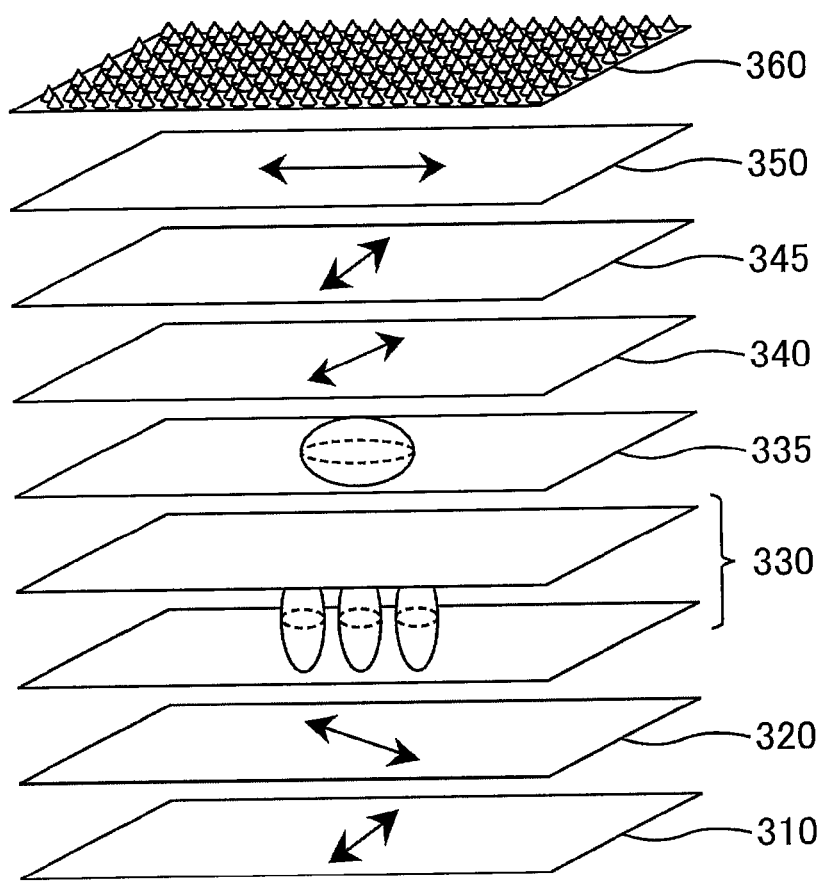

LIQUID CRYSTAL DISPLAY DEVICE

This application is the U.S. national phase of International Application No. PCT/JP2010/054697, filed 18 Mar. 2010, which designated the U.S. and claims priority to JP Application No. 2009-178238, filed 30 Jul. 2009, the entire contents of each of which are hereby incorporated by reference.

TECHNICAL FIELD

The present invention relates to a liquid crystal display device, and more specifically to a VA (vertical alignment) mode liquid crystal display device using a circularly polarizing plate.

BACKGROUND ART

A liquid crystal display device is widely used as a display device of various information processing apparatuses such as a computer and a television set. Particularly, the liquid crystal display device of a TFT system (also called "TFT-LCD" hereafter) is widely spread, and expansion of a further market thereof is expected, and with expansion of the market, further improvement of an image quality is desired. The TFT-LCD is taken as an example for explanation hereafter. However, the present invention is not limited to the TFT-LCD, but covers the whole field of the liquid crystal display device, and can be applied to the liquid crystal display device of a passive matrix system and a plasma address system for example.

A so-called TN (twisted nematic) mode is a display mode that has been most widely used in the TFT-LCD heretofore, in which a liquid crystal having positive dielectric anisotropy is horizontally aligned between mutually opposing substrates. A TN mode liquid crystal display device is characterized in that a direction of an alignment of liquid crystal molecules adjoining one of the substrates is twisted by 90° with respect to a direction of an alignment of liquid crystal molecules adjoining the other substrate. In such a TN mode liquid crystal display device, although an inexpensive manufacturing technique is established and industrially full growth is achieved, it is difficult to realize a high contrast ratio.

Meanwhile, a so-called VA mode liquid crystal display device is known, in which liquid crystals having negative dielectric anisotropy are vertically aligned between the mutually opposing substrates. In the VA mode liquid crystal display device, liquid crystal molecules are aligned approximately vertically to a substrate surface, when not applying a voltage. Therefore, almost no rotatory polarization and birefringence are exhibited by the liquid crystal cells, thus allowing lights to pass through the liquid crystal cells with almost no change in its polarization state. Accordingly, approximately perfect black display can be realized when not applying the voltage, by arranging a pair of polarizers (linear polarizers) on upper and lower sides of the liquid crystal cells so that absorption axes thereof are crossing each other orthogonally (also called "crossed Nicols polarizers" hereafter). When applying the voltage of a threshold value or more (abbreviated as "at a voltage application time" hereafter), the liquid crystal molecules are tilted so as to be approximately parallel to the substrate, thus exhibiting a great birefringence and realizing a white display. Accordingly, such a VA mode liquid crystal display device can easily realize a significantly high contrast ratio.

In such a VA mode liquid crystal display device, asymmetry (skewness) is generated in a viewing angle characteristic of the liquid crystal display device, if the liquid crystal molecules are tilted in one direction at the voltage application time. Therefore, an domain division type VA mode is widely used, in which an tilt direction of the liquid crystal molecules is divided into a plurality of directions in a pixel, for example by devising a structure of a pixel electrode, or by providing an alignment control part such as protrusions in the pixel. Note that each region with different tilt azimuths of the liquid crystal molecules, is called a domain, and the domain division type VA mode is also called a MVA mode (multi-domain type VA mode).

In the MVA mode, from a viewpoint of maximizing transmissivity in a white display state, usually an axial azimuth of the polarizer is set to be an angle of 45° with respect to the tilt azimuth of the liquid crystal molecules at the voltage application time. This is because the transmissivity at the time of interposing a birefringent medium between the crossed Nicols polarizers, is proportional to $\sin^2(2\alpha)$ when an angle formed by an axis of the polarizer and a slow axis of the birefringent medium is defined as $\alpha$ (unit: rad). In a typical MVA mode, the tilt azimuth of the liquid crystal molecules can be divided into four domains of 45°, 135°, 225°, and 315°. In such a MVA mode in which the tilt azimuth is divided into four domains, Schliere alignment or an alignment in an unintended direction is frequently observed on a boundary between domains or near the alignment control part, thus causing transmissivity loss.

In order to solve the above-described problem, the VA mode liquid crystal display device using a circularly polarizing plate, is examined (for example, see Patent Document 1). According to such a liquid crystal display device, the transmissivity at the time of interposing the birefringent medium between right and left circularly polarizing plates crossing each other orthogonally, does not depend on an angle formed by the axis of the polarizer and the slow axis of the birefringent medium, and therefore desired transmissivity can be ensured if only controlling the tilt of the liquid crystal molecules even in a case that the tilt azimuth of the liquid crystal molecules is set to be an angle excluding 45°, 135°, 225°, and 315°. Accordingly, for example, a circular protrusion may be disposed in a center of the pixel, so that the liquid crystal molecules are tilted in all azimuths, or the liquid crystal molecules may be tilted in random azimuths without controlling the tilt azimuth at all. Note that the VA mode using the circularly polarizing plate is also called a circularly polarizing VA mode or a circularly polarizing mode. Meanwhile, the VA mode using a linearly polarizing plate is also called a linearly polarizing VA mode or a linearly polarizing mode. Further, as is publicly-known, the circularly polarizing plate is formed typically by combining the linearly polarizing plate and a λ/4 plate.

Further, the circularly polarized light has a performance that right and left chirality is replaced with each other when being reflected by mirror, etc. For example when a left circularly polarizing plate is disposed on the mirror and a light is incident thereon, the light transmitting through the circularly polarizing plate and converted to a left circularly polarized light, is reflected by the mirror and converted to a right circularly polarized light, and the right circularly polarized light can't transmit through the left circularly polarizing plate. Thus, it is known that the circularly polarizing plate has an antireflective optical function. It is also known that there is an effect of improving a bright room contrast ratio of the display device such as a VA mode liquid crystal display device, because the antireflective optical function of the circularly polarizing plate contributes to preventing unnecessary reflection when the display device is observed in a bright room environment like outdoors. Here, it can be considered that the unnecessary reflection is mainly caused by interior components of the display device such as a transparent electrode and metal wiring of a TFT element. If the unnecessary reflection is not prevented, light quantity at the time of a black display by the display device becomes large when observed in a bright room environment, even in a case of the display device realizing approximately perfect black display in a dark room environment, resulting in reducing the contrast ratio.

As described above, a transmissivity improvement effect and an unnecessary reflection prevention effect can be obtained in the circularly polarizing VA mode using the circularly polarizing plate. However, the liquid crystal display device of the circularly polarizing VA mode has a room for improvement in a point that the contrast ratio is reduced at an oblique viewing angle, and a sufficient viewing angle characteristic can't be obtained. Meanwhile, various improved techniques of the viewing angle characteristic using a birefringent layer (phase difference film) are proposed. For example, Patent Document 1 discloses a method described in the following (A), Patent Document 2 discloses a method described in the following (B), Patent Document 3 discloses a method described in the following (C), Patent Document 4 discloses a method described in the following (D), and Non-Patent Document 1 discloses a method described in the following (E).

(A) A method using two λ/4 plates satisfying a relation of nx>ny>nz.

(B) A method using two λ/4 plates satisfying a relation of nx>ny>nz, and one or two second-type birefringent layers satisfying a relation of nx<ny≤nz, by combination.

(C) A method using two λ/4 plates satisfying a relation of nx>nz>ny, and a third type birefringent layer satisfying nx=ny>nz, by combination.

(D) A method according to the method of (C) further using one or two λ/2 plates satisfying a relation of nx>nz>ny, by combination.

(E) A method using two uniaxial λ/4 plates (so-called A-plate satisfying a relation of nx>ny=nz), and a third type birefringent layer satisfying a relation of nx=ny>nz, and a birefringent layer satisfying a relation of nx>nz>ny, by combination.

Patent Document 1: Japanese Patent Application Laid-Open No. 2002-40428

Patent Document 2: Japanese Patent Application Laid-Open No. 2009-37049

Patent Document 3: Japanese Patent Application Laid-Open No. 2003-207782

Patent Document 4: Japanese Patent Application Laid-Open No. 2003-186017

Non-Patent Document 1: Zhibing Ge, and six others, "Wide-View Circular Polarizers for Mobile Liquid Crystal Displays", IDRC08, 2008, p. 266-268

However, as a result of an examination by inventors of the present invention, it is found that the viewing angle characteristic still has a room for improvement even in the methods of (A), (B), and (C). Further, the viewing angle characteristic also has a room for improvement in the methods (C), (D), and (E), in a point that an expensive biaxial phase difference film is required, which is difficult to be manufactured, requiring a high cost, and satisfying a relation of nx>nz>ny (satisfying a relation of 0<Nz<1).

DISCLOSURE OF THE INVENTION

In the course of various examinations by the inventors of the present invention to solve the above-described problem, a phase difference condition of a birefringent layer has been focused, which is arranged between a pair of polarizers (first and second polarizers) which are set in a crossed Nicols arrangement, and it has been found that when a birefringent layer satisfying a relation of nx>ny≥nz (satisfying Nz≥1.0) is defined as the first-type birefringent layer, and when a birefringent layer satisfying a relation of nx<ny≤nz (satisfying Nz≤0.0) is defined as the second-type birefringent layer, by appropriately arranging the first-type birefringent layer and the second-type birefringent layer between the first polarizer and the second polarizers, crossing performance of the first and second polarizers can be maintained even in an oblique direction while holding the crossing performance of the first and second polarizers in a front direction. Thus, a method of the following (F) is proposed. Further, it is also found that the first-type and second-type birefringent layers can be manufactured by a simple method by using a material having an appropriate intrinsic birefringence, unlike the biaxial phase difference film controlled to satisfy nx>nz>ny (0<Nz<1). Thus, the inventors of the present invention filed a Patent Application No. 2008-099526 in Japan.

(F) A method of using two λ/4 plates, a third type birefringent layer satisfying a relation of nx=ny>nz, a first-type birefringent layer satisfying nx>ny≥nz, and a second-type birefringent layer satisfying a relation of nx<ny≤nz, by combination.

However, in the method of (F), five or more birefringent layers (phase difference films) are preferably used, and there is a room for improvement in a manufacturing cost. Further, in the method of (F), the viewing angle characteristic can be improved by optimally designing an Nz-coefficient (a parameter indicating biaxial property) of two λ/4 plates. However, under a versatile design condition using two biaxial λ/4 plates satisfying the relation of nx>ny≥nz (Nz≥1.0), there is a room for improvement in the viewing angle characteristic.

Therefore, based on a further examination by the inventors of the present invention regarding the circularly polarizing VA mode liquid crystal display device that can be easily manufactured at a low cost and capable of realizing a high contrast ratio in a wider viewing angle range, it is found that light leakage in the black display state is reduced in a wider viewing range, and the high contrast ratio can be realized by using the versatile biaxial λ/4 plates satisfying the relation of nx>ny≥nz for two λ/4 plates (first and second λ/4 plates) which are required in the circularly polarizing VA mode; then adjusting the Nz-coefficients of the two λ/4 plates to be approximately the same, and arranging the birefringent layer satisfying the relation of nx<ny≤nz between the second λ/4 plate and the second polarizer. Further, the first-type and second-type birefringent layers can be manufactured by a simple method using a material having an appropriate intrinsic birefringence, unlike the biaxial phase difference film in which the first-type and second-type birefringent layers are controlled to satisfy nx>nz>ny (0<Nz<1). Thus, the inventors of the present invention filed a Patent Application No. 2009-015927 in Japan.

Thus, various examinations are attempted by the inventors of the present invention regarding improvement of the viewing angle characteristic in the circularly polarizing VA mode. However, in order to suppress viewing angle dependency of the contrast ratio, in each of the aforementioned method, leaked light quantity at the black display time at the oblique viewing angle is reduced, and in other words, the viewing angle dependency in a low gray scale (low brightness) is suppressed. As a result of strenuous efforts by the inventors of the present invention, it is found that in the circularly polarizing VA mode, when an absorption axis of the polarizer set in the crossed Nicols arrangement is defined as an azimuth angle of 0° and an azimuth angle of 90°, particularly the viewing angle characteristic from an intermediate gray scale (intermediate brightness) at an azimuth angle of 45° to a high gray scale (high brightness) is deteriorated compared with the viewing angle characteristic of a linearly polarizing VA mode. Namely, it is found that at the azimuth angle of 45°, not only the viewing angle characteristic (also called a "contrast viewing angle" hereafter) in the low gray scale, but also the viewing angle characteristic from the intermediate gray scale to the high gray scale (also called a "gray scale viewing angle" hereafter) is not sufficient. Note that good or bad of the gray scale viewing angle can be judged by a degree of coincidence between a curve (also called a "gamma (γ) curve") showing a correlation between the values of input gray scale and output brightness obtained by a measurement in a specific azimuth, and a gamma curve obtained by a measurement in the other azimuth, in a graph in which the input gray scale is taken on a horizontal axis and a standardized output brightness (transmissivity) is taken on a vertical axis. Usually, the γ curve in the front direction (normal direction relative to a display screen) and the γ curve in the other direction are preferably coincident with each other as much as possible, in terms of a display characteristic.

Further, it is also found by the inventors of the present invention that a comprehensive display quality level is improved by not allowing the coincidence to occur between a azimuth in which reduction of the contrast viewing angle occurs and a azimuth in which reduction of the gray scale viewing angle occurs, while recognizing a fact that a display quality at the azimuth angle of 45° is extremely deteriorated for an observer of the liquid crystal display device, because inconsistency occurs between the γ curve in the front direction and the γ curve in the other direction, in a wider gray scale range extending from the low gray scale to the high gray scale, due to reduction of the contrast viewing angle and reduction of the gray scale viewing angle occurring in the same azimuths.

In view of the above-described circumstance, the present invention is provided, and an object of the present invention is to provide the circularly polarizing VA mode liquid crystal display device having an excellent gray scale viewing angle from the intermediate gray scale to the high gray scale at the azimuth angle of 45°.

After various examinations by inventors of the present invention regarding the circularly polarizing VA mode liquid crystal display device having an excellent gray scale viewing angle at the azimuth angle of 45°, a plurality of domains formed in a MVA mode is focused. Then, it is found that the gray scale viewing angle from the intermediate gray scale to the high gray scale at the azimuth angle of 45° in the circularly polarizing VA mode can be improved by providing a domain in which liquid crystal molecules are tilted in a azimuth of 12.5° to 32.5°, a domain in which the liquid crystal molecules are tilted in a azimuth of 102.5° to 122.5°, a domain in which the liquid crystal molecules are tilted in a azimuth of 192.5° to 212.5°, and a domain in which the liquid crystal molecules are tilted in a azimuth of 282.5° to 302.5°. As a result, the display quality of the liquid crystal display device can be improved and the present invention is achieved.

Namely, the present invention provides a liquid crystal display device including: a first polarizer; a first λ/4 plate with an in-plane phase difference adjusted to λ/4; liquid crystal cells including a liquid crystal layer between a pair of opposing substrates; a second λ/4 plate with an in-plane phase difference adjusted to λ/4; and a second polarizer, in this order, wherein when an azimuth angle of an absorption axis of the second polarizer is defined as 0°, an in-plane slow axis of the second λ/4 plate forms an angle of approximately 45°; an in-plane slow axis of the first λ/4 plate forms an angle of approximately 135°; the absorption axis of the first polarizer forms an angle of approximately 90°, and wherein a display brightness is varied by changing an alignment state of liquid crystal molecules in the liquid crystal layer from a state where the liquid crystal molecules are approximately vertically aligned over a substrate surface, to a state where the liquid crystal molecules are tilted over the substrate surface; and the liquid crystal layer includes a domain in which the liquid crystal molecules are tilted in an azimuth angle range of 12.5° to 32.5°, a domain in which the liquid crystal molecules are tilted in an azimuth angle range of 102.5° to 122.5°, and a domain in which the liquid crystal molecules are tilted in an azimuth angle range of 192.5° to 212.5°, and a domain in which the liquid crystal molecules are tilted in an azimuth angle range of 282.5° to 302.5°. Note that in this specification, the "azimuth" means a direction in parallel to the substrate surface of a liquid crystal cells, ranging from 0° to 360°, and a tilt angle from a normal direction on the substrate surface of the liquid crystal cells is not taken into consideration. The tilt angle from the normal direction on the substrate surface of the liquid crystal cells is called a "polar angle", ranging from 0° to 90°. FIG. 1 shows an azimuth angle φ and a polar angle with respect to a direction $A_0$ of a tilt of the liquid crystal molecules, with a azimuth of the absorption axis of the second polarizer set as the X-axis, an axis orthogonally crossing the X-axis in an in-plane direction set as the Y-axis, and an axis orthogonally crossing the X-axis in the out-plane direction set as the Z-axis.

The liquid crystal display device of the present invention implements display in a so-called MVA mode (multi-domain type VA mode). In the MVA mode, for example, the tilt azimuth of the liquid crystal molecules at a voltage application time is divided into a plurality of azimuths in a pixel, by providing an alignment direction control means such as a slit (electrode notch portion) formed in a pixel electrode and/or a common electrode used for applying voltage to a liquid crystal layer, and a dielectric protrusion formed in the pixel. Thus, symmetry of the tilt azimuth of the liquid crystal molecules can be improved, and the viewing angle characteristic of the liquid crystal display device can be improved. Further, the liquid crystal display device of the present invention implements display by a so-called circularly polarizing VA mode. Accordingly, unlike typical MVA mode that uses linearly polarizing plates, there is no necessity for setting an angle to be 45° by an axial azimuth of the polarizer and the tilt azimuth of the liquid crystal molecules at the voltage application time in order to maximize the transmissivity in a white display state. Therefore, even in a case of forming the domain in which the liquid crystal molecules are tilted in an azimuth angle range of 12.5° to 32.5°, and the domain in which the liquid crystal molecules are tilted in the an azimuth angle range of 102.5° to 122.5°, the domain in which the liquid crystal molecules are tilted in an azimuth angle range of 192.5° to 212.5°, and the domain in which the liquid crystal molecules are tilted in an azimuth angle range of 282.5° to 302.5°, the transmissivity is not reduced in a white display state in principle, unlike a case that the display is obtained in a linearly polarizing mode.

In the present invention, the domain means a region in the pixel in which the tilt azimuths of the liquid crystal molecules are approximately the same when the voltage is applied to the liquid crystal layer. Regions including the liquid crystal molecules with different polar angles are also included in the same domain, provided that the tilt azimuths are approximately the same.

The liquid crystal display device of the present invention includes the first polarizer, the first λ/4 plate, the liquid crystal cells, the second λ/4 plate, and the second polarizer as constituent elements as described above, and is not particularly limited by the other members. However, from a viewpoint of realizing a high contrast ratio in a wider viewing angle range, the following embodiments are suitably used: (1) the first and second λ/4 plates are first-type birefringent layer having approximately the same Nz-coefficients, and a second-type birefringent layer is provided between the second λ/4 plate and the second polarizer, and an in-plane fast axis of the second-type birefringent layer is approximately orthogonally crossing the absorption axis of the second polarizer; (2) the first and second λ/4 plates are first-type birefringent layers having the same Nz-coefficients, and a first second-type birefringent layer is provided between the first λ/4 plate and the first polarizer, and a second second-type birefringent layer is provided between the second λ/4 plate and the second polarizer, and the first second-type birefringent layer and the second second-type birefringent layer have the same Nz-coefficients and in-plane phase differences, and the in-plane fast axis of the first second-type birefringent layer is approximately orthogonally crossing the absorption layer of the first polarizer, and the in-plane fast axis of the second second-type birefringent layer is approximately orthogonally crossing the absorption axis of the second polarizer.

Note that in this specification, the "polarizer" means an element having a function of changing a natural light to a linearly polarized light, which is the same meaning as a polarizing plate or a polarizing film. The "birefringent layer" means a layer having an optical anisotropy, which is the same meaning as a phase difference film, a phase difference plate, an optical anisotropy layer, and a birefringent medium, etc. The "birefringent layer" in this specification means that either one of an absolute value of an in-plane phase difference R and an absolute value of a phase difference Rth in a perpendicular direction as will be described later, is a value of 10 nm or more from a viewpoint of sufficiently exhibiting an function effect of the present invention, and preferably is a value of 20 nm or more. Further, as described above, in this specification, the "first-type birefringent layer" means the birefringent layer satisfying the relation of nx>ny≥nz, and the "second-type birefringent layer" means the birefringent layer satisfying the relation of nx<ny≤nz. nx and ny indicate principal indices of refraction in an in-plane direction regarding the light with a wavelength of 550 nm, and nz indicates a principal index of refraction in an out-plane direction (in the perpendicular direction) regarding the light with a wavelength of 550 nm.

In this specification, the "in-plane phase difference R" means the in-plane phase difference (unit: nm) defined by R=|nx−ny|×d, when principal indices of refraction of birefringent layers (including liquid crystal cells or λ/4 plates) in an in-plane direction are defined as nx and ny, the principal index of refraction in the out-plane direction (perpendicular direction) is defined as nz and a thickness of the birefringent layer is defined as d. Meanwhile, the "phase difference Rth in the perpendicular direction" means the phase difference (unit: nm) in the out-plane direction (in the perpendicular direction) defined by Rth=(nz−(nx+ny)/2)×d. The "λ/4 plate" means a layer having the optical anisotropy of approximately ¼ wavelength (exactly 137.5 nm, in a range from 115 nm to 160 nm) regarding the light with at least a wavelength of 550 nm, which is the same meaning as a λ/4 phase difference film and a λ/4 phase difference plate.

The "in-plane slow axis (fast axis)" means a direction of a dielectric main axis (direction of x-axis or y-axis) corresponding to the principal index of refraction ns (nf), when a larger refractive index is defined as ns and a smaller refractive index is defined as nf again, out of the in-plane principal indices of refractions nx and ny. Further, the "Nz-coefficient" means a parameter showing a degree of biaxiality of the birefringent layer defined by Nz=(ns−nz)/(ns−nf). Note that the principal indices of refraction and the phase difference are measured at a wavelength of 550 nm in this specification, unless otherwise specifically noted. Further, even in a case of the birefringent layer having the same Nz-coefficient, an effective phase difference of the birefringent layer is different regarding the light incident from an oblique direction under an influence of a refracting angle if an average refractive index=(nx+ny+nz)/3 of the birefringent layer is different, thus complicating a design guideline. In order to prevent such a problem, the average refractive index of each birefringent layer is unified to 1.5, to thereby calculate the Nz-coefficient, unless otherwise specifically noted in this specification. Regarding the birefringent layer with actual average refractive index different from 1.5, the Nz-coefficient is calculated on the assumption that the average refractive index is 1.5. Also, the same calculation is carried out for the phase difference Rth in the perpendicular direction.

In this specification, "the birefringent layers have substantially the same Nz-coefficient" means a case that a difference of the Nz-coefficient is less than 0.1, and is preferably less than 0.05. "An angle of approximately 45° is formed by the in-plane slow axis of the second λ/4 plate" means that an angle formed by the in-plane slow axis of the second λ/4 plate and the absorption axis of the second polarizer may be in a range of 40° to 50°, and more preferably 45°. Even in a case that a relative angle formed by the in-plane slow axis of the second λ/4 plate and the absorption axis of the second polarizer is not completely 45°, a sufficient prevention effect can be obtained against the light leakage in the normal direction on the substrate surface, by making the in-plane slow axis of the first λ/4 plate orthogonally cross the in-plane slow axis of the second λ/4 plate. Meanwhile, in a point of preventing a reflection and improving transmissivity, a remarkable effect can be obtained by setting the relative angle at 45°. "An angle of approximately 135° is formed by the in-plane slow axis of the first λ/4 plate" means that an angle formed by the in-plane slow axis of the first λ/4 plate and the in-plane slow axis of the second λ/4 plate set at the azimuth angle of approximately 45° may be 88° to 92°, and more preferably 90°. "An angle of approximately 90° is formed by the absorption axis of the first polarizer" means that an angle formed by the absorption axis of the second polarizer and the absorption axis of the first polarizer may be 88° to 92°, and more preferably 90°. "The in-plane fast axis of the second-type birefringent layer is approximately orthogonally crossing the absorption axis of the second polarizer" means that an angle formed by the in-plane fast axis of the second-type birefringent layer and the absorption axis of the second polarizer may be 88° to 92°, and more preferably 90°.

As will be described later, according to the above embodiment (1), from a viewpoint of realizing a high contrast ratio by reducing the light leakage in the black display state in a wider viewing angle range by controlling a change of a polarization state of a display light utilizing the second-type birefringent layer, it is preferably that any birefringent mediums expect the first polarizer, first λ/4 plate (first-type birefringent layer), liquid crystal cells, second λ/4 plate (first-type birefringent layer), second-type birefringent layer, and second polarizer is not provided between the first polarizer and the second polarizer. From a viewpoint of reducing a cost by reducing the number of the birefringent layers used for the liquid crystal display device, it is more preferably that any birefringent mediums expect the first polarizer, first λ/4 plate (first-type birefringent layer), liquid crystal cells, second λ/4 plate (first-type birefringent layer), second-type birefringent layer, and second polarizeris not provided in the liquid crystal display device. Meanwhile, it is also acceptable that there are provided the first polarizer, first λ/4 plate (first-type birefringent layer), liquid crystal cells, second λ/4 plate (first-type birefringent layer), second-type birefringent layer, and second polarizer, wherein the other birefringent mediums may be added to the liquid crystal display device. For example, a λ/2 plate with in-plane phase difference adjusted to λ/2 may be added to the liquid crystal display device, for adjusting a wavelength dispersibility of the birefringent layer. Further, according to the above embodiment (2), it is preferably that any birefringent mediums expect the first polarizer, first second-type birefringent layer, first λ/4 plate (first-type birefringent layer), liquid crystal cells, second λ/4 plate (first-type birefringent layer), second second-type birefringent layer, and second polarizer is not provided between the first polarizer and the second polarizer. From a viewpoint of reducing the cost by reducing the number of the birefringent layers used for the liquid crystal display device, it is more preferably that any birefringent mediums expect the first polarizer, first second-type birefringent layer, first λ/4 plate (first-type birefringent layer), liquid crystal cells, second λ/4 plate (first-type birefringent layer), second second-type birefringent layer, and second polarizer is not provided in the liquid crystal display device. Similarly to the above embodiment (1), there are provided the first polarizer, first second-type birefringent layer, first λ/4 plate (first-type birefringent layer), liquid crystal cells, second λ/4 plate (first-type birefringent layer), second-type birefringent layer, and second polarizer, wherein the other birefringent layer may be added to the liquid crystal display device, and for example, the λ/2 plate with in-plane phase difference adjusted to λ/2 may be added to the liquid crystal display device, for adjusting the wavelength dispersibility of the birefringent layer, etc.

Further, it is found by the inventors of the present invention, that there are different factors of preventing a perfect black display depending on the azimuth, and it is found that optical retardation compensation for a plurality of azimuths can be implemented by arranging the birefringent layer satisfying a relation of nx=ny>nz ("birefringent layer satisfying a relation of nx=ny>nz" in this specification is defined as a third-type birefringent layer) between the first and second λ/4 plates. According to the mode of providing the third-type birefringent layer, first, conditions of the optical retardation compensation at the azimuth angle of 0° can be optimized by adjusting a phase difference value of the third-type birefringent layer, and next, the light leakage in the black display state in the oblique direction can be reduced in a wider azimuth by optimizing the conditions of the optical retardation compensation at the azimuth angle of 45° without changing the optimizing conditions of the optical retardation compensation at the azimuth angle of 0°, by appropriately arranging the values of the phase difference of the second-type birefringent layer. As a result, the high contrast ratio can be realized in a wider viewing angle range based on both of the azimuth angle and the polar angle. Further, the third-type birefringent layer can be manufactured by a simple method by using a material having a suitable intrinsic birefringence, unlike the biaxial phase difference film controlled to satisfy nx>nz>ny (0<Nz<1).

Namely, the liquid crystal display device of the present invention may have at least one third-type birefringent layer at least between the first λ/4 plate and the liquid crystal cell, or between the liquid crystal cells and the second λ/4 plate. The third-type birefringent layer is particularly suitably used when the Nz of the first λ/4 plate and the second λ/4 plate is less than 2.00. The third-type birefringent layer is preferably arranged adjacent to the liquid crystal cells. Here, the "arranged adjacently" means that the birefringent medium is not provided between the third-type birefringent layer and the liquid crystal cells, and for example, it is also acceptable that an isotropic film is arranged between the third-type birefringent layer and the liquid crystal cells. Further, when a plurality of third-type birefringent layers are provided, at least one layer of the plurality of third-type birefringent layers is arranged adjacent to the liquid crystal cells, and each third-type birefringent layer is preferably arranged adjacent to each other.

Note that nx≅ny in the third-type birefringent layer can also be expressed as |nx−ny|≅0, and specifically indicates a case that in-plane phase difference R=|nx−ny|×d is less than 20 nm, and is preferably less than 10 nm. Whether the third-type birefringent layer is composed of one layer or multiple layers, the characteristic of a transmitted light intensity of the liquid crystal display device is completely the same in principle, so long as the third-type birefringent layer is arranged more inside (liquid crystal cell side) than the first λ/4 plate and the second λ/4 plate, wherein the sum total of the phase differences in the perpendicular direction is the same. Further, even when the liquid crystal display device does not have the third-type birefringent layer actually, there is absolutely no problem in virtually considering that the liquid crystal display device has the third-type birefringent layer with phase difference of zero in the perpendicular direction. Accordingly, this specification only refers to the liquid crystal display device with one layer of the third-type birefringent layers arranged between the second λ/4 plate and the liquid crystal cells for simplifying the explanation, unless otherwise specifically noted.

As for the polarizer, the polarizer with an anisotropic material such as an iodine complex having dichroism adsorbed and aligned in a polyvinyl alcohol (PVA) film, can be typically given for example. Usually, in order to secure mechanical strength and moist heat resistance, both sides of the PVA film are laminated with a protective film such as triacetylcellulose (TAC) film, and such a polarizer provided with the protective film is put to practical use. However, the "polarizer" in this specification does not include the protective film, and indicates only an element having a polarizing function, unless otherwise noted. Note that the characteristic of the transmitted light intensity of the liquid crystal display device is completely the same in principle, even when either one of the first and second polarizer is a polarizer (backside polarizer) or an analyzer (observation surface side polarizer). This specification only refers to the liquid crystal display device wherein the first polarizer functions as a polarizer unless otherwise noted, for simplifying the explanation.

The liquid crystal cell has a pair of substrates and a liquid crystal layer interposed between the pair of substrates. The present invention provides a Multi-domain VA (MVA) mode liquid crystal cell, being a kind of a Vertical Alignment (VA) mode in which black display is obtained by aligning the liquid crystal molecules in the liquid crystal layer approximately vertically to the substrate surface. The MVA mode may be combined with Continuous Pinwheel Alignment (CPA) mode, Patterned VA (PVA) mode, Biased VA (BVA) mode, Reverse TN (RTN) mode, In Plane Switching-VA (IPS-VA)

mode, etc. In this specification, "the liquid crystal molecules are aligned approximately vertically to the substrate surface" means that an average pretilt angle of the liquid crystal molecules may be 80° or more.

The liquid crystal display device of the present invention has the first first-type birefringent layer (first $\lambda/4$ plate) with in-plane phase difference adjusted to $\lambda/4$, and the second first-type birefringent layer (second $\lambda/4$ plate) with in-plane phase difference adjusted to $\lambda/4$, between the first polarizer and the second polarizer, and further may have the second-type birefringent layer and/or the third-type birefringent layer. For example, a combination of the second $\lambda/4$ plate and the second-type birefringent layer, a combination of the second $\lambda/4$ plate and the third-type birefringent layer, a combination of the first $\lambda/4$ plate and the second-type birefringent layer, and a combination of the first $\lambda/4$ plate and the third-type birefringent layer, are preferably formed as a stacked body in which layers are stacked without using an adhesive agent. Such a stacked body can be fabricated by a method of stacking layers using an adhesive agent simultaneously with a film formation by extrusion using a co-extrusion method, and by a method of stacking layers by providing one of the birefringent layers made of a polymer film in the stacked body, and stacking the other birefringent layer made of a liquid crystal material or a non-liquid crystal material on the polymer film by coating or transferring. The latter method using coating or transferring can be suitably used when the stacked body of the second $\lambda/4$ plate and the third-type birefringent layer, and the stacked body of the first $\lambda/4$ plate and the third-type birefringent layer are fabricated, because particularly the third-type birefringent layer is frequently fabricated by a method of being coating with the non-liquid crystal material such as polyimide and the liquid crystal material such as cholesteric liquid crystal.

Functions of the second-type and third-type birefringent layers of the present invention will be described hereafter. As an example, a circularly polarizing VA mode liquid crystal display device (A) of the present invention corresponding to the above embodiment (1) will be considered hereafter, in which the first polarizer, first $\lambda/4$ plate (first-type birefringent layer), liquid crystal cells, third-type birefringent layer, second $\lambda/4$ plate (first-type birefringent layer), second-type birefringent layer, and second polarizer are stacked in this order.

In the liquid crystal display device (A), the light incident on the first polarizer from a front direction, is converted to a linearly polarized light by the first polarizer, and is converted to a circularly polarized light from the linearly polarized light by the first $\lambda/4$ plate, then is transmitted through the liquid crystal cells and third-type birefringent layer, while maintaining a polarization state, and is reconverted to the same linearly polarized light as the linearly polarized light immediately after transmitting through the first polarizer from the circularly polarized light by the second $\lambda/4$ plate which is set in an orthogonal relation with the first $\lambda/4$ plate, then is transmitted through the second-type birefringent layer while maintaining a polarization state, and the linearly polarized light is cut off by the second polarizer which is orthogonally crossing the first polarizer, to thereby obtain an excellent black display. Namely, the second-type and third-type birefringent layers are not provided for the purpose of changing the polarization state of the light incident from the front direction.

Note that in the aforementioned description, explanation is given for a case that the black display can be obtained by tracing the polarization state that is changed every time the light transmits through each layer. However, it can also be understood intuitively by the following explanation. Specifically, the liquid crystal display device (A) can perfectly provide a black display obtained by crossed Nicols polarizers in a front direction because of the following reasons (1) to (4). (1) The first and second $\lambda/4$ plates included between the first and second polarizers are invalidated because they are orthogonally crossing each other and the phase differences are canceled between them due to having the same phase differences ($\lambda/4$). (2) The second-type birefringent layer included between the first and second polarizers is substantially invalidated because the fast axis of the second-type birefringent layer is orthogonally crossing the absorption axis of the second polarizer. (3) The third-type birefringent layer included between the first and second polarizers, and the liquid crystal cells are substantially invalidated because the phase differences of the third-type birefringent layer and the liquid crystal cells are zero in the front direction. (4) The crossed Nicols polarizers are formed by an orthogonal relation between the first and second polarizers.

Meanwhile, in the liquid crystal display device of the present invention, if it is assumed that there is no conversion of the polarization state due to the second-type and third-type birefringent layers, the light incident on the first polarizer from the oblique direction is not cut off by the second polarizer, and therefore the perfect black display can't be obtained in the oblique direction for three reasons explained later. Namely, the second-type and third-type birefringent layers are provided for the purpose of changing the polarization state of only the light incident from the oblique direction, and implementing viewing angle compensation.

As described above, the second-type and third-type birefringent layers of the present invention is capable of obtaining an excellent black display even in the oblique direction while maintaining the excellent black display in the front direction, thus making it possible to improve the contrast ratio in the oblique direction. In other words, the second-type and third-type birefringent layers of the present invention are capable of improving a gray scale viewing angle in a low gray scale. Accordingly, in the present invention, the gray scale viewing angle is improved from an intermediate gray scale to a high gray scale at the azimuth angle of 45° by adjusting the azimuth in which the liquid crystal molecules are tilted, and the gray scale viewing angle in the low gray scale is improved by providing the second-type and third-type birefringent layers, to thereby realize the liquid crystal display device having excellent viewing angle characteristic.

Next, the above-mentioned three reasons for implementing viewing angle compensation by converting the polarization state of the light incident from the oblique direction by the second-type and third-type birefringent layers, will be described in detail. Here, as shown in FIG. 2, a circularly polarizing VA mode liquid crystal display device 100 with simplest structure is considered, in which a first polarizer (azimuth angle of the absorption axis: 90°) 110, a first $\lambda/4$ plate (azimuth angle of the slow axis: 135°) 120, a VA mode liquid crystal cell 130, a second $\lambda/4$ plate (azimuth angle of the slow axis: 45°) 140, and a second polarizer (azimuth angle of the absorption axis: 0°) 150 are stacked in this order, wherein the second-type and third-type birefringent layers are not included. Note that in FIG. 2, arrows described in the first and second polarizers 110, 150 indicate azimuths of the absorption axes thereof, and arrows described in the first and second $\lambda/4$ plates 120, 140 indicate directions of the slow axes thereof, and ellipsoid described in the VA mode liquid crystal cell 130 indicates a shape of an optical indicatrix thereof.

First, when the black display in the front direction is considered, the light incident on the first polarizer 110 from the front direction is converted to the linearly polarized light by the first polarizer 110, and is converted to the circularly polarized light from the linearly polarized light by the first λ/4 plate 120, and is transmitted through the liquid crystal cell 130 while maintaining the polarization state, and is reconverted to the same linearly polarized light as the light immediately after transmitting through the first polarizer 110 from the circularly polarized light by the second λ/4 plate 140 which is set in the orthogonal relation with the first λ/4 plate 120, and the linearly polarized light is cut off by the second polarizer 150 which is orthogonally crossing the first polarizer 110, to thereby obtain the excellent black display. In other words, the liquid crystal display device 100 can perfectly provide a black display in the front direction because of the following reasons (1) to (3). (1) The first and second λ/4 plates 120, 140 included between the first and second polarizers 110, 150 are substantially invalidated because the first and second λ/4 plates 120, 140 orthogonally crossing each other, and the phase differences are canceled between them due to having the same phase differences (λ/4) (2) The liquid crystal cell 130 included between the first and second polarizers 110, 150 is substantially invalidated because phase difference of the liquid crystal cell 130 is zero in the front direction. (3) So-called crossed Nicols polarizers are formed by the orthogonal relation between the first and second polarizers 110, 150.

Next, when the black display in the oblique direction is considered, the perfect black display can't be obtained due to the following viewing angle inhibiting factors (1) to (3).
(1) The first and second λ/4 plates 120, 140 are not invalidated because the first and second λ/4 plates 120, 140 are not orthogonally crossing each other, or the phase difference of the first λ/4 plates 120 and the phase difference of the second λ/4 plates 120, 140 are not same.
(2) The liquid crystal cell 130 is not invalidated because the phase difference of the liquid crystal cell 130 is not zero.
(3) The crossed Nicols polarizers are not formed because the first and second polarizers 110, 150 are not orthogonally crossing each other.

The viewing angle inhibiting factors (1) to (3) will be described further in detail, with reference to FIG. 3. As schematically shown in FIG. 3(a), a slow axis 121 of the first λ/4 plate 120 and a slow axis 141 of the second λ/4 plate 140 are orthogonally crossing each other in the front direction (in the normal direction with respect to the substrate surface), and meanwhile the slow axis 121 of the first λ/4 plate 120 and the slow axis 141 of the second λ/4 plate 140 are not orthogonally crossing each other in the oblique direction at the azimuth angle of 0°, and therefore the phase difference of the first λ/4 plate 120 and the phase difference of the second λ/4 plate 140 are not canceled by each other As a result, the first λ/4 plate 120 and the second λ/4 plate 140 are not invalidated. Further, as schematically shown in FIG. 3(b), the slow axis 121 of the first λ/4 plate 120 and the slow axis 141 of the second λ/4 plate 140 are orthogonally crossing each other in the front direction, and meanwhile although the slow axis 121 and the slow axis 141 of the first and second λ/4 plates 120, 140 are orthogonally crossing each other in the oblique direction at the azimuth angle of 45°, the phase difference of the first λ/4 plate 120 and the phase difference of the second λ/4 plate 140 are not same, and therefore the phase difference of the first λ/4 plate 120 and the phase difference of the second λ/4 plate 140 are not canceled by each other. This is because the phase difference is determined by the birefringence (difference in refractive index)×thickness, wherein an effective birefringence is different in the front direction and in the oblique direction, and the phase difference is also determined depending on the azimuth. For the same reason, the phase difference of the VA mode liquid crystal cell 130, being zero in the front direction, is not zero in an arbitrary oblique direction. The birefringence effective only in the front direction is zero, and the phase difference is also zero. Further, as schematically shown in FIG. 3(c), an absorption axis 111 of the first polarizer 110 and an absorption axis 151 of the second polarizer 150 are orthogonally crossing each other in the front direction, and meanwhile the absorption axis 111 of the first polarizer 110 and an absorption axis 151 of the second polarizer 150 are not orthogonally crossing each other in the oblique direction at the azimuth angle of 45°.

As described above, the circularly polarizing VA mode liquid crystal display device 100 with a minimum structure is not capable of obtaining the perfect black display in the oblique direction due to the aforementioned three viewing angle inhibiting factors (1) to (3). To put it the other way around, if compensation for these inhibiting factors, namely optical compensation can be implemented, more excellent black display can be obtained even in the oblique direction. Actually, the excellent black display is thus obtained by the viewing angle improvement techniques (A) to (E) described above. Note that in many cases, the aforementioned viewing angle inhibiting factors (1) and (2) are observed in a compounded state. Accordingly, when the viewing angle inhibiting factors (1) and (2) are optically compensated, they are not individually optimized but a technique of comprehensively optimizing the viewing angle inhibiting factors (1) and (2) is preferably used.

Then, in the liquid crystal display device (A), the viewing angle inhibiting factors (1) to (3) are designed to be optically compensated simultaneously, based on a design guideline as will be described below in detail. Specifically, the optical compensation is realized first by preparing the first and second λ/4 plates as versatile biaxial λ/4 plates (first-type birefringent layer) satisfying the relation of nx>ny≥nz, and adjusting the Nz-coefficients of them to approximately the same; second, by arranging the birefringent layer (second-type birefringent layer) satisfying the relation of nx<ny≤nz between the second λ/4 plate and the second polarizer, and third (if necessary), by arranging the birefringent layer (third-type birefringent layer) satisfying the relation of nx=ny>nz between the first and second λ/4 plates.

Here, the design guideline of the birefringent layer will be described. Various examinations are attempted by the inventors of the present invention, for easily and effectively implement the optical compensation for the viewing angle inhibiting factors, and it is found that there are different factors required to be optically compensated, depending on the azimuth. Then, as shown in the following Table 1, it is found that the optical compensation of the polarizers is not required for the viewing angle inhibiting factor (3) at the azimuth angle of 0°. At the azimuth angle of 0°, the optical compensation of the λ/4 plates may be implemented for the viewing angle inhibiting factor (1) and the optical compensation of the liquid crystal cell may be implemented for the viewing angle inhibiting factor (2).

TABLE 1

| Azimuth | Optical compensation | | |
|---|---|---|---|
| | (1) λ/4 plates | (2) Liquid crystal cell | (3) Polarizers |
| 0° | Needed | Needed | Unneeded |
| 45° | Needed | Needed | Needed |

Further, it is found by the inventors of the present invention, that the viewing angle inhibiting factors (1) and (2) can be optically compensated simultaneously and effectively at the azimuth angle of 0°, by optimally adjusting Nz-coefficient Nzq of the first and second λ/4 plates and the phase difference Rlc of the liquid crystal cells in the perpendicular direction, based on an illustration of the polarization state using a Poincare sphere and a computer simulation, and by arranging the third-type birefringent layer satisfying the relation of nx=ny>nz between the first and second λ/4 plates as needed, and by optimally adjusting the phase difference R3 in the perpendicular direction. In this specification, a process of selecting optimal values of the Nz-coefficient Nzq of the first and second λ/4 plates, the phase difference Rlc of the liquid crystal cells in the perpendicular direction, and the phase difference R3 of the third-type birefringent layer in the perpendicular direction for the purpose of implanting the optical compensation in the azimuth angle of 0°, is called a first step.

Then, it is also found by the inventors of the present invention, that after implementing the first step the viewing angle inhibiting factors (1), (2), and (3) can be optically compensated simultaneously and effectively at the azimuth angle of 45°, by arranging the second-type birefringent layer satisfying the relation of nx<ny≤nz between the second λ/4 plate and the second polarizer so that the in-plane fast axis is orthogonally crossing the absorption axis of the second polarizer, and by optimally adjusting the Nz-coefficient Nz2 and the in-plane phase difference R2. In this specification, after the implementation of the first step a process of selecting the optimal values of the Nz-coefficient Nz2 and the in-plane phase difference R2 of the second-type birefringent layer for the purpose of implementing the optical compensation at the azimuth angle of 45°, is called a second step.

The in-plane fast axis of the second-type birefringent layer added in the second step, is arranged so as to approximately orthogonally cross the absorption axis of the adjacent second polarizer. Therefore, the optical characteristic is not completely changed in the azimuth of the absorption axis of the second polarizer, namely, at the azimuth angle of 0°. Namely, an optical compensation process of the present invention is characterized in that an optimized state obtained in the first step is still maintained even after the second step. Thus, the first step and the second step can be completely independently examined, thereby making it easy to design the birefringent layer.

Details of an optical compensation principle in the first step and the second step are explained as follows based on an illustration using the Poincare sphere. A concept based on the Poincare sphere is widely known in a field of crystal optics as a useful technique of tracing a polarization state that is converted through the birefringent layer (for example, see pp. 146-163 of "Crystal optics" written by Hiroshi Takasaki, by Morikita Publishing Co., Ltd., 1975).

In the Poincare sphere, clockwise polarized light is shown in an upper hemisphere, counterclockwise polarized light is shown in a lower hemisphere, linearly polarized light is shown on an equator, and right-handed circularly polarized light and left-handed circularly polarized light are respectively shown in both upper and lower poles. In two polarization state set in a symmetrical relationship with respect to a center of a sphere, absolute values of ellipticity angles are equal to each other, and polarities are reverse, thus forming a pair of the orthogonally polarized lights.

Further, as an effect of the birefringent layer on the Poincare sphere, a point indicating the polarization state immediately before passing through the birefringent layer is converted to a point rotationally moved counterclockwise by an angle determined by (2π)×(phase difference)/(wavelength) (unit: rad) around the slower axis on the Poincare sphere (in other words more exactly, a position of the point on the Poincare sphere indicating the polarization state of a slower mode out of two intrinsic vibration modes of birefringent layer) (the same thing can be said even if the point is rotationally moved clockwise around the fast axis).

A rotation center and a rotation angle observed from the oblique direction are determined by the slow axis (or the fast axis) and the phase difference at an observation angle. Although detailed explanation is omitted, the rotation center and the rotation angle can be calculated by knowing a vibrating direction and a wave vector of the intrinsic vibration mode in the birefringent layer by solving Fresnel's wave normal equation for example. The slow axis observed from the oblique direction depends on an observation angle and the Nz-coefficient, and the phase difference observed from the oblique direction depends on the observation angle, the Nz-coefficient, and the in-plane phase difference R (or the phase difference Rth in the perpendicular direction).

(Compensation Principle of the First Step)

First, regarding the circularly polarizing VA mode liquid crystal display device 100 of FIG. 2, the polarization state observed from the front direction will be considered. Under this condition, FIG. 4 shows the polarization state on the S1-S2 plane of the Poincare sphere, every time the light emitted from a backlight (although not shown in FIG. 2, the backlight is located below the first polarizer) is transmitted through each polarizer 110, 150, each birefringent layer 120, 140, and the liquid crystal cell 130. Note that although points indicating each polarization state are actually located on the Poincare sphere, they are shown by projected them on the S1-S2 plane. Further, the point indicating the polarization state is shown by "○", and the point indicating the slow (fast) axis of the birefringent layer is shown by "×".

First, the polarization state immediately after transmitting through the first polarizer 110 is located at point P0 on the Poincare sphere, and coincides with the polarization state capable of absorbing light by the second polarizer 150 shown by point E, namely, coincides with an extinction point of the second polarizer 150 (coincides with the azimuth of the absorption axis). Then, by transmitting through the first λ/4 plate 120, the polarization state shown by point P0 receives a rotational conversion of a certain angle around the slow axis of the first λ/4 plate 120 shown by point Q1 on the Poincare sphere, and reaches point P1. A rotating direction at this time is counterclockwise when viewed from point Q1 toward original point O (Central point of the Poincare sphere).

Next, the light transmits through the VA mode liquid crystal cell 130, but the phase difference of the VA mode liquid crystal cell 130 is zero in the front direction, and therefore the polarization state is not converted. Finally, by transmitting through the second λ/4 plate 140, the polarization state receives the rotational conversion of a certain angle around the slow axis of the second λ/4 plate 140 shown by point Q2, and reaches point P2. The point P2 coincides with extinction point E of the second polarizer 150. Thus, the liquid crystal display device 100 of FIG. 2 is capable of cutting off the light from the backlight if being observed from the front direction, and the excellent black display can be obtained.

Further, when the circularly polarizing VA mode liquid crystal display device 100 of FIG. 2 is observed from a direction tilted by 60° from the normal direction (called a polar angle 60° in some cases) at the azimuth of the absorption axis of the second polarizer 150, namely at the azimuth angle of 0°, the polarization state at this time will be considered. Under this condition, FIG. 5 shows the polarization state on the S1-S2 plane of the Poincare sphere, every time the light emitted from a backlight is transmitted through each polarizer 110, 150, each birefringent layer 120, 140, and the liquid crystal cell 130.

First, the polarization state immediately after transmitting through the first polarizer 110 is located at point P0 on the Poincare sphere, and coincides with the polarization state capable of absorbing light by the second polarizer 150 shown by point E, namely, coincides with an extinction point of the second polarizer 150 (coincides with the azimuth of the absorption axis). Then, by transmitting through the first λ/4 plate 120, the polarization state shown by point P0 receives the rotational conversion of a certain angle around the slow axis of the first λ/4 plate 120 shown by point Q1 on the Poincare sphere, and reaches point P1. A rotating direction at this time is counterclockwise when viewed from point Q1 toward original point O.

Next, after transmitting thorough the VA mode liquid crystal cell 130, the polarization state receives the rotational conversion of a certain angle around the slow axes of the liquid crystal cell 130 shown by point L on the Poincare sphere, and reaches point P2. The rotating direction at this time is counterclockwise when viewed from point L toward original point O. Finally, by transmitting through the second λ/4 plate 140, the polarization state receives the rotational conversion of a certain angle around the slow axis of the second λ/4 plate 140 shown by point Q2, and reaches point P3. The point P3 does not coincide with the extinction point E of the second polarizer 150. Thus, the liquid crystal display device 100 of FIG. 2 can't cut off the light from the backlight if being observed from the azimuth angle of 0° and polar angle of 60°.

Note that positions of point P1 to point P3 in FIG. 4 and FIG. 5 depend on the Nz-coefficient Nzq of the first and second λ/4 plates 120, 140, and the phase difference Rlc of the liquid crystal cell 130 in the perpendicular direction. In FIG. 4 and FIG. 5, a case of Nzq=1.6, and Rlc=320 nm is shown as an example. The position of each point is shown roughly for easy understanding, which is however sometimes not accurate if strictly speaking. Further, in order to clearly show the figure, arrows indicating the traces of conversion at points P1 to P3 are not shown. Note that Rlc of the VA mode liquid crystal cell 130 is typically about 320 nm, and generally is adjusted in a range of 270 nm to 400 nm. For example, Rlc is set to be larger than 320 nm in some cases, for the purpose of increasing transmissivity. Nzq of the first and second λ/4 plates 120, 140 is generally adjusted in a range of 1.0 to 2.9. For example, the λ/4 plate satisfying Nzq=2.9 is suitably used, when using the VA mode liquid crystal cell with Rlc set in the vicinity of 400 nm, including no third-type birefringent layer.

Next, as shown in FIG. 6, a circularly polarizing VA mode liquid crystal display device 200 will be considered, which includes the third-type birefringent layer in which a first polarizer (azimuth angle of the absorption axis: 90°) 210, a first λ/4 plate (azimuth angle of the slow axis: 135°) 220, VA mode liquid crystal cell 230, a third-type birefringent layer 235, a second λ/4 plate (azimuth angle of the slow axis: 45°) 240, and a second polarizer (azimuth angle of the absorption axis: 0°) 250 are stacked in this order. Note that in FIG. 6, arrows described in the first and second polarizers 210, 250 indicate azimuths of the absorption axes thereof, and arrows described in the first and second λ/4 plates 220, 240 indicate azimuths of the slow axes thereof, and ellipsoids described in the VA mode liquid crystal cell 230 and the third-type birefringent layer 235 indicate a shape of an optical indicatrix thereof.

First, the polarization state will be considered when the circularly polarizing VA mode liquid crystal display device 200 of FIG. 6 is observed from the front direction. Under this condition, FIG. 7 shows the polarization state on the S1-S2 plane of the Poincare sphere, every time the light emitted from a backlight (although not shown in FIG. 6, the backlight is located below the first polarizer 210) is transmitted through each polarizer 210, 250, each birefringent layer 220, 240, and the liquid crystal cell 230.

First, the polarization state immediately after transmitting through the first polarizer 210 is located at point P0 on the Poincare sphere, and coincides with the polarization state capable of absorbing light by the second polarizer 250 shown by point E, namely, coincides with the extinction point of the second polarizer 250 (coincides with the azimuth of the absorption axis). Then, by transmitting through the first λ/4 plate 220, the polarization state shown by point P0 receives the rotational conversion of a certain angle around the slow axis of the first λ/4 plate 220 shown by point Q1 on the Poincare sphere, and reaches point P1. The rotating direction at this time is counterclockwise when viewed from point Q1 toward original point O.

Next, the light transmits through the VA mode liquid crystal cell 230 and the third-type birefringent layer 235, but the phase differences of the VA mode liquid crystal cell 230 and the third-type birefringent layer 235 is zero in the front direction, and therefore the polarization state is not changed. Finally, by transmitting through the second λ/4 plate 240, the polarization state receives the rotational conversion of a certain angle around the slow axis of the second λ/4 plate 240 shown by point Q2, and reaches point P2. The point P2 coincides with the extinction point E of the second polarizer 250. Thus, similarly to the liquid crystal display device 100 of FIG. 2, the liquid crystal display device 200 of FIG. 6 is capable of cutting off the light from the backlight if being observed from the front direction, and the excellent black display can be obtained.

The polarization state will be considered when the circularly polarizing VA mode liquid crystal display device 200 of FIG. 6 is observed from a direction tilted by 60° at the azimuth angle of 0° of the absorption axis of the second polarizer 210. Under this condition, FIG. 8 shows the polarization state on the S1-S2 plane of the Poincare sphere, every time the light emitted from the backlight is transmitted through each polarizer 210, 250, each birefringent layer 220, 240, and the liquid crystal cell 230.

First, the polarization state immediately after transmitting through the first polarizer 210 is located at point P0 on the Poincare sphere, and coincides with the polarization state capable of absorbing light by the second polarizer 250 shown by point E, namely, coincides with the extinction point of the second polarizer 250 (coincides with the azimuth of the absorption axis). Then, by transmitting through the first λ/4 plate 220, the polarization state shown by point P0 receives the rotational conversion of a certain angle around the slow axis of the first λ/4 plate 220 shown by point Q1 on the Poincare sphere, and reaches point P1. The rotating direction at this time is counterclockwise when viewed from point Q1 toward original point O.

Next, by transmitting through the VA mode liquid crystal cell 230, the polarization state receives the rotational conversion of a certain angle around the slow axes of the liquid crystal cell 230 shown by point L on the Poincare sphere, and reaches point P2. The rotating direction at this time is counterclockwise when viewed from point L toward original point O. Next, by transmitting through the third-type birefringent layer 235, the polarization state receives the rotational conversion of a certain angle around the slow axis of the third-type birefringent layer 235 shown by point R3 on the Poincare sphere, and reaches point P3. The rotating direction at this time is counterclockwise when viewed from point R3 toward original point O. Finally, by transmitting through the second λ/4 plate 240, the polarization state receives the rotational conversion of a certain angle around the slow axis of the second λ/4 plate 240 shown by point Q2, and reaches point P4, and the point P4 coincides with the extinction point E of the second polarizer 250. Thus, similarly to a case of being observed from the front direction, the liquid crystal display device 200 of FIG. 6 is capable of cutting off the light from the backlight in a case of being observed from the oblique direction at the azimuth angle of 0° and at the polar angle of 60°.

Note that in FIG. 7 and FIG. 8, positions of point P1 to point P4 depend on the Nz-coefficient Nzq of the first and second λ/4 plates 220, 240, the phase difference Rlc of the liquid crystal cell 230 in the perpendicular direction, and the phase difference R3 of the third-type birefringent layer 235 in the perpendicular direction, and in FIG. 7 and FIG. 8, a case of Nzq=1.6, and Rlc=320 nm, and R3=−129 nm is shown as an example. The position of each point is shown roughly for easy understanding, which is however sometimes not accurate if strictly speaking. Further, in order to clearly show the figure, arrows indicating the trace regarding the conversion of points P1 to P4 are not shown.

Then, as a result of examination by the inventors of the present invention, it is found that there is an optimal phase difference value R3 of the third-type birefringent layer 235, which depends on the Nz-coefficient Nzq of the first and second λ/4 plates 220, 240. FIG. 9 and FIG. 10 show the polarization state in a case that the circularly polarizing VA mode liquid crystal display device 200 of FIG. 6 is observed from the direction tilted by 60° at the azimuth angle of 0° of the absorption axis of the second polarizer 250 on the S1-S2 plane of the Poincare sphere, wherein FIG. 9 shows a case that Nzq=2.0, Rlc=320 nm, R3=−61 nm, and FIG. 10 shows a case that Nzq=2.35, Rlc=320 nm, R3=0 nm.

As is clarified from FIG. 8, FIG. 9, and FIG. 10, point P1 indicating the polarization state immediately after transmitting through the first λ/4 plate 220, and point P2 indicating the polarization state after further transmitting through the VA mode liquid crystal cell 230, are closer to the points which are symmetric with respect to S1 axis, as the Nz-coefficient Nzq of the first and second λ/4 plates 220, 240 becomes larger. Therefore, an amount of P2→P3 conversion required for superimposing point P4 on point E, namely an absolute value of the required phase difference R3 of the third-type birefringent layer 235, becomes smaller. As described above, Rlc of the VA mode liquid crystal cell 230 is generally adjusted in a range of 270 nm to 400 nm, and therefore when Nzq of the first and second λ/4 plates 220, 240 exceeds 2.00, the required phase difference R3 of the third-type birefringent layer 235 becomes approximately zero. Namely, the third-type birefringent layer 235 can be eliminated. The required phase difference R3 of the third-type birefringent layer becomes approximately zero when Nzq=2.35, with respect to Rlc=320 nm, being a phase difference value of a typical VA mode liquid crystal cell.

Here, Table 2 and FIG. 11 show the results obtained by examining a relation between the Nz-coefficient Nzq of the first and second λ/4 plates 220, 240, and an optimal value of the phase difference R3 of the third-type birefringent layer 235 in the perpendicular direction, based on a computer simulation. In the illustration using the Poincare sphere of FIG. 8, FIG. 9 and FIG. 10, the conversion of the polarization state of point P1→P3 is shown by dividing it into P1→P2 conversion based on the phase difference Rlc of the VA mode liquid crystal cell 230 in the perpendicular direction, and P2→P3 conversion based on the phase difference R3 of the third-type birefringent layer 235 in the perpendicular direction. However, in these two conversions, rotation centers are same, and simply rotating directions are opposite to each other, wherein the rotating direction is determined by a sign of the phase difference in the perpendicular direction, and a rotation angle is determined by the absolute value of the phase difference in the perpendicular direction. Accordingly, it comes to the same thing that the aforementioned two conversions are considered to be a direct P1→P3 conversion based on "total phase difference Rlc+R3 of 'VA mode liquid crystal cell 230+third-type birefringent layer 235' in the perpendicular direction". In other words, if Rlc+R3 are the same values, the optical characteristics of the liquid crystal display device are the same, irrespective of the phase difference Rlc of the VA mode liquid crystal cell 230 in the perpendicular direction. Accordingly, Table 2 shows the results obtained by calculating the optimal value of Rlc+R3 based on the computer simulation. As is clarified from Table 2 and FIG. 11, in the relation between Nzq and optimal Rlc+R3, the following formula (A) gives a sufficiently better approximation in a range of 1.0≤Nzq≤2.9. Solid line shown in FIG. 11 shows the following formula (A).

$$Rlc+R3=169\ nm \times Nzq - 81\ nm \quad (A)$$

From a viewpoint of realizing a liquid crystal display with high contrast ratio in a wider viewing angle range, Rlc+R3, being a sum of the phase difference Rlc of the VA mode liquid crystal cells 230 in the perpendicular direction at a black display time (when the voltage is not applied to the liquid crystal layer) and the phase difference R3 of the third-type birefringent layer 235 in the perpendicular direction, is preferably the optimal value shown in Table 2 and FIG. 11, although it may be slightly deviated from the optimal value if within a range not largely reducing the contrast ratio from the oblique viewing angle, and is preferably within a range of ±30 nm of the optimal value from a viewpoint of showing the effect of the present invention sufficiently.

TABLE 2

| Nzq | Rlc + R3 (nm) |
|---|---|
| 1.00 | 88 |
| 1.10 | 105 |
| 1.20 | 122 |
| 1.30 | 140 |
| 1.40 | 157 |
| 1.50 | 174 |
| 1.60 | 191 |
| 1.70 | 208 |
| 2.00 | 259 |
| 2.30 | 309 |
| 2.40 | 325 |
| 2.50 | 342 |
| 2.90 | 406 |

(Compensation Principle of the Second Step)

First, the following case is considered: namely, the liquid crystal display device 200 of FIG. 6 that has undergone the first step is observed from a direction tilted by 60° at the azimuth angle of 45°, being the azimuth bisecting the azimuth angle of 90° of the absorption axis of the first polarizer 210 and the azimuth angle of 0° of the absorption axis of the second polarizer 250. As described above, in the first step, optical compensation is implemented for the liquid crystal display device 200 at the azimuth angle of 0°, by selecting optimal values of the phase difference Rlc of the liquid crystal cell 230 in the perpendicular direction, and the phase difference R3 of the third-type birefringent layer 235 in the perpendicular direction, which depend on the Nz-coefficient Nzq of the first and second λ/4 plates 220, 240. Under this condition, FIG. 12 shows the polarization state on the S1-S2 plane of the Poincare sphere, every time the light emitted from the backlight is transmitted through each polarizer 210, 250, each birefringent layer 220, 240, and the liquid crystal cell 230.

First, the polarization state immediately after transmitting through the first polarizer 210 is located at point P0 on the Poincare sphere, which does not coincide with the polarization state capable of absorbing light by the second polarizer 250 shown by point E, namely, does not coincide with the extinction point (does not coincide with the azimuth of the absorption axis) of the second polarizer 250. In the oblique direction at the azimuth angle of 45°, the first and second polarizers 210, 250 are not orthogonally crossing each other, thus indicating that the optical compensation is required. Then, by transmitting through the first λ/4 plate 220, the polarization state located at point P0 receives the rotational conversion of a certain angle around the slow axis of the first λ/4 plate 220 shown by point Q1 on the Poincare sphere, and reaches point P1. The rotating direction at this time is counterclockwise when viewed from point Q1 toward original point O.

Next, by transmitting through the VA mode liquid crystal cell 230, the polarization state receives the rotational conversion of a certain angle around the slow axes of the liquid crystal cell 230 shown by point L on the Poincare sphere, and reaches point P2. The rotating direction at this time is counterclockwise when viewed from point L toward original point O. Next, by transmitting through the third-type birefringent layer 235, the polarization state receives the rotational conversion of a certain angle around the slow axis of the third-type birefringent layer 235 shown by point R3 on the Poincare sphere, and reaches point P3. The rotating direction at this time is counterclockwise when viewed from point R3 toward original point O. Finally, by transmitting through the second λ/4 plate 240, the polarization state receives the rotational conversion of a certain angle around the slow axis of the second λ/4 plate 240 shown by point Q2, and reaches point P4. The point P4 does not coincide with the extinction point E of the second polarizer 250. Thus, the liquid crystal display device 200 of FIG. 6 can't cut off the light from the backlight, when being observed from the oblique direction at the azimuth angle of 45° and at the polar angle of 60°. Specifically, at the azimuth angle of 45°, the optical compensation is not implemented for the liquid crystal display device 200 that has just undergone the first step.

Note that positions of point P1 to point P4 in FIG. 12 depend on the Nz-coefficient Nzq of the first and second λ/4 plates 220, 240, the phase difference Rlc of the liquid crystal cell 230 in the perpendicular direction, and the phase difference R3 of the third-type birefringent layer 235 in the perpendicular direction. In FIG. 12, a case of Nzq=1.6, and Rlc=320 nm, R3=−129 nm is shown as an example. The position of each point is shown roughly for easy understanding, which is however sometimes not accurate if strictly speaking. Further, in order to clearly show the figure, arrows indicating the trace of the conversion at points P1 to P4 are not shown.

Next, as shown in FIG. 13, the circularly polarizing VA mode liquid crystal display device 300 will be considered, which includes the second-type birefringent layer in which a first polarizer (azimuth angle of the absorption axis: 90°) 310, a first λ/4 plate (azimuth angle of the slow axis: 135°) 320, VA mode liquid crystal cell 330, a third-type birefringent layer 335, a second λ/4 plate (azimuth angle of the slow axis: 45°) 340, a second-type birefringent layer (azimuth angle of the fast axis: 90°) 345, and a second polarizer (azimuth angle of the absorption axis: 0°) 350 are stacked in this order. The second-type birefringent layer is added to the structure of FIG. 6 for implementing the optical compensation at the azimuth angle of 45°. Note that in FIG. 13, arrows described in the first and second polarizers 310, 350 indicate the azimuths of the absorption axes thereof, and arrows described in the first and second λ/4 plates 320, 340 indicate the azimuths of the slow axes thereof, and arrows described in the second-type birefringent layer 345 indicate the azimuth of the fast axis thereof, and ellipsoids described in the VA mode liquid crystal cell 330 and the third-type birefringent layer 335 indicate a shape of an optical indicatrix thereof.

First, the polarization state when the circularly polarizing VA mode liquid crystal display device 300 of FIG. 13 is observed from the front direction, will be considered. FIG. 14 shows the polarization state on the S1-S2 plane of the Poincare sphere, every time the light emitted from the backlight (in FIG. 13, although not shown, the backlight is located below the first polarizer 310) is transmitted through each polarizer 310, 350, each birefringent layer 320, 340, and the liquid crystal cell 330.

First, the polarization state immediately after transmitting through the first polarizer 310 is located at point P0 on the Poincare sphere, and coincides with the polarization state capable of absorbing light by the second polarizer 350 shown by point E, namely, coincides with the extinction point (coincides with the azimuth of absorption axis) of the second polarizer 350. Then, by transmitting through the first λ/4 plate 320, the polarization state located at point P0 receives the rotational conversion of a certain angle around the slow axis of the first λ/4 plate 320 shown by point Q1 on the Poincare sphere, and reaches point P1. The rotating direction at this time is counterclockwise when viewed from point Q1 toward original point O.

Next, although transmitting through the VA mode liquid crystal cell 330 and the third-type birefringent layer 335, the phase differences of the VA mode liquid crystal cell 330 and the third-type birefringent layer 335 is zero in the front direction, and therefore the polarization state is not changed. Next, by transmitting through the second λ/4 plate 340, the polarization state receives the rotational conversion of a certain angle around the slow axis of the second λ/4 plate 340 shown by point Q2, and reaches point P2. Finally, although transmitting through the second-type birefringent layer 345, the polarization state located at point P2 is not changed from point P2, even if receiving the rotational conversion of a certain angle around the fast axis of the second-type birefringent layer 345 shown by point R2 on the Poincare sphere. Then, the point P2 coincides with the extinction point E of the second polarizer 350. Thus, the liquid crystal display device 300 of FIG. 13 can cut off the light from the backlight, similarly to the liquid crystal display device 100 of FIG. 2 if being observed from the front direction, and the excellent black display can be obtained.

Then, the polarization state of the circularly polarizing VA mode liquid crystal display device 300 of FIG. 13 will be considered when being observed from the direction tilted by 60° at the azimuth angle of 45°. Under this condition, FIG. 15 shows the polarization state on the S1-S2 plane of the Poincare sphere, every time the light emitted from the backlight transmits through each polarizer 310, 350, each birefringent layer 320, 340, and the liquid crystal cell 330.

First, the polarization state is located at point P0 on the Poincare sphere immediately after transmitting through the first polarizer 310, and does not coincide with the polarization state capable of absorbing light by the second polarizer 350 shown by point E, namely, does not coincide with the extinction point (does not coincide the azimuth of the absorption axis) of the second polarizer 350. Then, by transmitting through the first λ/4 plate 320, the polarization state located at point P0 receives the rotational conversion of a certain angle around the slow axis of the first λ/4 plate 320 shown by point Q1 on the Poincare sphere, and reaches point P1. The rotating direction at this time is counterclockwise when viewed from point Q1 to original point O.

Next, by transmitting through the VA mode liquid crystal cell 330, the polarization state receives the rotational conversion of a certain angle around the slow axes of the liquid crystal cell 330 shown by point L on the Poincare sphere, and reaches point P2. The rotating direction at this time is counterclockwise when viewed from point L toward original point O. Next, by transmitting through the third-type birefringent layer 335, the polarization state receives the rotational conversion of a certain angle around the slow axis of the third-type birefringent layer 335 shown by point R3 on the Poincare sphere, and reaches point P3. The rotating direction at this time is counterclockwise when viewed from point R3 toward original point O. Next, by transmitting through the second λ/4 plate 340, the polarization state receives the rotational conversion of a certain angle around the slow axis of the second λ/4 plate 340 shown by point Q2, and reaches point P4. Finally, by transmitting through the second-type birefringent layer 345, the polarization state receives the rotational conversion of a certain angle around the fast axis of the second-type birefringent layer 345 shown by point R2 on the Poincare sphere, and reaches point P5. The rotating direction at this time is counterclockwise when viewed from point R2 toward original point O. The point P5 coincides with the extinction point E of the second polarizer 350. Thus, similarly to the case that the liquid crystal display device is observed from the front direction, the liquid crystal display device 300 of FIG. 13 can cut off the light from the backlight even when being observed from the oblique direction at the azimuth angle of 45° and at the polar angle of 60°.

Finally, the polarization state of the circularly polarizing VA mode liquid crystal display device 300 of FIG. 13 will be considered, when being observed from the direction tilted by 60° at the azimuth angle of 0°. Under this condition, FIG. 16 shows the polarization state on the S1-S2 plane of the Poincare sphere every time the light emitted from the backlight is transmitted through each polarizer 310, 350, each birefringent layer 320, 340, and the liquid crystal cell 330.

First, the polarization state immediately after transmitting through the first polarizer 310 is located at point P0 on the Poincare sphere, and coincides with the polarization state capable of absorbing light by the second polarizer 350 shown by point E, namely, coincides with the extinction point (coincides with the azimuth of the absorption axis) of the second polarizer 350. Then, by transmitting through the first λ/4 plate 320, the polarization state located at point P0 receives the rotational conversion of a certain angle around the slow axis of the first λ/4 plate 320 shown by point Q1 on the Poincare sphere, and reaches point P1. The rotating direction at this time is counterclockwise when viewed from point Q1 toward original point O.

Next, by transmitting through the VA mode liquid crystal cell 330, the polarization state receives the rotational conversion of a certain angle around the slow axes of the liquid crystal cell 330 shown by point L on the Poincare sphere, and reaches point P2. The rotating direction at this time is counterclockwise when viewed from point L toward original point O. Next, by transmitting through the third-type birefringent layer 335, the polarization state receives the rotational conversion of a certain angle around the slow axis of the third-type birefringent layer 335 shown by point R3 on the Poincare sphere, and reaches point P3. The rotating direction at this time is counterclockwise when viewed from point R3 toward original point O. Next, by transmitting through the second λ/4 plate 340, the polarization state receives the rotational conversion of a certain angle around the slow axis of the second λ/4 plate 340 shown by point Q2, and reaches point P4. Finally, although transmitting through the second-type birefringent layer 345, the polarization state located at point P4 is not changed from the point P4 even when receiving the rotational conversion of a certain angle around the fast axis of the second-type birefringent layer 345 shown by point R2 on the Poincare sphere, and the point P4 coincides with the extinction point E of the second polarizer 350. Thus, similarly to the liquid crystal display device observed from the front direction, the liquid crystal display device 300 of FIG. 13 can cut off the light from the backlight, even if being observed from the oblique direction at the azimuth angle of 0° and at the polar angle of 60°, and the excellent black display can be obtained.

Thus, the liquid crystal display device 300 of FIG. 13 that has just finished the second step, can cut off the light from the backlight in all directions of the front direction, the oblique direction at the azimuth angle of 0°, and the oblique direction at the azimuth angle of 45°. Thus, the excellent black display can be obtained.

Note that in FIG. 14, FIG. 15, and FIG. 16, positions of point P1 to point P5 depend on the Nz-coefficient Nzq of the first and second λ/4 plates 320, 340, the phase difference Rlc of the liquid crystal cell 330 in the perpendicular direction, the phase difference R3 of the third-type birefringent layer 335 in the perpendicular direction, the Nz-coefficient Nz2, and in-plane phase difference R2 of the second-type birefringent layer 345. However, FIG. 14, FIG. 15, and FIG. 16 show a case that Nzq=1.6, Rlc=320 nm, R3=−129 nm, Nz2=−0.30, and R2=118 nm as an example. The position of each point is shown roughly for easy understanding, which is however sometimes not accurate if strictly speaking. Further, in order to clearly show the figure, arrows indicating the trace of the conversion at points P1 to P5 are not shown.

Then, as a result of the examination by the inventors of the present invention, it is found that there are optimal Nz-coefficient Nz2 and phase difference value R2 of the second-type birefringent layer 345, depending on the Nz-coefficient Nzq of the first and second λ/4 plates 320, 340. FIG. 17 and FIG. 18 show the polarization state on the S1-S2 plane of the Poincare sphere when the circularly polarizing VA mode liquid crystal display device 300 in FIG. 13 is observed from the direction tilted by 60° at the azimuth angle of 45° of the absorption axis of the second polarizer 350, wherein FIG. 17 shows a case that Nzq=2.0, Rlc=320 nm, R3=−61 nm, Nz2=−1.00, and R2=94 nm, and FIG. 18 shows a case that Nzq=2.35, Rlc=320 nm, R3=0 nm, Nz2=−1.80, and R2=90 nm.

As is clarified from FIG. 16, FIG. 17, and FIG. 18, point P4 showing the polarization state immediately before transmitting through the second-type birefringent layer 345 is away from point E, being the extinction point, as the Nz-coefficient Nzq of the first and second λ/4 plates 320, 340 becomes larger. Therefore, a rotation radius of P4→P5 conversion required for superimposing point P4 on point E needs to be large. As a result of the examination by the inventors of the present invention, biaxiality of the second-type birefringent layer 345 needs to be increased for making the rotation radius large. Namely, the Nz-coefficient needs to be smaller.

Here, Table 3, FIG. 19, and FIG. 20 show the relation between the Nz-coefficient Nzq of the first and second λ/4 plates 320, 340, and the optimal values of the Nz-coefficient Nz2 and the in-plane phase difference R2 of the second-type birefringent layer 345. As is clarified from the Table 3, FIG. 19, and FIG. 20, although not being simple generally, the following formulas (B) and (C) give a sufficiently good approximation to the optimal relation between Nzq and optimal Nz2, R2, in a range of 1.0≤Nzq≤2.9. The solid line shown in FIG. 19 and FIG. 20 show this fact.

$$Nz2 = -0.63 \times Nzq^2 + 0.56 \times Nzq + 0.40 \quad (B)$$

$$R2 = 43 \text{ nm} \times Nzq^2 - 226 \text{ nm} \times Nzq + 370 \text{ nm} \quad (C)$$

From the viewpoint of realizing the liquid crystal display with high contrast ratios in a wider viewing angle range, Nz2 and R2 of the second-type birefringent layer 345 are preferably the optimal values shown in Table 3, FIG. 19, and FIG. 20, but may be slightly deviated from the optimal values within a range not largely reducing the contrast ratio at the oblique viewing angle. From the viewpoint of sufficiently exhibiting the effect of the present invention, Nz2 is preferably in a range of ±0.35 of the optimal value, and R2 is preferably in a range of ±30 nm of the optimal value.

Further, according to the Table 3 and FIG. 19, the optimal value of Nz2 is in a range of 0<Nz2<1 wherein Nzq<1.40. The birefringent layer showing the Nz-coefficient in this range is a biaxial phase difference film satisfying the relation of nx>nz>ny, not corresponding to the second-type birefringent layer, and is an expensive film more difficult to be manufactured than the second-type birefringent layer. Note that it is preferable to satisfy 1.40≤Nzq in a point that the aforementioned point is solved. The inventors of the present invention examine a method for easily realizing the liquid crystal display with high contrast ratios in a wider viewing angle range at a low cost, in a range of Nzq<1.40. As a result, it is found that in the range of Nzq<1.40, similar effect can be sufficiently exhibited if the second-type birefringent layer satisfying Nz2=0, R2=138 nm is used, instead of the birefringent layer satisfying optimal Nz2, R2 shown in Table 3, FIG. 19, and FIG. 20. For example, when optimal R2 is calculated with Nz2 fixed to Nz2=0 in each example of Nzq=1.00, 1.10, 1.20, 1.30, the optimal R2 is 138 nm in any one of them, irrespective of Nzq. From the viewpoint of sufficiently exhibiting the effect of the present invention, it is preferable to satisfy −0.35≤Nz2≤0, and 108 nm≤R2≤168 nm (a range of ±30 nm of the optimal value 138 nm).

TABLE 3

| Nzq | Nz2 | R2 (nm) |
|---|---|---|
| 1.00 | 0.35 | 186 |
| 1.10 | 0.25 | 169 |
| 1.20 | 0.15 | 154 |
| 1.30 | 0.10 | 148 |
| 1.40 | −0.05 | 134 |
| 1.50 | −0.15 | 127 |
| 1.60 | −0.30 | 118 |
| 1.70 | −0.45 | 111 |
| 2.00 | −1.00 | 94 |
| 2.30 | −1.65 | 81 |
| 2.40 | −1.90 | 78 |
| 2.50 | −2.15 | 75 |
| 2.90 | −3.20 | 66 |

Also, as a result of similarly examining the aforementioned embodiment (2) wherein the second-type birefringent layer is arranged on both sides of the liquid crystal cell, it is found that there are optimal Nz-coefficient Nz2 and phase difference value R2 of the first and second second-type birefringent layer, which depend on the Nz-coefficient Nzq of the first and second λ/4 plates.

Table 4, FIG. 21, and FIG. 22 show the results obtained by examining the relation between the Nz-coefficient Nzq of the first and second λ/4 plates, and the optimal values of the Nz-coefficient Nz2 and in-plan phase difference R2 of the first and second second-type birefringent layers. As is clarified from the Table 4, FIG. 21, and FIG. 22, although not being simple generally, the following formulas (D) and (E) give a sufficiently good approximation to the optimal relation between Nzq and optimal Nz2, R2, in a range of 1.0≤Nzq≤2.9. The solid line shown in FIG. 21 and FIG. 22 show this fact.

$$Nz2 = -0.87 \times Nzq^2 + 2.15 \times Nzq + 0.76 \quad (D)$$

$$R2 = 25 \text{ nm} \times Nzq^2 - 159 \text{ nm} \times Nzq + 311 \text{ nm} \quad (E)$$

From the viewpoint of realizing the liquid crystal display with high contrast ratios in a wider viewing angle range, Nz2 and R2 of the first and second second-type birefringent layers are preferably optimal values shown in Table 4, FIG. 21, and FIG. 22, but may be slightly deviated from the optimal values within a range not largely reducing the contrast ratio at the oblique viewing angle. From the viewpoint of sufficiently exhibiting the effect of the present invention, Nz2 is preferably in a range of ±0.45 of the optimal value, and R2 is preferably in a range of ±40 nm of the optimal value.

Further, according to the Table 4 and FIG. 21, the optimal value of Nz2 is in a range of 0<Nz2<1 wherein Nzq<2.00. The birefringent layer showing the Nz-coefficient in this range is the biaxial phase difference film satisfying the relation of nx>nz>ny, not corresponding to the second-type birefringent layer, and is an expensive film more difficult to be manufactured than the second-type birefringent layer. Note that it is preferable to satisfy 2.00≤Nzq in the point that the aforementioned point is solved. The inventors of the present invention examine a method for easily realizing the liquid crystal display with high contrast ratios in a wider viewing angle range at a low cost, in a range of Nzq<2.00. As a result, it is found that in the range of Nzq<2.00, the viewing angle characteristic can be effectively improved in a range not using the biaxial phase difference film controlled to satisfy nx>nz>ny (0<Nz<1) if the second-type birefringent layer satisfying Nz2=0 is used instead of the birefringent layer satisfying optimal Nz2, R2 shown in Table 4, FIG. 21, and FIG. 22. Table 4 and FIG. 23 show that optimal R2 depending on each Nzq is set as R2'. From the viewpoint of sufficiently exhibiting the effect of the present invention, it is preferable to satisfy −0.45≤Nz2≤0, and 5 nm≤R2'≤133 nm (a range of ±40 nm of the optimal value).

TABLE 4

| Nzq | Nz2 | R2 (nm) | R2' (nm) |
|---|---|---|---|
| 1.0 | 0.65 | 180 | 45 |
| 1.1 | 0.60 | 162 | 53 |
| 1.2 | 0.60 | 158 | 60 |
| 1.3 | 0.55 | 147 | 65 |
| 1.4 | 0.50 | 138 | 71 |
| 1.5 | 0.40 | 123 | 75 |
| 1.6 | 0.35 | 118 | 80 |
| 1.7 | 0.25 | 108 | 84 |
| 2.0 | −0.05 | 89 | 93 |
| 2.3 | −0.40 | 77 | |
| 2.4 | −0.55 | 73 | |
| 2.5 | −0.70 | 69 | |
| 2.6 | −0.80 | 68 | |
| 2.7 | −1.00 | 64 | |
| 2.8 | −1.40 | 59 | |
| 2.9 | −2.45 | 49 | |

Each of the aforementioned embodiments may be combined in a range not departing from the gist of the present invention.

Effects of the Invention

According to the present invention, a circularly polarizing VA mode liquid crystal display device with excellent gray scale viewing angle from an intermediate gray scale to a high gray scale at the azimuth angle of 45°, can be provided. The liquid crystal display device of the present invention can be suitably used for a display device such as an outdoor signage display.

BRIEF DESCRIPTION OF THE DRAWINGS

FIG. 39 is a perspective exploded view showing a structure in which the moss-eye film is added to the circularly polarizing VA mode liquid crystal display device of FIG. 12.

Figure 1:
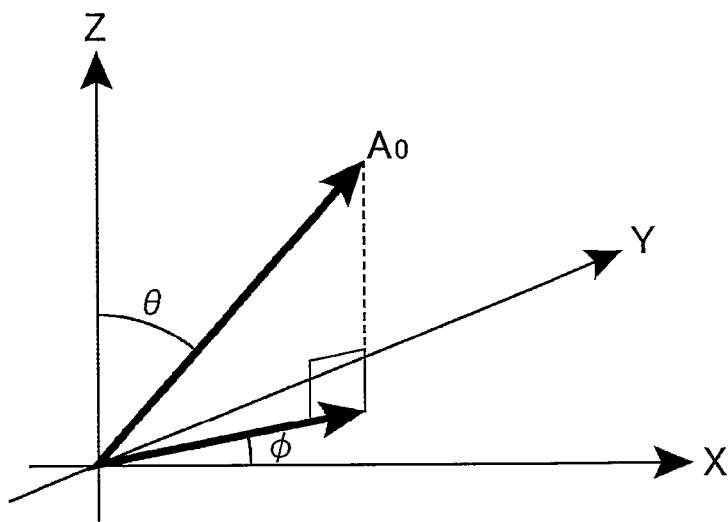
FIG. 1 is a view describing azimuth angle φ and polar angle θ with respect to a direction $A_0$ of a tilting alignment of liquid crystal molecules.
Figure 2:
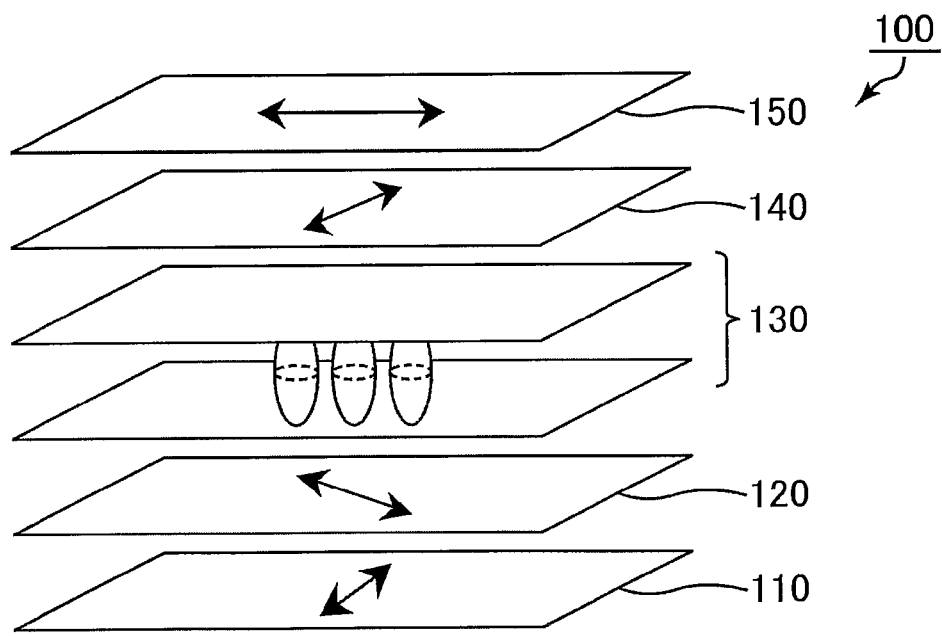
FIG. 2 is a perspective exploded view showing a structure of a circularly polarizing VA mode liquid crystal display device with a simplest structure not including second-type and third-type birefringent layers.
Figure 3:
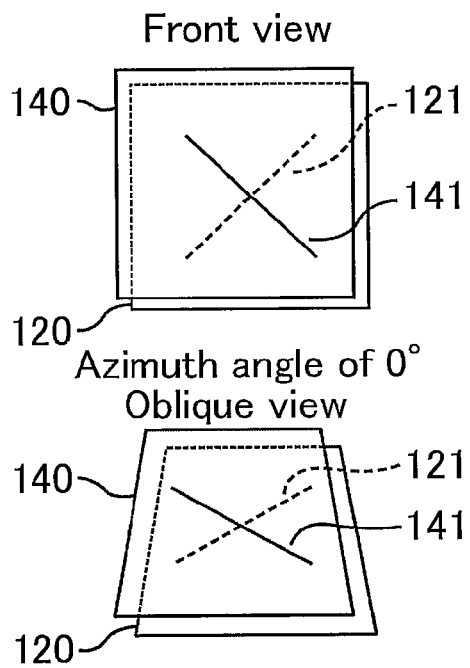
FIG. 3(a) is an upper schematic view showing a slow axis of a first λ/4 plate and a slow axis of a second λ/4 plate orthogonally crossing each other viewed from a front direction, and a lower schematic view showing them viewed from an oblique direction at the azimuth angle of 0°.
FIG. 3(b) is an upper schematic view showing the slow axis of the first λ/4 plate and the slow axis of the second λ/4 plate orthogonally crossing each other viewed from the front direction, and a lower schematic view showing them viewed from the oblique direction at the azimuth angle of 45°.
FIG. 3(c) is an upper schematic view showing an absorption axis of a first polarizer and an absorption axis of a second polarizer orthogonally crossing each other viewed from the front direction, and a lower schematic view showing them viewed from the oblique direction at the azimuth angle of 45°.
Figure 3:
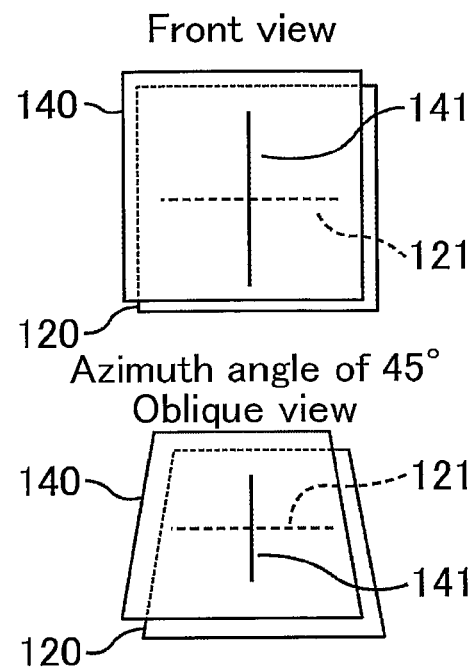
Figure 3:
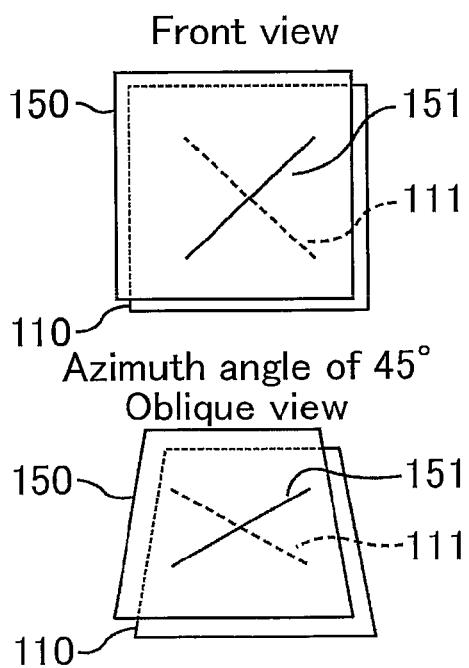
Figure 4:
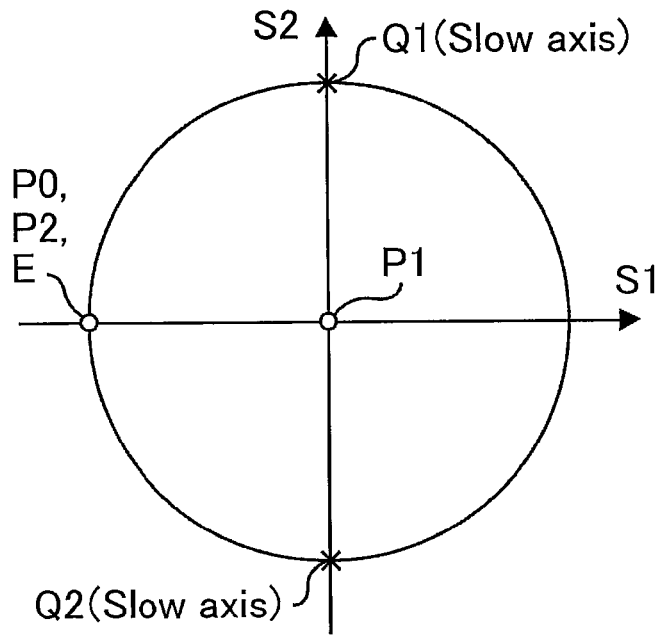
FIG. 4 is a view showing a state that a polarization state of a transmitted light is changed every time it passes through each member, projected on a S1-S2 plane of a Poincare sphere in the circularly polarizing VA mode liquid crystal display device of FIG. 2, observed from a front direction.
Figure 5:
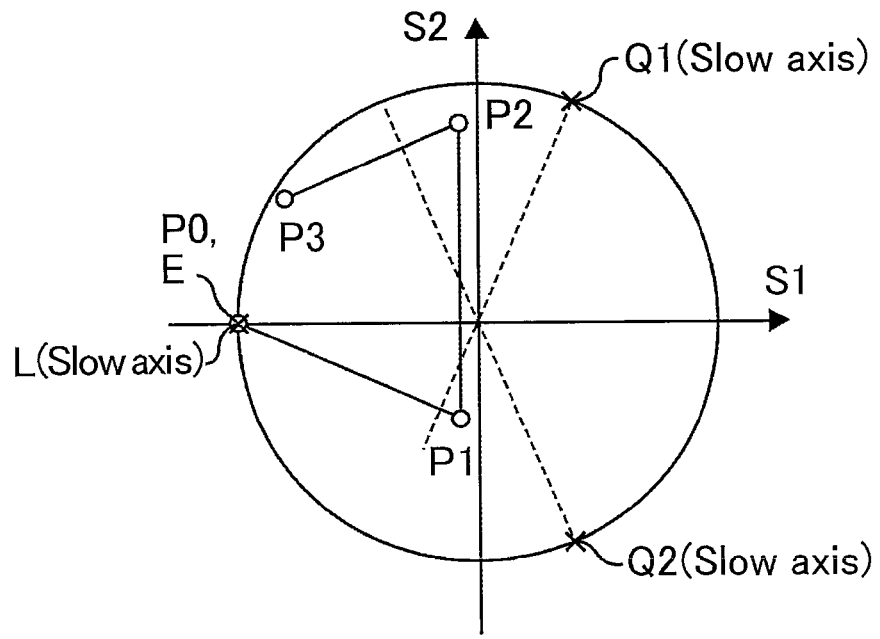
FIG. 5 is a view showing a state that a polarization state of a transmitted light is changed every time it passes through each member, projected on the S1-S2 plane of the Poincare sphere in the circularly polarizing VA mode liquid crystal display device of FIG. 2, observed from an oblique direction at the azimuth angle of 0° and at the polar angle of 60°.
Figure 6:
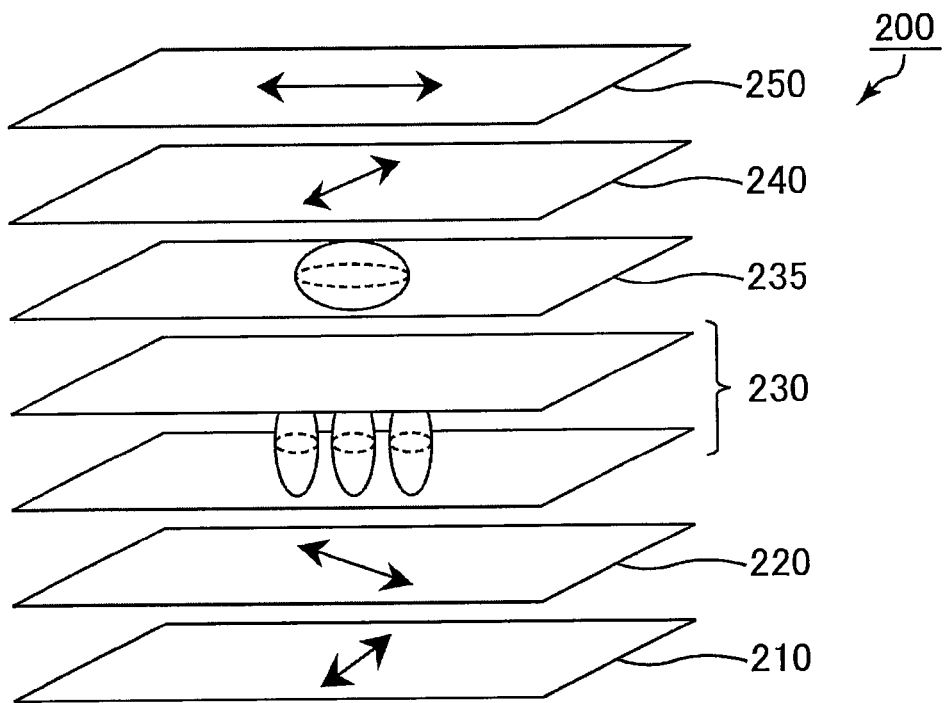
FIG. 6 is a perspective exploded view showing a structure of the circularly polarizing VA mode liquid crystal display device including a third-type birefringent layer.
Figure 7:
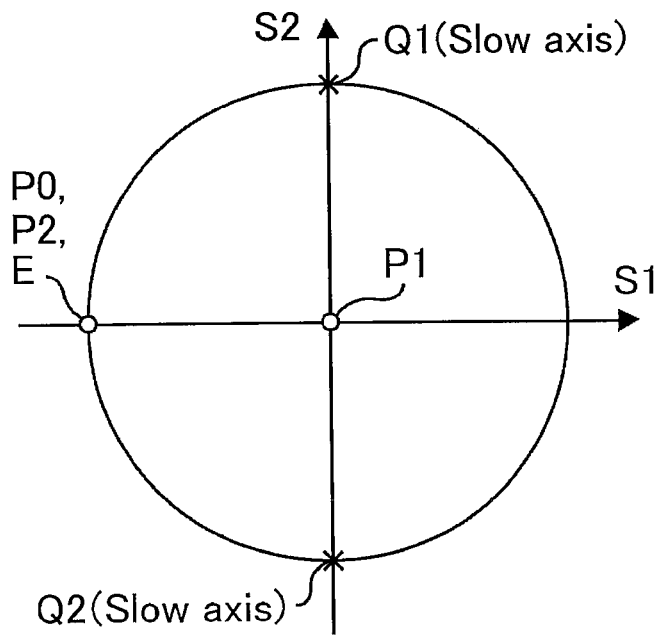
FIG. 7 is a view showing a state that a polarization state of a transmitted light is changed every time it passes through each member, projected on the S1-S2 plane of the Poincare sphere in the circularly polarizing VA mode liquid crystal display device of FIG. 6 (in a case that Nzq=1.6, Rlc=320 nm, R3=−129 nm), observed from the front direction.
Figure 8:
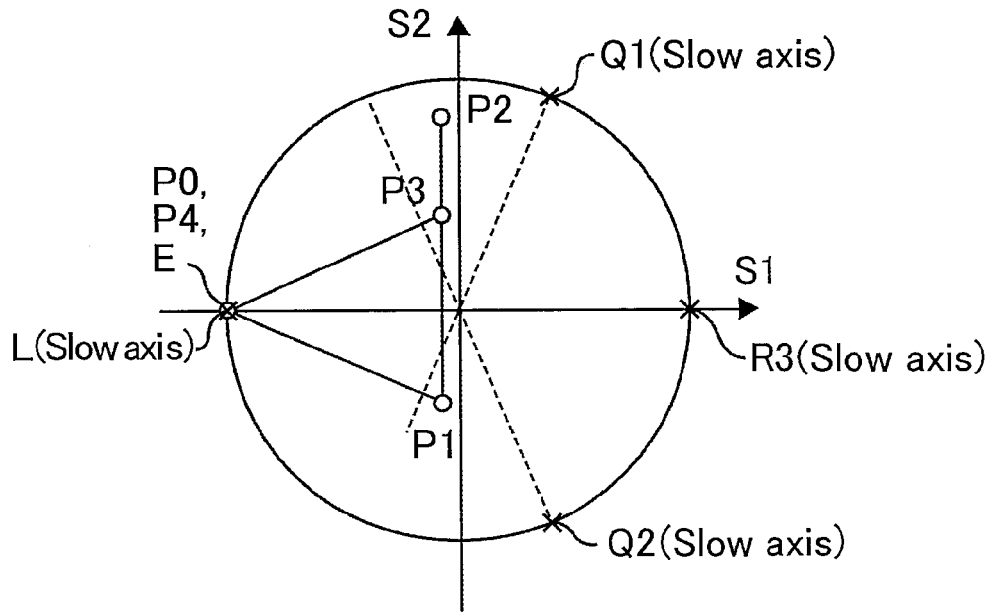
FIG. 8 is a view showing a state that a polarization state of a transmitted light is changed every time it passes through each member, projected on the S1-S2 plane of the Poincare sphere in the circularly polarizing VA mode liquid crystal display device of FIG. 6 (in a case that Nzq=1.6, Rlc=320 nm, R3=−129 nm), observed from the oblique direction at the azimuth angle of 0° and at the polar angle of 60°.
Figure 9:
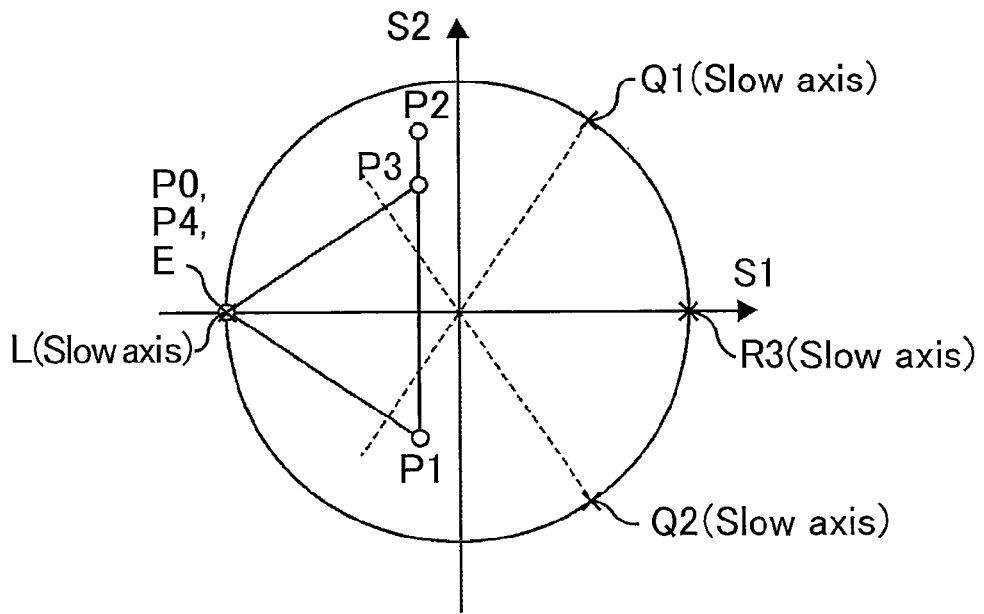
FIG. 9 is a view showing a state that a polarization state of a transmitted light is changed every time it passes through each member, projected on the S1-S2 plane of the Poincare sphere in the circularly polarizing VA mode liquid crystal display device of FIG. 6 (in a case that Nzq=2.0, Rlc=320 nm, R3=−61 nm), observed from the oblique direction at the azimuth angle of 0° and at the polar angle of 60°.
Figure 10:
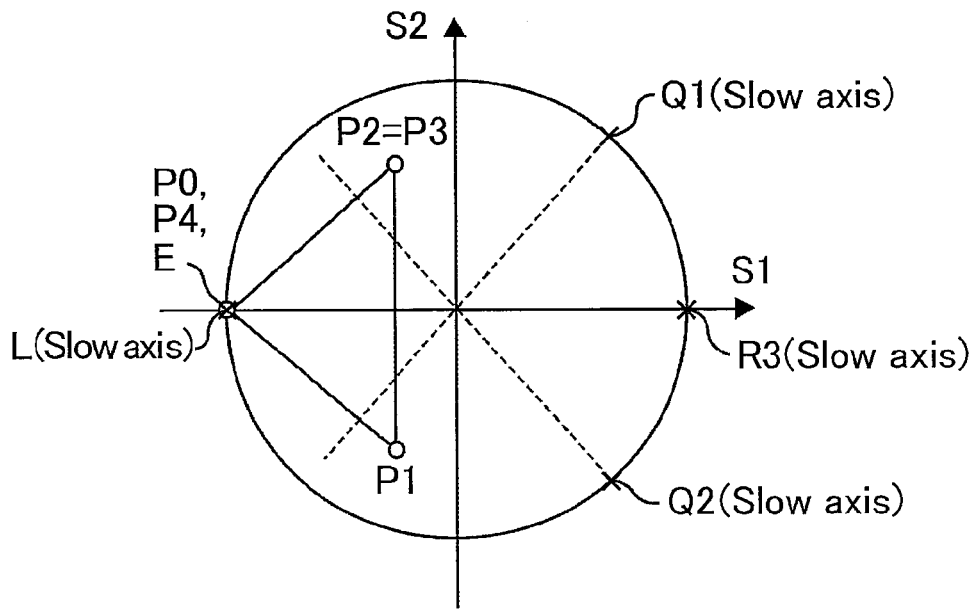
FIG. 10 is a view showing a state that a polarization state of a transmitted light is changed every time it passes through each member, projected on the S1-S2 plane of the Poincare sphere in the circularly polarizing VA mode liquid crystal display device of FIG. 6 (in a case that Nzq=2.35, Rlc=320 nm, R3=−61 nm), observed from the oblique direction at the azimuth angle of 0° and at the polar angle of 60°.
Figure 11:
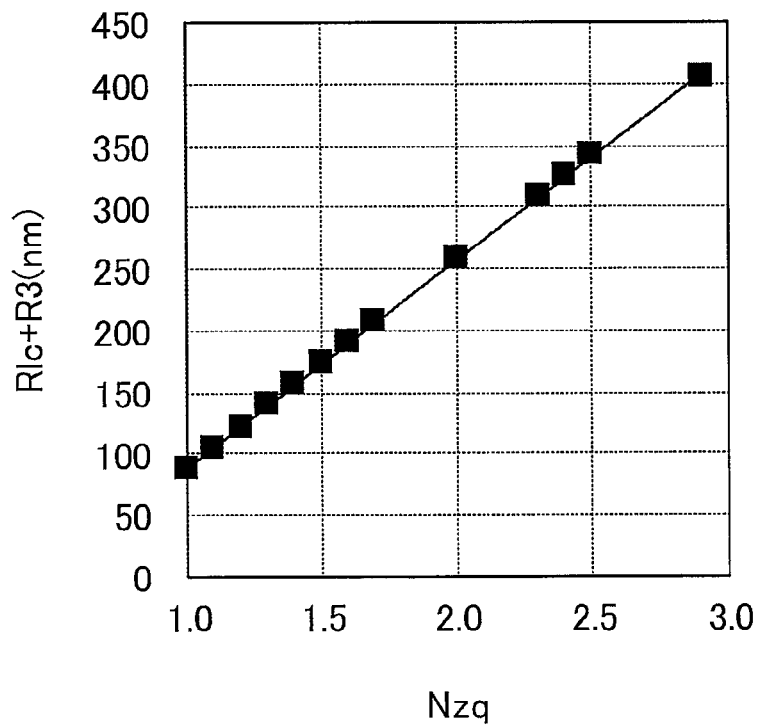
FIG. 11 is a graph showing a relation between a Nz-coefficient Nzq of first and second λ/4 plates, and an optimal value of a phase difference R3 of a third-type birefringent layer in a perpendicular direction in the circularly polarizing VA mode liquid crystal display device of FIG. 6.
Figure 12:
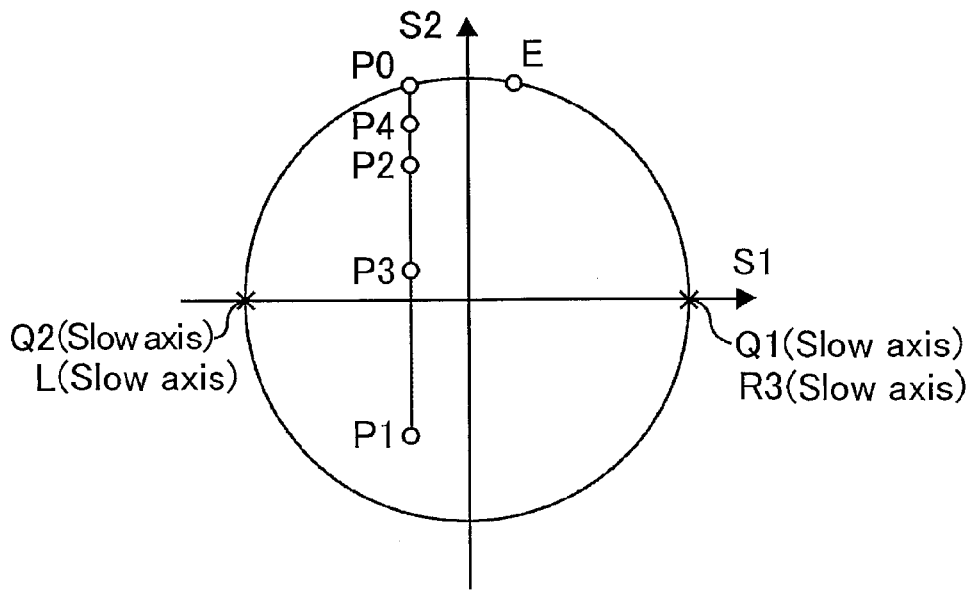
FIG. 12 is a view showing a state that a polarization state of a transmitted light is changed every time it passes through each member, projected on the S1-S2 plane of the Poincare sphere in the circularly polarizing VA mode liquid crystal display device of FIG. 6, observed from the oblique direction at the azimuth angle of 45° and at the polar angle of 60°.

MODE FOR CARRYING OUT THE INVENTION (Birefringent Layer)

A material and an optical characteristic of a birefringent layer used for the present invention is not particularly limited, and for example, a stretched polymer film, a liquid crystal material with a fixed alignment, and a thin plate made of an inorganic material, can be used. A forming method of the birefringent layer is not particularly limited. In a case of the birefringent layer formed of the polymer film, for example, a solvent casting method and a melt extrusion method, etc., can be used. Further, a method for simultaneously forming a plurality of birefringent layers by a coextrusion method may also be used. The film may not be stretched or may be stretched, provided that a desired phase difference appears. A stretching method is not particularly limited, and an inter-roll tension stretching method, an inter-roll compression stretching method, a tenter transverse-uniaxial stretching method, an oblique stretching method, a vertical transverse-biaxial stretching method, and in addition, a specialized stretching method for stretching a film under an action of a shrinkage force of a heat-shrinkable film, can be used. Particularly, regarding λ/4 plates, the oblique stretching method is particularly preferably used, wherein a roll film is stretched and aligned in an oblique direction with respect to a flowing direction of the film, because the λ/4 plates are stacked at a relative angle of approximately 45° with respect to a polarizer to thereby form a circularly polarizing plate. Further, in a case of the birefringent layer formed of the liquid crystal material, for example, a method for applying alignment treatment to a base film; then coating the base film with the liquid crystal material; and fixing the alignment of the liquid crystal material, can be used. It is also acceptable to use a method for not applying a special alignment treatment to the base film if only a desired phase difference appears, or a method for fixing the alignment and thereafter peeling off the liquid crystal material from the base film, and transferring it to another film. Further, it is also acceptable to use a method for not fixing the alignment of the liquid crystal material. Further, even in a case of the birefringent layer formed of a non-liquid crystal material, a method similar to the method for forming the birefringent layer made of the liquid crystal material, may be used. Further specific explanation will be given hereafter for the birefringent layer grouped by type.

(First-Type Birefringent Layer: First and Second λ/4 Plates)

A first-type birefringent layer can be suitably obtained by stretching a film containing a material with positive intrinsic birefringence as a component. For example, polycarbonate, polysulfone, polyether sulfone, polyethylene-telephthalate, polyethylene, polyvinyl alcohol, norbornene, triacetylcellulose, and cellulose diacetate, etc., can be given as the material with positive intrinsic birefringence.

(Second-Type Birefringent Layer)

A second-type birefringent layer can be suitably obtained by stretching a film containing a material with negative intrinsic birefringence as a component, or by stretching the film containing a material with positive intrinsic birefringence as a component under action of a shrinkage force of a heat-shrinkable film. Above all, from a viewpoint of simplifying a manufacturing method, a stretched film containing the material with negative intrinsic birefringence as a component is preferably used. For example, a resin composition including acrylic resin and styrene resin, polystyrene, polyvinyl naphthalene, polyvinyl biphenyl, polyvinyl pyridine, polymethyl methacrylate, polymethyl acrylate, N-substituted maleimide copolymer, polycarbonate having a fluorine skeleton, triacetyl cellulose (particularly having a small acelylation degree), etc., can be given as the material with negative intrinsic birefringence. Above all, from a viewpoint of the optical characteristic, productivity, and heat-resistance property, a resin composition including acrylic resin and styrene resin is preferable. For example, Japanese Patent Application Laid-Open No. 2008-146003 discloses a manufacturing method of the film containing such a resin composition as a component.
(Third-Type Birefringent Layer)

A third-type birefringent layer can be suitably obtained by applying a vertical/transverse-biaxial stretching treatment to the film containing the material with positive intrinsic birefringence as a component. Further, the third-type birefringent layer coated with a liquid crystal material such as cholesteric (chiral nematic) liquid crystal and discotic liquid crystal, or coated with a non-liquid crystal material such as polyimide and polyamide, can be suitably used.
(Polarizer)

For example, a polarizer having an anisotropic material such as an iodine complex having dichroism adsorbed and aligned on a polyvinyl alcohol (PVA) film, can be suitably used.
(Liquid Crystal Cell)

A liquid crystal cell is formed as an domain division type VA mode, in which tilt directions of liquid crystal molecules are divided into a plurality of directions in a pixel, and which is a so-called MVA mode (Multi-domain VA: multi-domain type VA mode), thus implementing a black display by aligning the liquid crystal molecules in a liquid crystal layer vertically to a substrate surface. Further, as a driving style of the liquid crystal cell, not only a TFT system (active matrix system), but also a simple matrix system (passive matrix system), and a plasma address system, etc., may be used. As a structure of the liquid crystal cell, for example, the liquid crystal layer is interposed between a pair of substrates having electrodes formed thereon respectively, and display is obtained by applying a voltage between the electrodes respectively.
(Measuring Method of R, Rth, Nz-Coefficient, nx, ny, nz)

R, Rth, Nz-coefficient, nx, ny, nz were measured using a polarimeter of a dual retarder rotate system (by Axometrics Inc., product name: Axo-scan). In-plane phase difference R was actually measured from a normal direction of the birefringent layer. Principal indices of reflection nx, ny, nz, phase difference Rth in the perpendicular direction, and the Nz-coefficient were calculated by curve fitting of a publicly-known optical indicatrix system based on values of the phase difference measured in the normal direction of the birefringent layer, and in each oblique direction tilted by −50° to 50° from the normal direction. The tilt azimuth was set to be orthogonal to the in-plane slow axis. Further, nx, ny, nz, Rxz, and Nz depends on an average refractive index=(nx+ny+nz)/3, which was given as a calculating condition of the curve fitting. However, they were calculated by unifying the average refractive index of each birefringent layer to 1.5. The birefringent layer with actual average refractive index different from 1.5, is also converted on the assumption that the average refractive index was 1.5.
(Measurement Method of a Contrast Ratio of a Liquid Crystal Display Device—A Viewing Angle Characteristic)

Measurement was carried out using a viewing angle measurement device (by ELDIM Inc. product name: EZContrast 160). A backlight mounted on a liquid crystal television (by SHARP Corp., product name: LC37-GH1) was used as a light source. Brightness of white display and black display in the oblique direction at the azimuth angle of 45° and at the polar angle of 60° was measured, and its ratio was defined as CR (45, 60). Further, the brightness of white display and black display in the oblique direction at the azimuth angle of 0° and at the polar angle of 60° was measured and its ratio was defined as CR (0, 60).

The present invention will be mentioned in more detail in the following examples, but it not limited to these examples.

Example 1

Figure 13:
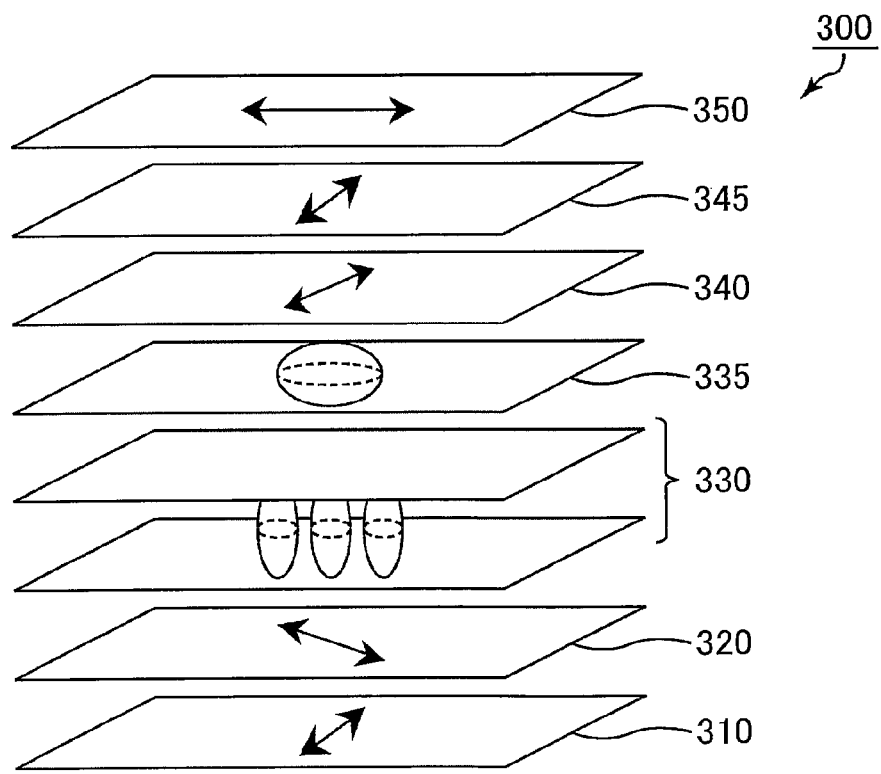
FIG. 13 is a perspective exploded view showing the structure of the circularly polarizing VA mode liquid crystal display device including second-type and third-type birefringent layers.
Figure 14:
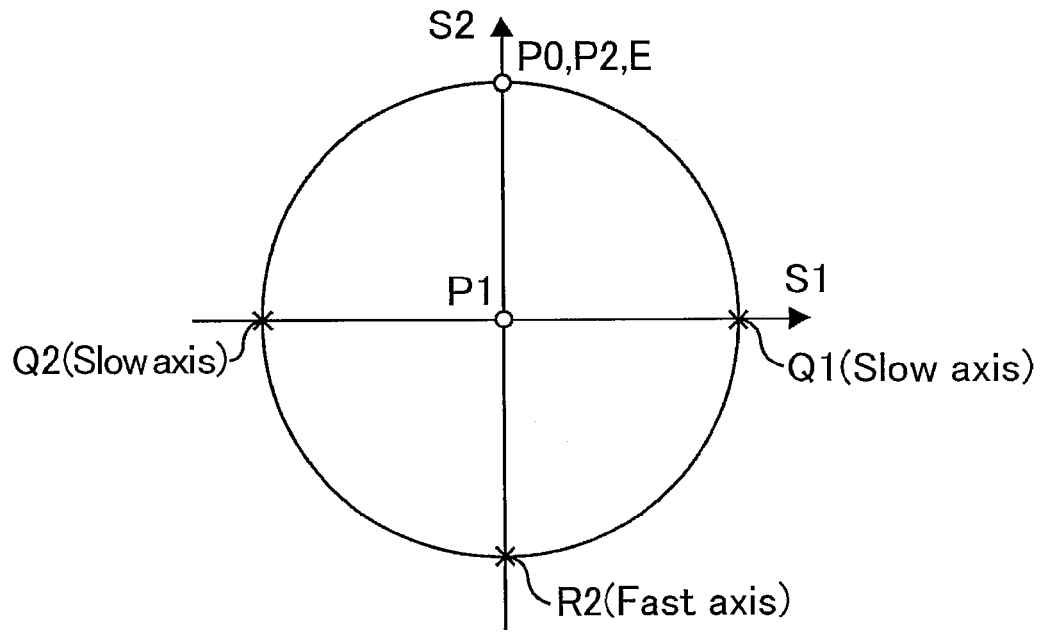
FIG. 14 is a view showing a state that the polarization state of the transmitted light is changed every time it passes through each member, projected on the S1-S2 plane of the Poincare sphere in the circularly polarizing VA mode liquid crystal display device of FIG. 13 (in a case that Nzq=1.6, Rlc=320 nm, R3=−129 nm, Nz2=−0.30, R2=118 nm), observed from the front direction.
Figure 15:
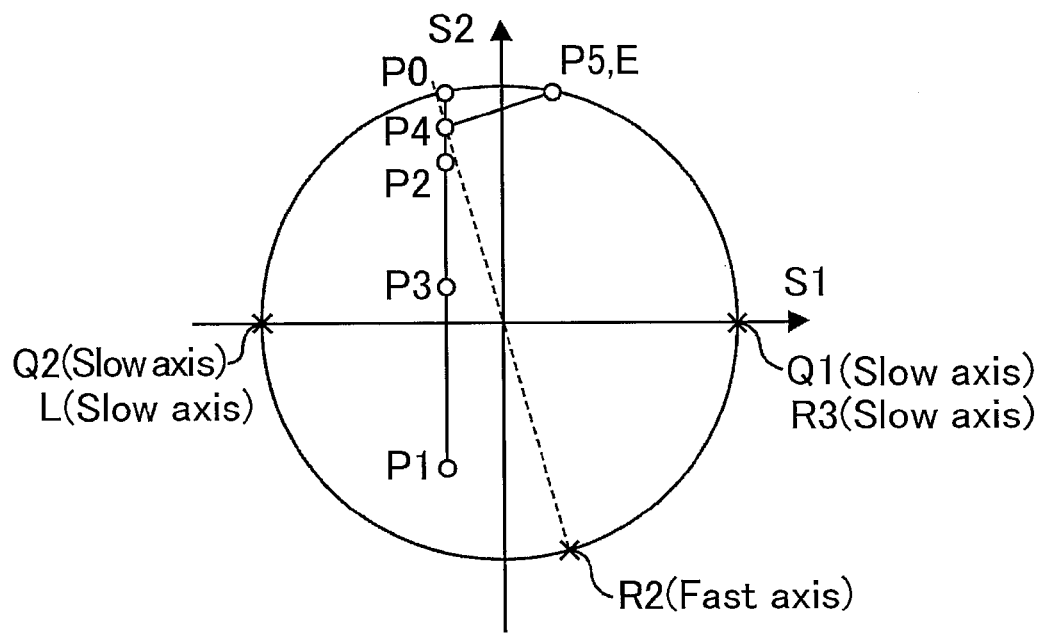
FIG. 15 is a view showing a state that the polarization state of the transmitted light is changed every time it passes through each member, projected on the S1-S2 plane of the Poincare sphere in the circularly polarizing VA mode liquid crystal display device of FIG. 13 (in a case that Nzq=1.6, Rlc=320 nm, R3=−129 nm, Nz2=−0.30, R2=118 nm), observed from the oblique direction at the azimuth angle of 45° and at the polar angle of 60°.
Figure 16:
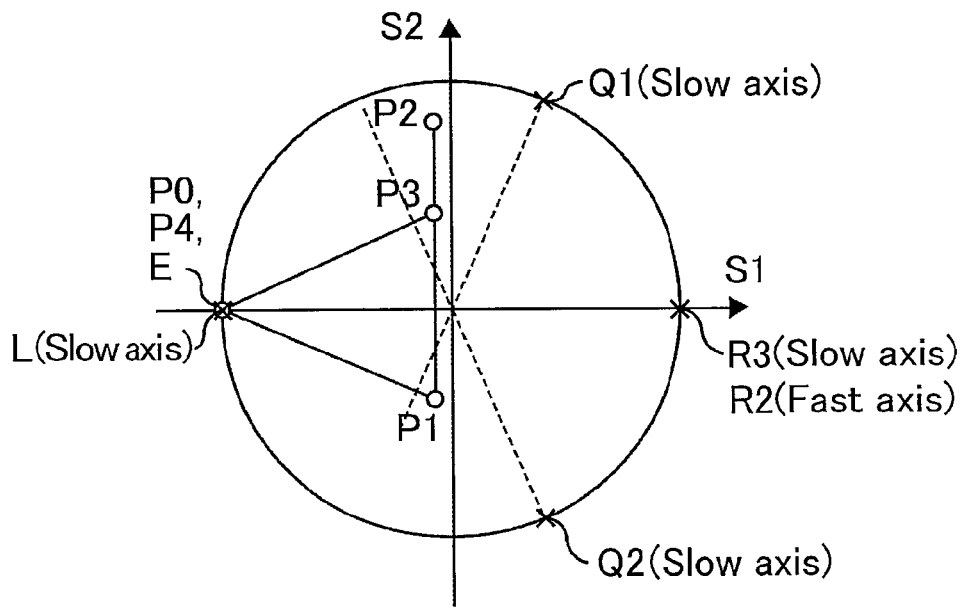
FIG. 16 is a view showing a state that the polarization state of the transmitted light is changed every time it passes through each member, projected on the S1-S2 plane of the Poincare sphere in the circularly polarizing VA mode liquid crystal display device of FIG. 13 (in a case that Nzq=1.6, Rlc=320 nm, R3=−129 nm, Nz2=−0.30, R2=118 nm), observed from the oblique direction at the azimuth angle of 0° at the polar angle of 60°.
Figure 17:
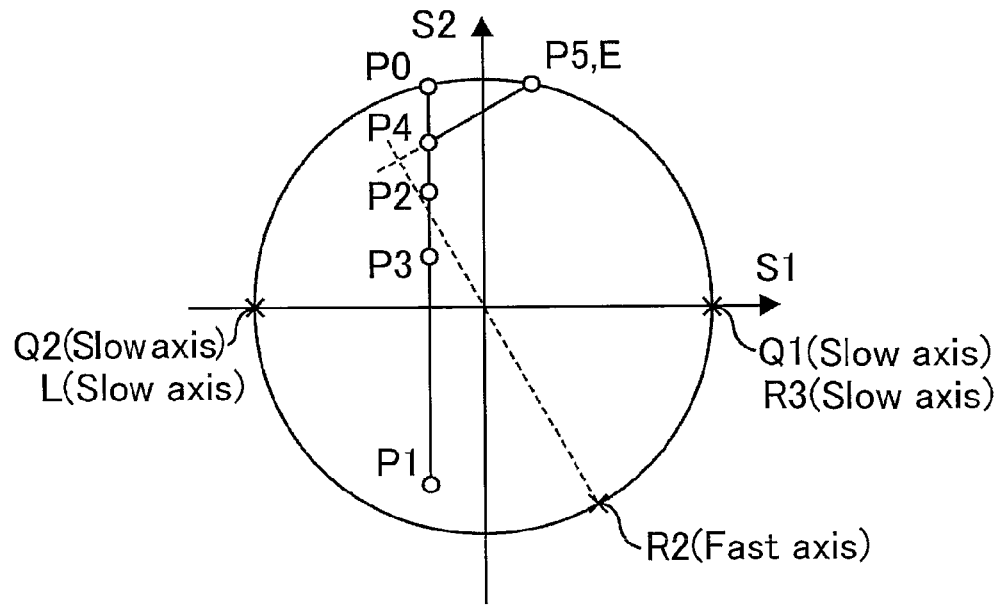
FIG. 17 is a view showing a state that the polarization state of the transmitted light is changed every time it passes through each member, projected on the S1-S2 plane of the Poincare sphere in the circularly polarizing VA mode liquid crystal display device of FIG. 13 (in a case that Nzq=2.0, Rlc=320 nm, R3=−61 nm, Nz2=−1.00, R2=94 nm), observed from the oblique direction at the azimuth angle of 45° and at the polar angle of 60°.
Figure 18:
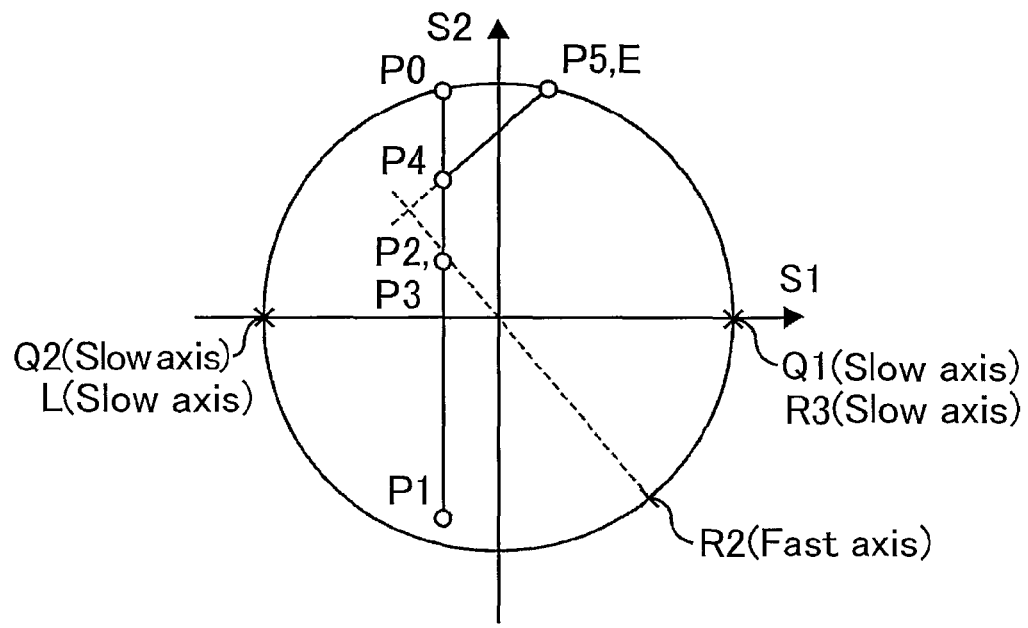
FIG. 18 is a view showing a state that the polarization state of the transmitted light is changed every time it passes through each member, projected on the S1-S2 plane of the Poincare sphere in the circularly polarizing VA mode liquid crystal display device of FIG. 13 (in a case that Nzq=2.35, Rlc=320 nm, R3=0 nm, Nz2=−1.80, R2=90 nm), observed from the oblique direction at the azimuth angle of 45° and at the polar angle of 60°.
Figure 19:
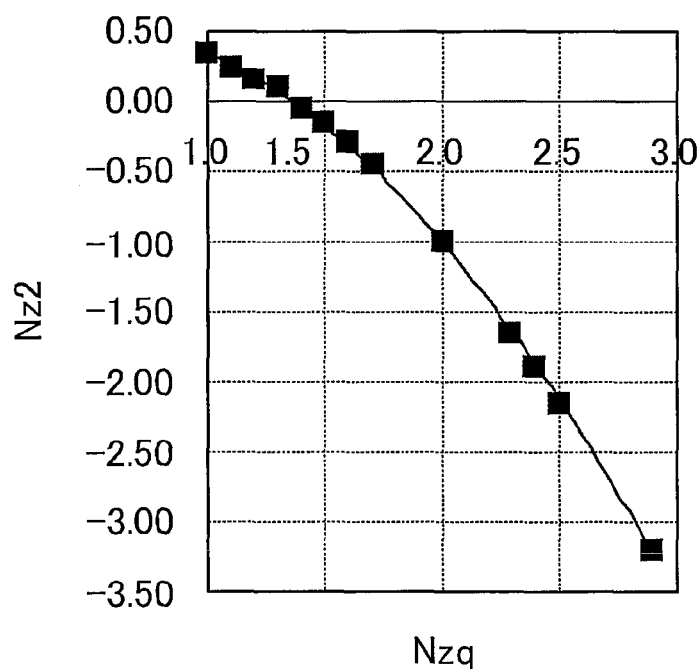
FIG. 19 is a graph showing a relation between the Nz-coefficient Nzq of the first and second plates, and an optimal value of the Nz-coefficient Nz2 of the second-type birefringent layer in the circularly VA mode liquid crystal display device of FIG. 13.
Figure 20:
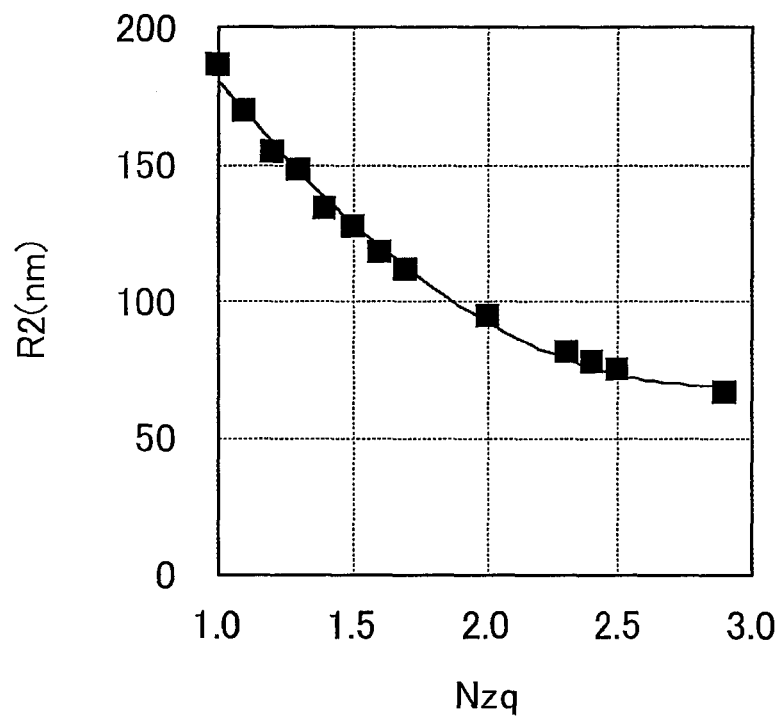
FIG. 20 is a graph showing the relation between the Nz-coefficient Nzq of the first and second λ/4 plates, and an optimal value of an in-plane phase difference R2 of the second-type birefringent layer in the circularly VA mode liquid crystal display device of FIG. 13.
Figure 21:
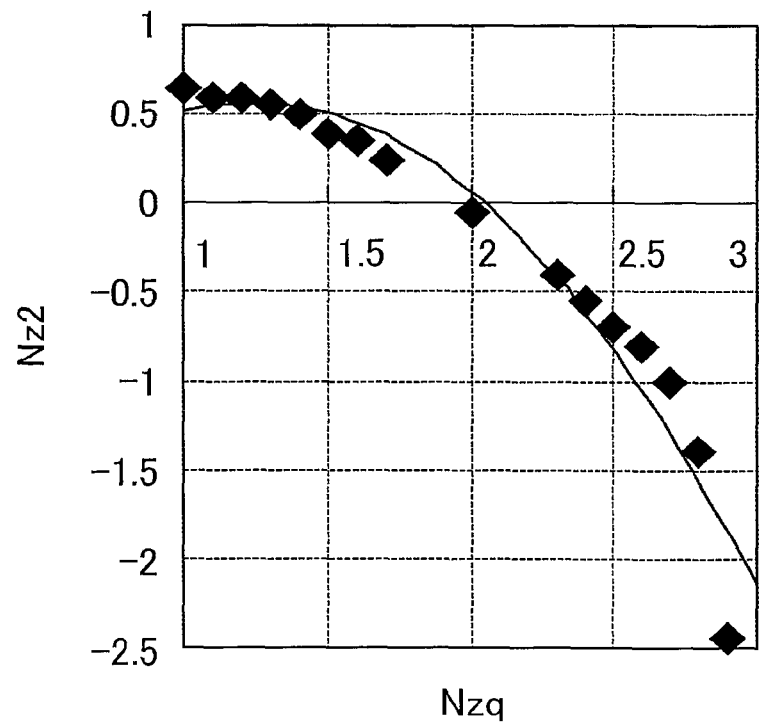
FIG. 21 is a graph showing the relation between the Nz-coefficient Nzq of the first and second λ/4 plates, and an optimal value of the Nz-coefficient Nz2 of first and second second-type birefringent layers.
Figure 22:
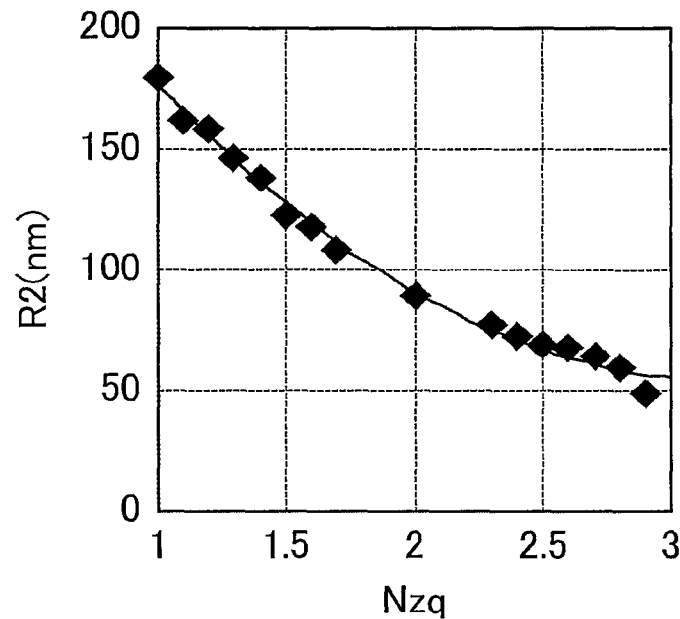
FIG. 22 is a graph showing the relation between the Nz-coefficient Nzq of the first and second λ/4 plates, and an optimal value of an in-plane phase difference R2 of the first and second second-type birefringent layers.
Figure 23:
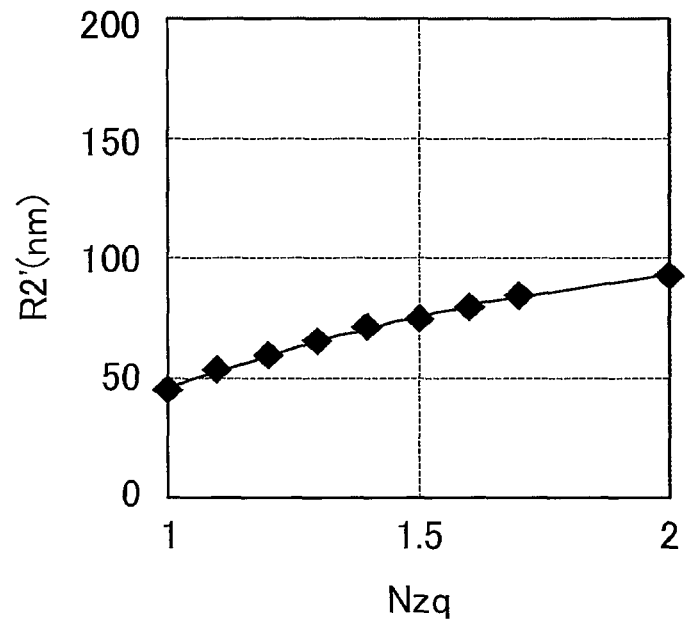
FIG. 23 is a graph showing the relation between the Nz-coefficient Nzq of the first and second λ/4 plates, and the optimal value of the in-plane phase difference R2 of the first and second second-type birefringent layers, when the second-type birefringent layer satisfying Nz2=0 is used, wherein Nzq is in a range of Nzq<2.00.

As shown in FIG. 13, the liquid crystal display device of Example 1 of the present invention is a circularly polarizing VA mode liquid crystal display device 300 obtained by stacking a first polarizer 310, a first λ/4 plate (first-type birefringent layer) 320, MVA mode liquid crystal cell 330, a third-type birefringent layer 335, a second λ/4 plate 340, a second-type birefringent layer 345, and a second polarizer 350 in this order. The liquid crystal cell 330 have a thin film transistor (TFT) substrate, a color filter (CF) substrate, and a liquid crystal layer interposed between them. Vertical alignment films are respectively provided on the liquid crystal layer side surfaces of the TFT substrate and the color filter substrate, and electrodes are provided on a lower layer (substrate side) of each vertical alignment film. A desired voltage is applied to the liquid crystal layer by an electrode of the TFT substrate and an electrode of the color filter substrate, thus controlling the alignment of the liquid crystal molecules. The liquid crystal layer includes the liquid crystal molecules having a negative dielectric anisotropy. Accordingly, the liquid crystal molecules are aligned approximately vertically to the surface of the vertical alignment film in a state that the voltage is not applied to the liquid crystal layer (off state), and the liquid crystal molecules are tilted horizontally to the surface of the vertical alignment film in a state that the voltage of a threshold value or more is applied to the liquid crystal layer (on state). Absorption axes of the first polarizer 310 and the second polarizer 350 are arranged so as to orthogonally cross each other (crossed Nicols arrangement), and therefore the liquid crystal display device 300 implements the black display in the off state.

The liquid crystal cell 330 is so-called MVA mode (multi-domain type VA mode) liquid crystal cell, having four domains in the pixel. Tilt directions in four domains are set in a relation of approximately orthogonally crossing each other when a display surface is observed in front view, thus effectively solving an asymmetry of the tilt directions. A circularly polarized light is made incident on the liquid crystal cell 330 to thereby implement display in the circularly polarizing VA mode. Therefore, in terms of the front view (in a normal direction with respect to the display surface), although the tilt directions of the liquid crystal molecules have no influence on the transmissivity of the liquid crystal cell, the tilt directions of the liquid crystal molecules have an influence on the transmissivity of the liquid crystal cell in the oblique direction. Accordingly, a gray scale viewing angle in the oblique direction can be improved by controlling the tilt directions in four domains.

Figure 24:
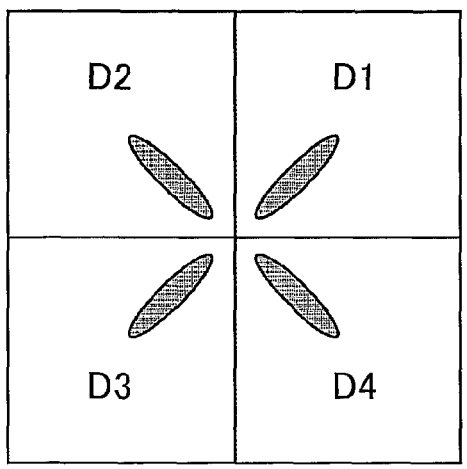
FIG. 24 is a schematic view showing an example of domains formed in the liquid crystal cell of Example 1.
Figure 25:
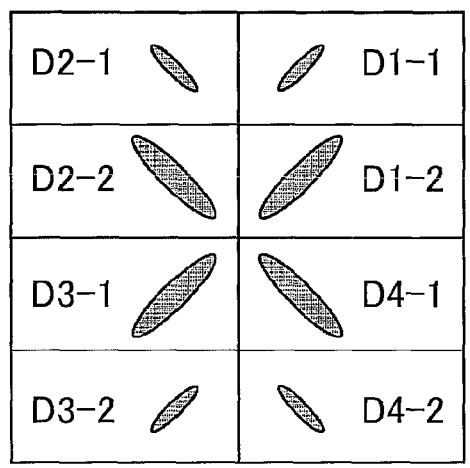
FIG. 25 is a schematic view showing an example of domains formed in the liquid crystal cell of Example 1.

As shown in FIG. 24, in the liquid crystal cell 330, four domains composed of domain D1 in which liquid crystal molecules are tilted at the azimuth angle of 22.5°, domain D2 in which liquid crystal molecules are tilted at the azimuth angle of 112.5°, domain D3 in which liquid crystal molecules are tilted at the azimuth angle of 202.5°, and domain D4 in which liquid crystal molecules are tilted at the azimuth angle of 292.5°, are formed in each pixel. As shown in FIG. 25, in order to improve the viewing angle characteristic, four domains may be divided into two regions capable of applying different voltages. In FIG. 25, although eight regions in total are formed in the pixel, the number of domains is four, because the regions including the liquid crystal molecules with different polar angles are included in the same domain if the tilt azimuths are approximately the same. Namely, regions D1-1 and D1-2 are common in the tilt azimuth 22.5°, although different in the polar angles of the liquid crystal molecules; regions D2-1 and D2-2 are common in the tilt azimuth 112.5°, although different in the polar angles of the liquid crystal molecules; regions D3-1 and D3-2 are common in the tilt azimuth 202.5°, although different in the polar angles of the liquid crystal molecules; and regions D4-1 and D4-2 are common in the tilt azimuth 292.5°, although different in the polar angles of the liquid crystal molecules.

Further, the number of the domains of the pixel may be increased to four or more. For example, the liquid crystal cell 330 may be formed so that one pixel is composed of a plurality of sub-pixels, and in this case, each one set of the aforementioned four kinds of domains may be provided in each sub-pixel.

In the liquid crystal cell 330, the tilt azimuths of the liquid crystal molecules are controlled by an alignment control means formed on at least one of the TFT substrate and the CF substrate. The alignment control means is not particularly limited, and for example, a combination of a slit formed in the electrode of the TFT substrate, and a linearly extending dielectric protrusion formed on a lower layer (substrate side) of the vertical alignment film of the CF substrate, can be given. At this time, the tilt azimuths of the liquid crystal molecules in each domain can be controlled by adjusting an extending azimuth of the slit and an extending azimuth of the dielectric protrusion, and can also be controlled by adjusting a direction in which other members such as the first polarizer 310 are stuck to the liquid crystal cell 330.

Figure 26:
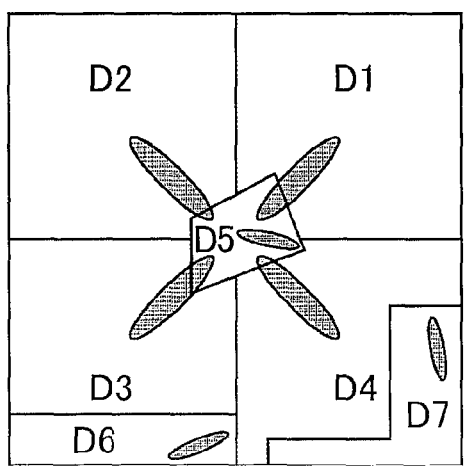
FIG. 26 is a schematic view showing an example of domains formed in the liquid crystal cell of Example 1.

Note that the tilt azimuths of the liquid crystal molecules are sometimes deviated from an intended azimuth, due to an electric field generated under an influence of the electrode and wiring provided on the TFT substrate and the CF substrate, or a surface shape on the liquid crystal layer side of the TFT substrate and the CF substrate. In the present invention, not only four domains composed of domain D1 in which the liquid crystal molecules are tilted at the azimuth angle of 22.5°, domain D2 in which the liquid crystal molecules are tilted at the azimuth angle of 112.5°, domain D3 in which the liquid crystal molecules are tilted at the azimuth angle of 202.5°, and domain D4 in which the liquid crystal molecules are tilted at the azimuth angle of 292.5°, but also domains D5, D6, and D7 generated by alignment defect may be included in the pixel, as shown in FIG. 26.

Example 2

Figure 27:
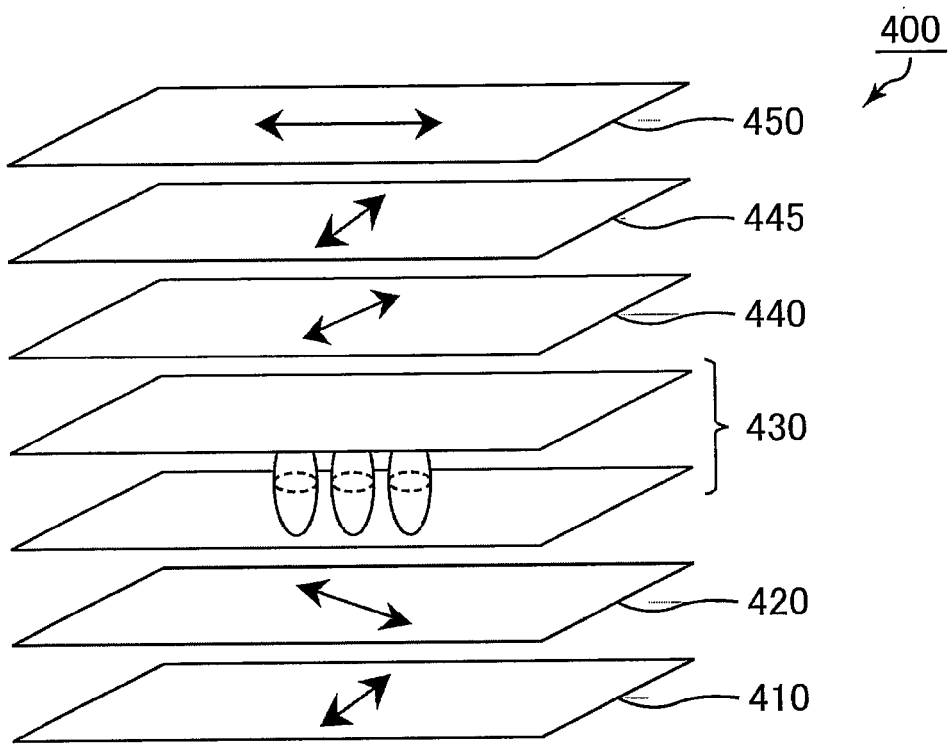
FIG. 27 is a perspective exploded view showing the structure of the circularly polarizing VA mode liquid crystal display device including one second-type birefringent layer.

As shown in FIG. 27, the liquid crystal display device of Example 2 according to the present invention is a circularly polarizing VA mode liquid crystal display device 400 obtained by stacking a first polarizer 410, a first λ/4 plate (first-type birefringent layer) 420, MVA mode liquid crystal cell 430, a second λ/4 plate 440, a second-type birefringent layer 445, and a second polarizer 450 in this order. Namely, the liquid crystal display device 400 of FIG. 27 is different from the liquid crystal display device 300 of FIG. 13 in a point that the third-type birefringent layer is not included. The liquid crystal cell 430 have a similar structure as the structure of the liquid crystal cell 330 of Example 1, and four domains composed of a domain in which the liquid crystal molecules are tilted at the azimuth angle of 22.5°, a domain in which the liquid crystal molecules are tilted at the azimuth angle of 112.5°, a domain in which the liquid crystal molecules are tilted at the azimuth angle of 202.5°, and a domain in which the liquid crystal molecules are tilted at the azimuth angle of 292.5°, are formed in each pixel. Note that in FIG. 27 arrows described in the first and second polarizers 410, 450 indicate the azimuth of the absorption axes thereof, and arrows described in the first and second λ/4 plates 420, 440 indicate the azimuth of the slow axes thereof, arrows described in the second-type birefringent layer 445 indicate the azimuth of the fast axes thereof, and ellipsoids described in the liquid crystal cell 430 indicate the shape of optical indicatrixes thereof.

Example 3

Figure 28:
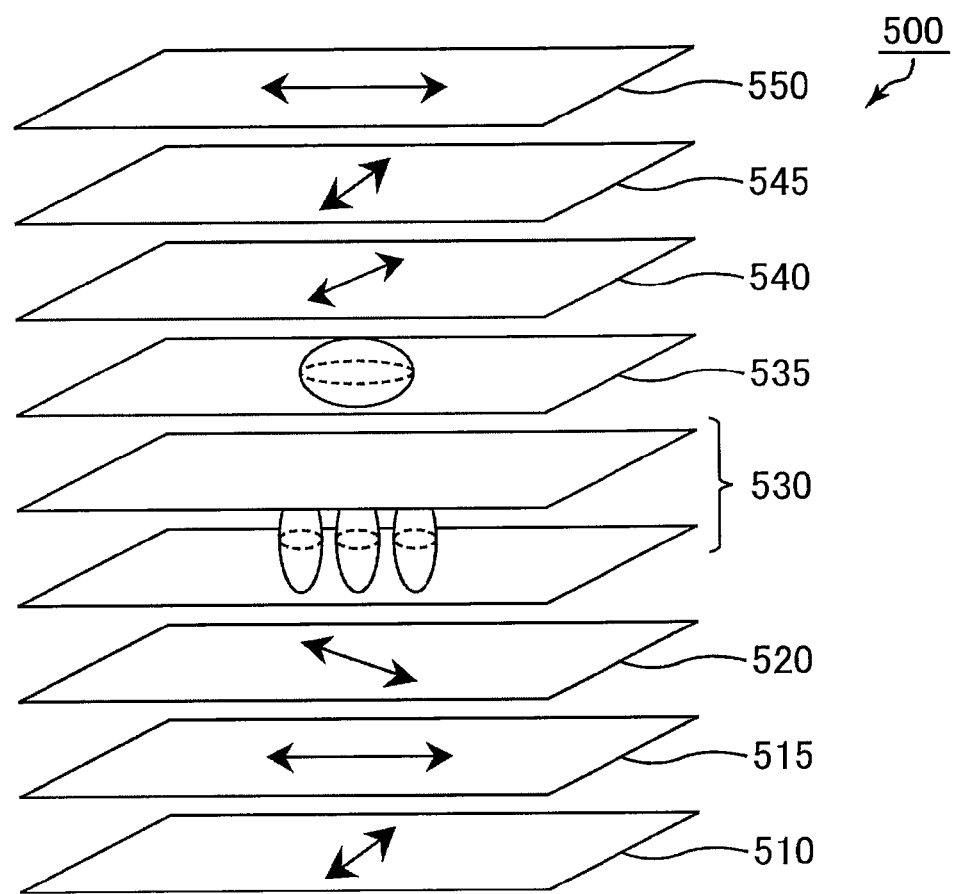
FIG. 28 is a perspective exploded view showing the structure of the circularly polarizing VA mode liquid crystal display device including two second-type birefringent layers.
Figure 29:
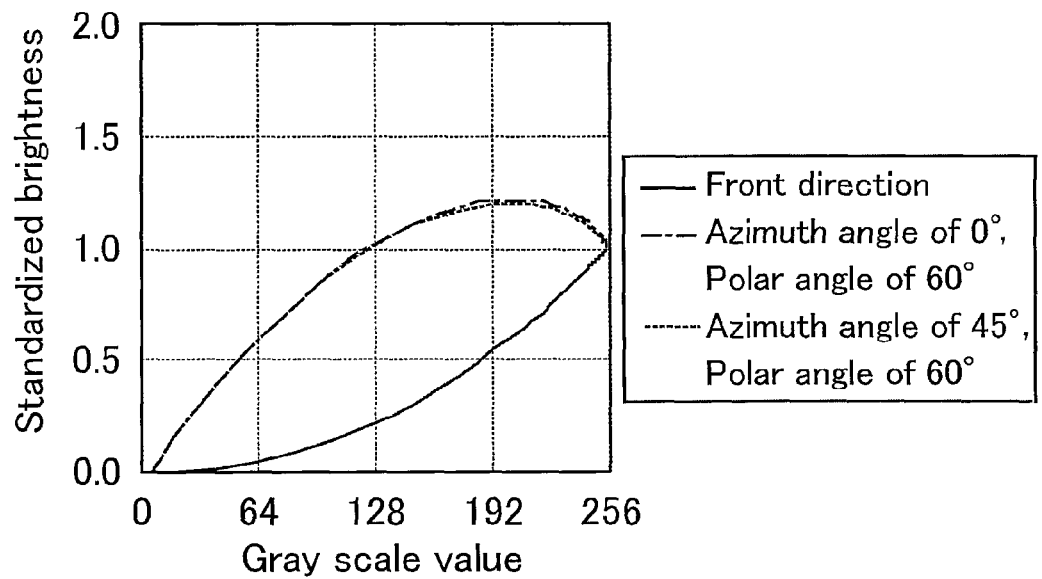
FIG. 29 is a graph showing a gamma curve obtained by measuring the liquid crystal display device of Example 1.
Figure 30:
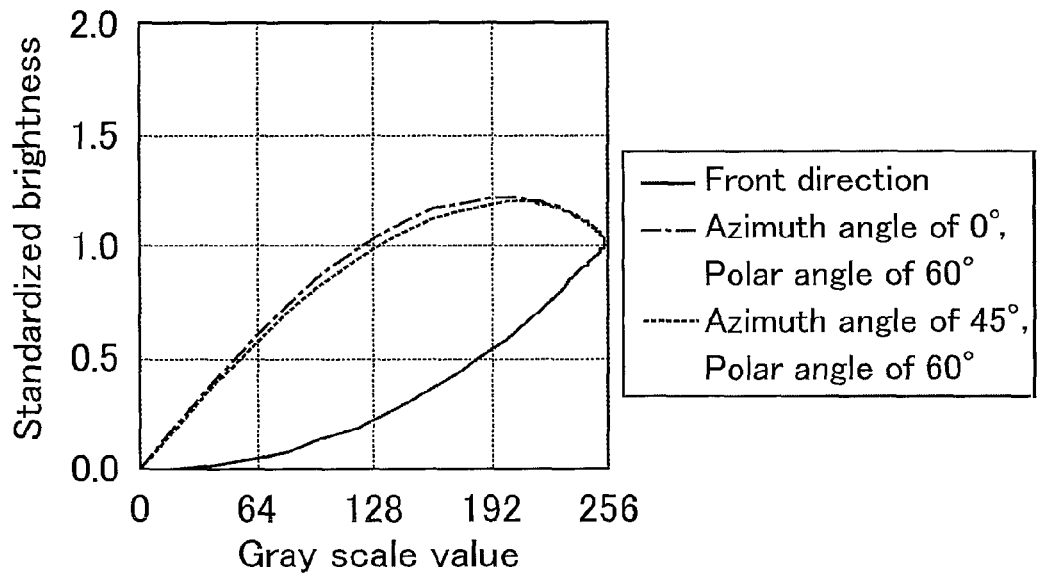
FIG. 30 is a graph showing a gamma curve obtained by measuring the liquid crystal display device of Example 2.
Figure 31:
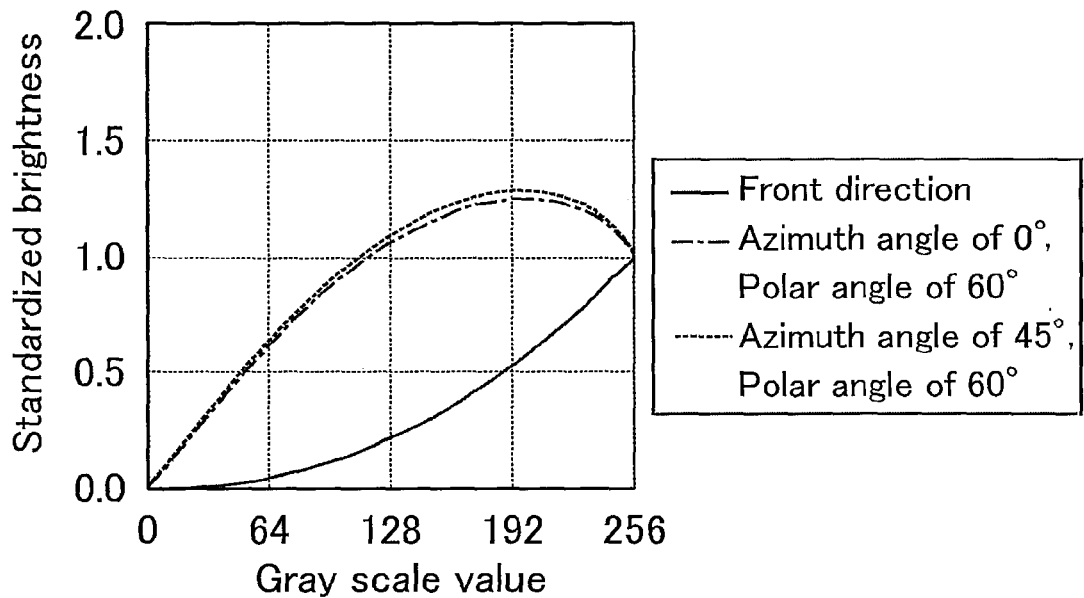
FIG. 31 is a graph showing a gamma curve obtained by measuring the liquid crystal display device of Example 3.
Figure 32:
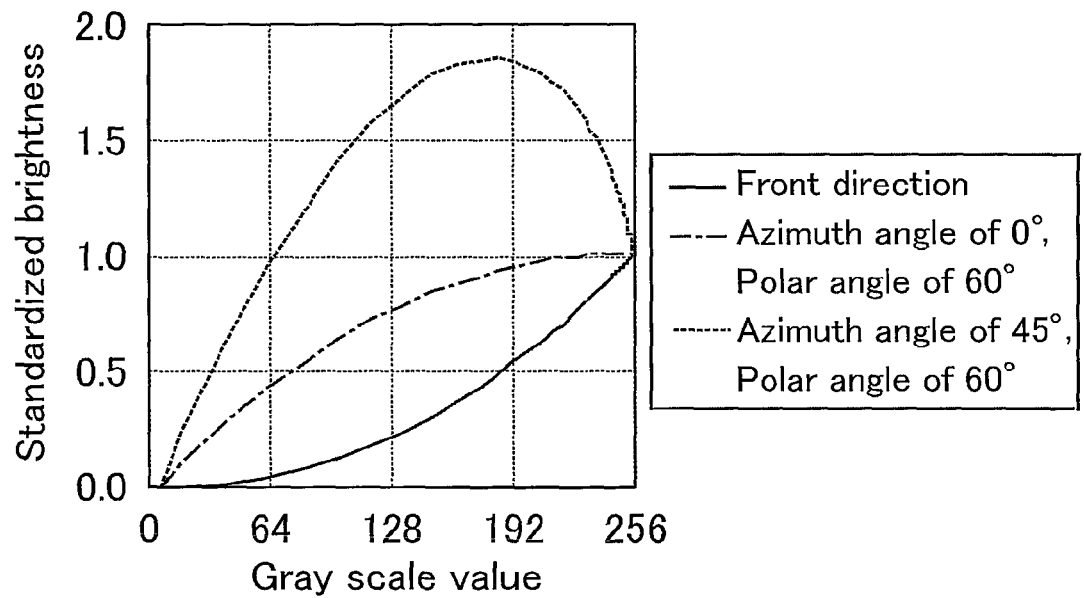
FIG. 32 is a graph showing a gamma curve obtained by measuring the liquid crystal display device of Comparative Example 1.
Figure 33:
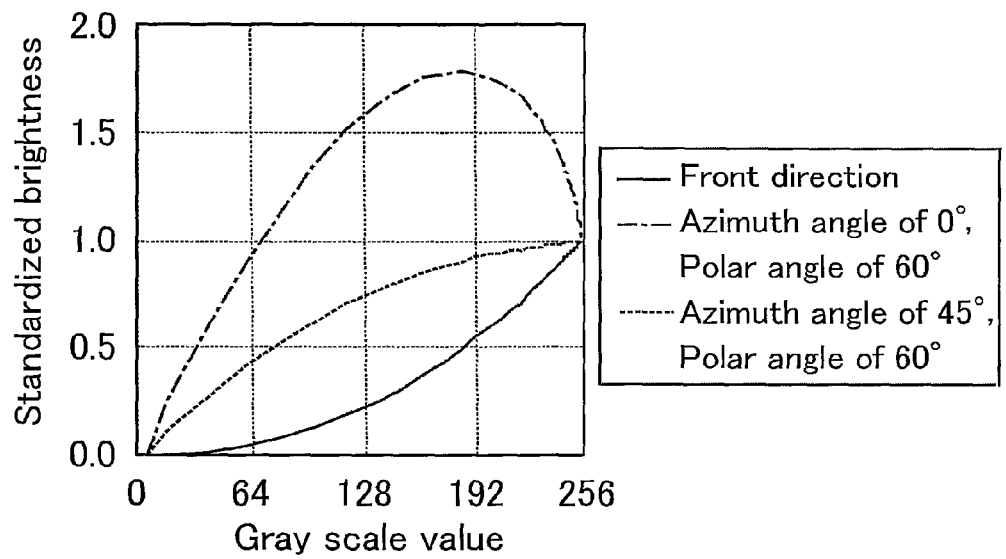
FIG. 33 is a graph showing a gamma curve obtained by measuring the liquid crystal display device of Comparative Example 2.
Figure 34:
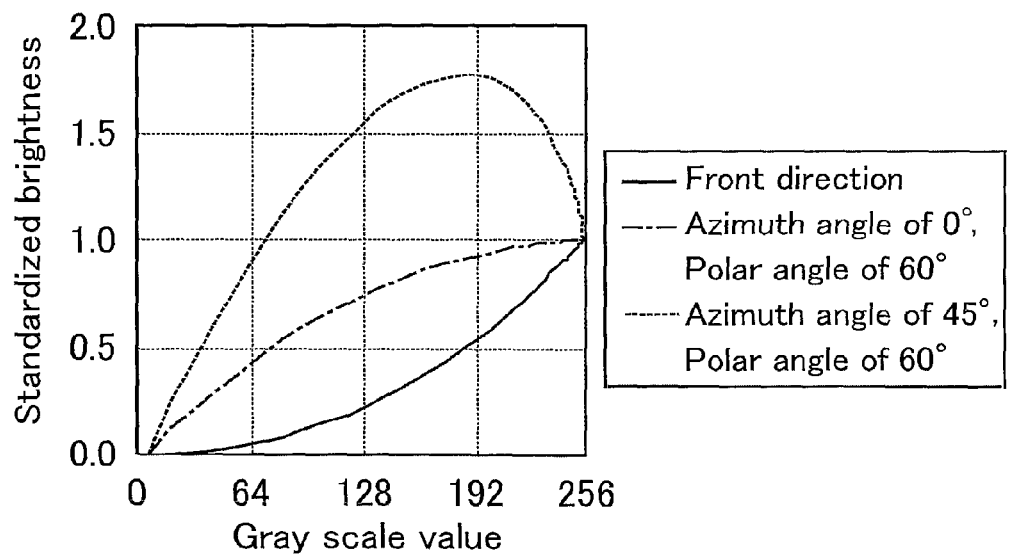
FIG. 34 is a graph showing a gamma curve obtained by measuring the liquid crystal display device of Comparative Example 3.
Figure 35:
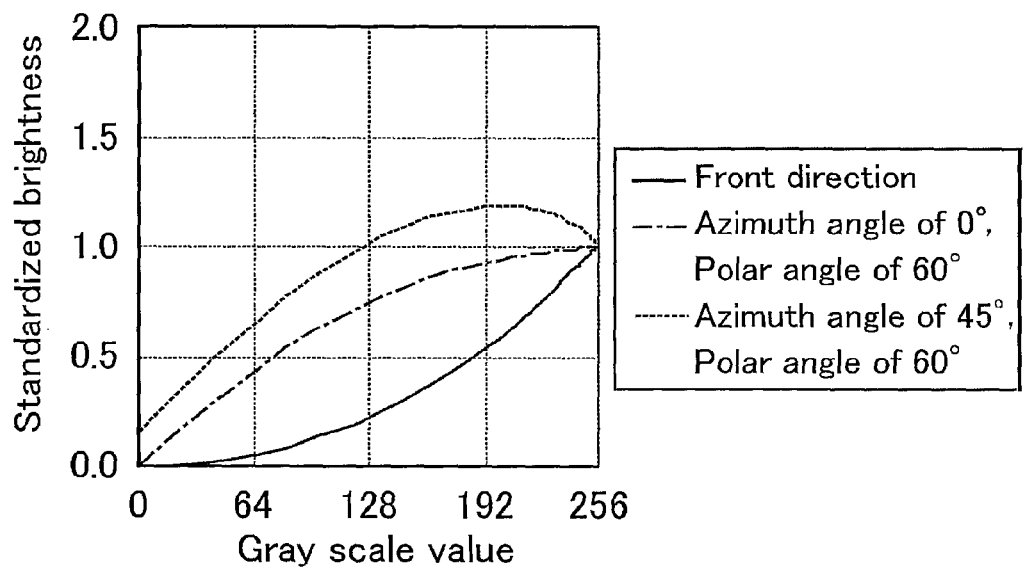
FIG. 35 is a graph showing a gamma curve obtained by measuring the liquid crystal display device of Comparative Example 4.
Figure 36:
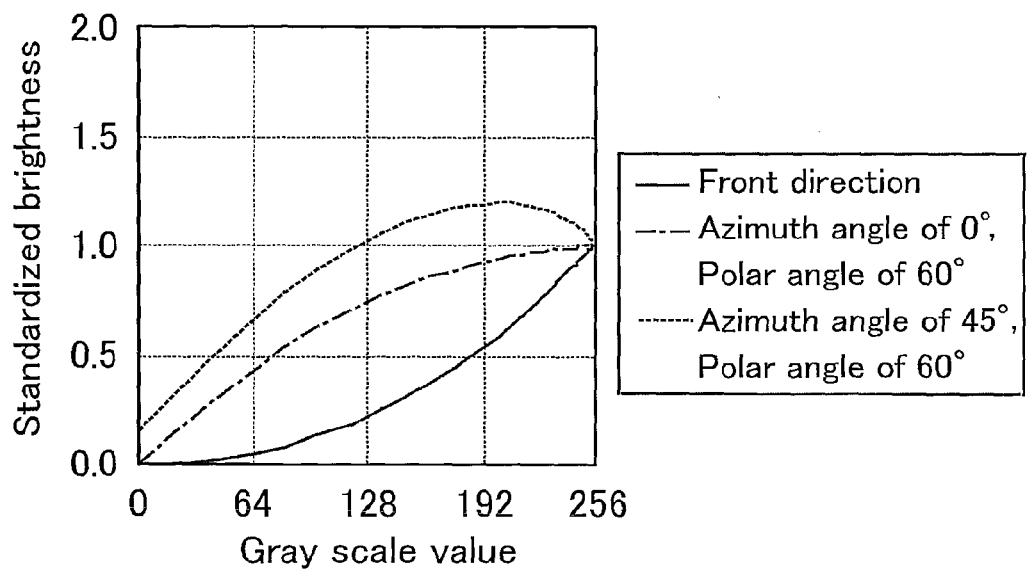
FIG. 36 is a graph showing a gamma curve obtained by measuring the liquid crystal display device of Comparative Example 5.

As shown in FIG. 28, the liquid crystal display device of Example 3 according to the present invention is a circularly polarizing VA mode liquid crystal display device 500 obtained by stacking a first polarizer 510, a first second-type birefringent layer 515, a first λ/4 plate (first-type birefringent layer) 520, MVA mode liquid crystal cell 530, a third-type birefringent layer 535, a second λ/4 plate 540, a second second-type birefringent layer 545, and a second polarizer 550 in this order. Namely, the liquid crystal display device 500 of FIG. 28 is different from the liquid crystal display device 300 of FIG. 13 in a point that two second-type birefringent layers are included. The liquid crystal cell 530 have a similar structure as the structure of the liquid crystal cell 330 of Example 1, and four domains composed of a domain in which the liquid crystal molecules are tilted at the azimuth angle of 22.5°, a domain in which the liquid crystal molecules are tilted at the azimuth angle of 112.5°, a domain in which the liquid crystal molecules are tilted at the azimuth angle of 202.5°, and a domain in which the liquid crystal molecules are tilted at the azimuth angle of 292.5°, are formed in each pixel. Note that in FIG. 28 arrows described in the first and second polarizers 510, 550 indicate the azimuths of the absorption axes thereof, and arrows described in the first and second λ/4 plates 520, 540 indicate the azimuths of the slow axes thereof, arrows described in the first and second second-type birefringent layers 515, 545 indicate the azimuths of the fast axes thereof, and ellipsoids described in the liquid crystal cell 530 indicate the shape of optical indicatrixes thereof.

Comparative Example 1

The liquid crystal display device of Comparative Example 1 has a similar structure as the liquid crystal display device 300 of Example 1, but is different from the liquid crystal display device 300 of Example 1, in a point that four domains composed of a domain in which the liquid crystal molecules are tilted at the azimuth angle of 45°, a domain in which the liquid crystal molecules are tilted at the azimuth angle of 135°, a domain in which the liquid crystal molecules are tilted at the azimuth angle of 225°, and a domain in which the liquid crystal molecules are tilted at the azimuth angle of 315°, are formed in each pixel.

Comparative Example 2

The liquid crystal display device of Comparative Example 2 has a similar structure as the liquid crystal display device 300 of Example 1, but is different from the liquid crystal display device 300 of Example 1, in a point that four domains composed of a domain in which the liquid crystal molecules are tilted at the azimuth angle of 0°, a domain in which the liquid crystal molecules are tilted at the azimuth angle of 90°, a domain in which the liquid crystal molecules are tilted at the azimuth angle of 180°, and a domain in which the liquid crystal molecules are tilted at the azimuth angle of 270°, are formed in each pixel.

Comparative Example 3

The liquid crystal display device of Comparative Example 3 has a similar structure as the liquid crystal display device 400 of Example 2, but is different from the liquid crystal display device 400 of Example 2, in a point that four domains composed of a domain in which the liquid crystal molecules are tilted at the azimuth angle of 45°, a domain in which the liquid crystal molecules are tilted at the azimuth angle of 135°, a domain in which the liquid crystal molecules are tilted at the azimuth angle of 225°, and a domain in which the liquid crystal molecules are tilted at the azimuth angle of 315°, are formed in each pixel.

Comparative Example 4

The liquid crystal display device of Comparative Example 4 is the VA mode liquid crystal display device obtained by stacking a first polarizer, TAC, a first λ/4 plate (first-type birefringent layer), VA mode liquid crystal cell, a third-type birefringent layer, a second λ/4 plate, TAC, and a second polarizer in this order. Namely, the liquid crystal display device of this comparative example is different from the liquid crystal display device 300 of FIG. 13, in a point that the second-type birefringent layer is not included. The liquid crystal cell of Comparative Example 5 have a similar structure as the structure of the liquid crystal cells 330 of Example 1, but is different from the liquid crystal cells 330 in a point that four domains composed of a domain in which the liquid crystal molecules are tilted at the azimuth angle of 45°, a domain in which the liquid crystal molecules are tilted at the azimuth angle of 135°, a domain in which the liquid crystal molecules are tilted at the azimuth angle of 225°, and a domain in which the liquid crystal molecules are tilted at the azimuth angle of 315°, are formed in each pixel.

Comparative Example 5

The liquid crystal display device of Example 5 is the VA mode liquid crystal display device obtained by stacking a first polarizer, TAC, a first λ/4 plate (first-type birefringent layer), VA mode liquid crystal cell, a second λ/4 plate, TAC, and a second polarizer in this order. The liquid crystal cell of Comparative Example 5 have a similar structure as the structure of the liquid crystal cell 330 of Example 1, but is different from the liquid crystal cell 330 in a point that four domains composed of a domain in which the liquid crystal molecules are tilted at the azimuth angle of 45°, a domain in which the liquid crystal molecules are tilted at the azimuth angle of 135°, a domain in which the liquid crystal molecules are tilted at the azimuth angle of 225°, and a domain in which the liquid crystal molecules are tilted at the azimuth angle of 315°, are formed in each pixel.

Comparative Example 6

The liquid crystal display device of Comparative Example 6 is the VA mode liquid crystal display device obtained by stacking a first polarizer, a biaxial phase difference film, VA mode liquid crystal cell, TAC, and a second polarizer in this order. The liquid crystal cell of Comparative Example 6 have a similar structure as the structure of the liquid crystal cell 330 of Example 1, but is different from the liquid crystal cell 330 in a point that four domains composed of a domain in which the liquid crystal molecules are tilted at the azimuth angle of 45°, a domain in which the liquid crystal molecules are tilted at the azimuth angle of 135°, a domain in which the liquid crystal molecules are tilted at the azimuth angle of 225°, and a domain in which the liquid crystal molecules are tilted at the azimuth angle of 315°, are formed in each pixel.

Regarding the polarizers, the birefringent layers, and the liquid crystal cell of each example, name of the material, axis-angle, in-plane phase difference R, phase difference Rth or Rlc in the perpendicular direction, and Nz-coefficient, are shown in Table 5 as follows. In the table, an axis of each birefringent layer is defined by the azimuth angle of the in-plane slow axis, and an axis of the polarizer is defined by the azimuth angle of the absorption axis. Note that regarding the second-type birefringent layer, the in-plane fast axis is important in terms of a design. However, in the table, similarly to other birefringent layer, the axis of the second-type birefringent layer is defined by the azimuth angle of the in-plane slow axis. The in-plane fast axis of the second-type birefringent layer is orthogonally crossing the in-plane slow axis of the second-type birefringent layer. Further, in the table, the name of the material of each birefringent layer is shown by using an abbreviation as follows.

NB: Norbornene
PI: Polyimide
TAC: Triacetylcellulose
A: Resin composition including acrylic resin and styrene resin (Evaluation Result)

Contrast ratio—viewing angle characteristic of the liquid crystal display device of each example was measured, and Table 5 shows the contrast ratio [CR (0, 60)] at the azimuth angle of 0° and at the polar angle of 60°, and the contrast ratio [CR (45, 60)] at the azimuth angle of 45° and at the polar angle of 60°. Note that "the contrast ratio at the azimuth angle of X° and at the polar angle of Y°" means the contrast ratio measured at the azimuth angle of X° by tilting a viewing angle by Y° from the normal direction. Namely, the polar angle indicates an angle formed by the front direction and a viewing angle direction. Further, in each example, FIG. 29 to FIG. 37 show a gamma curve (1) at the azimuth angle of 0°, and at the polar angle of 0°, (2) at the azimuth angle of 0° and at the polar angle of 60°, (3) at the azimuth angle of 45° and at the polar angle of 60°. The gamma curve shows a variation of the transmissivity with respect to the voltage applied to the liquid crystal layer, with gray scale values taken on the horizontal axis, and standardized brightness taken on the vertical axis. A display mode of the liquid crystal display device of each example is normally black, and therefore the black display corresponds to a gray scale value 0, and the white display corresponds to a gray scale value 256, and the voltage applied to the liquid crystal layer becomes larger as the gray scale value becomes larger. The brightness is standardized in each measurement direction, with the brightness being 1.0 when the gray scale value is 256. Comparison of a plurality of gamma curves obtained from different measurement directions, is generally used as an index showing a difference in a way of look of the display screen depending on a direction for viewing the liquid crystal display device, and there is a coincidence in the way of look of the display screen as the gamma curves are approached each other.

Any one of the CR (0, 60) and CR (45, 60) of the liquid crystal display device of Examples 1 to 3 according to the present invention, is equal to the CR (0, 60) and CR (45, 60) of Comparative Examples 1 to 3. Meanwhile, in the liquid crystal display device of Examples 1 to 3, there is more coincidence between the gamma curve at the azimuth angle of 0° and at the polar angle of 60°, and the gamma curve at the azimuth angle of 45° and at the polar angle of 60° than a case of the liquid crystal display device of Comparative Examples 1 to 6. Then, an inversion phenomenon is suppressed, the inversion phenomenon being the phenomenon of causing the brightness to be decreased as the voltage is increased. The liquid crystal display devices of Examples 1 to 3 are excellent in a display quality in an oblique viewing angle, even being evaluated visually.

TABLE 5

| | Optical member | Material | Axis angle [°] | Phase difference [nm] R | Rth or Ric | Nz-coefficient | Evaluation result CR (45.60) | CR (0.60) |
|---|---|---|---|---|---|---|---|---|
| Example 1 | Second polarizer | | 0 | | | | 35 | 178 |
| | Second-type birefringent layer | A | 0 | 138 | | −0.01 | | |
| | Second λ/4 plate | NB | 45 | 138 | | 1.02 | | |
| | Third-type birefringent layer | PI | | 0 | −250 | | | |
| | VA mode liquid crystal cell (22.5°, 112.5°, 202.5°, 292.5°) | | | | 340 | | | |
| | First λ/4 plate | NB | 135 | 138 | | 1.02 | | |
| | First polarizer | | 90 | | | | | |
| Example 2 | Second polarizer | | 0 | | | | 58 | 175 |
| | Second-type birefringent layer | A | 0 | 85 | | −1.21 | | |
| | Second λ/4 plate | NB | 45 | 138 | | 2.08 | | |
| | VA mode liquid crystal cell (22.5°, 112.5°, 202.5°, 292.5°) | | | | 290 | | | |
| | First λ/4 plate | NB | 135 | 138 | | 2.08 | | |
| | First polarizer | | 90 | | | | | |
| Example 3 | Second polarizer | | 0 | | | | 60 | 176 |
| | Second second-type birefringent layer | A | 0 | 85 | | −0.10 | | |
| | Second λ/4 plate | NB | 45 | 138 | | 2.13 | | |
| | Third-type birefringent layer | TAC | | 2 | −52 | | | |
| | VA mode liquid crystal cell (22.5°, 112.5°, 202.5°, 292.5°) | | | | 320 | | | |
| | First λ/4 plate | NB | 135 | 138 | | 2.13 | | |
| | First second-type birefringent layer | | 90 | 85 | | −0.10 | | |
| | First polarizer | | 90 | | | | | |
| Comparative Example 1 | Second polarizer | | 0 | | | | 35 | 178 |
| | Second-type birefringent layer | A | 0 | 138 | | −0.01 | | |
| | Second λ/4 plate | NB | 45 | 138 | | 1.02 | | |
| | Third-type birefringent layer | PI | | 0 | −250 | | | |
| | VA mode liquid crystal cell (45°, 135°, 225°, 315°) | | | | 340 | | | |
| | First λ/4 plate | NB | 135 | 138 | | 1.02 | | |
| | First polarizer | | 90 | | | | | |
| Comparative Example 2 | Second polarizer | | 0 | | | | 35 | 178 |
| | Second-type birefringent layer | A | 0 | 138 | | −0.01 | | |
| | Second λ/4 plate | NB | 45 | 138 | | 1.02 | | |
| | Third-type birefringent layer | PI | | 0 | −250 | | | |
| | VA mode liquid crystal cell (0°, 90°, 180°, 270°) | | | | 340 | | | |
| | First λ/4 plate | NB | 135 | 138 | | 1.02 | | |
| | First polarizer | | 90 | | | | | |
| Comparative Example 3 | Second polarizer | | 0 | | | | 58 | 175 |
| | Second-type birefringent layer | A | 0 | 85 | | −1.21 | | |
| | Second λ/4 plate | NB | 45 | 138 | | 2.08 | | |
| | VA mode liquid crystal cell (45°, 135°, 225°, 315°) | | | | 290 | | | |
| | First λ/4 plate | NB | 135 | 138 | | 2.08 | | |
| | First polarizer | | 90 | | | | | |
| Comparative Example 4 | Second polarizer | | 0 | | | | 15 | 140 |
| | TAC | TAC | | 1 | 32 | | | |
| | Second λ/4 plate | A | 45 | 138 | −8 | −0.01 | | |
| | Third-type birefringent layer | NB | | 2 | 318 | | | |
| | VA mode liquid crystal cell (45°, 135°, 225°, 315°) | | | | 320 | | | |
| | First λ/4 plate | NB | 135 | 138 | | 1.02 | | |
| | TAC | TAC | | 1 | 32 | | | |
| | First polarizer | | 90 | | | | | |
| Comparative Example 5 | Second polarizer | | −25 | | | | 5 | 40 |
| | TAC | TAC | | 1 | 32 | | | |
| | Second λ/4 plate | NB | 20 | 138 | | 1.58 | | |
| | VA mode liquid crystal cell (45°, 135°, 225°, 315°) | | | | 320 | | | |
| | First λ/4 plate | NB | 110 | 138 | | 1.58 | | |
| | TAC | TAC | | 1 | 32 | | | |
| | First polarizer | | 65 | | | | | |
| Comparative Example 6 | Second polarizer | | 0 | | | | 60 | 183 |
| | TAC | TAC | | 1 | 55 | | | |
| | VA mode liquid crystal cell (45°, 135°, 225°, 315°) | | | | 320 | | | |
| | Biaxial phase difference film | NB | | 63 | 225 | 4.07 | | |
| | First polarizer | | 90 | | | | | |

Note that the liquid crystal display device of each example has the circularly polarizing plate composed of a combination of the linearly polarizing plate (polarizer) and the λ/4 plate provided on both sides of the liquid crystal cells, thus implementing the display in the circularly polarizing VA mode. The circularly polarizing VA mode exhibits an effect of improving transmissivity and also an effect of preventing a reflection, and therefore is effective for improving the contrast ratio. A reflection preventing function by the circularly polarizing VA mode is to prevent the light incident on the liquid crystal display device once from circumference of the liquid crystal display device and reflected in the liquid crystal display device, being a so-called reflected light caused by internal reflection, from being emitted to outside the liquid crystal display device by an action of the circularly polarizing plate. Therefore, according to the circularly polarizing VA mode, the light reflected on the surfaces of a black matrix, wiring, and electrodes, etc., in the liquid crystal cell, is hardly emitted to the outside the liquid crystal display device, thus preventing the reduction of the contrast ratio of the liquid crystal display device particularly in a bright state of the circumference (bright environment).

Meanwhile, the contrast ratio of the liquid crystal display device in the bright environment is reduced, not only by a reflected light caused by the aforementioned internal reflection, but also by a reflected light reflected by the surface of the liquid crystal display device without entering into the liquid crystal display device, being the reflected light caused by a so-called surface reflection. In the circularly polarizing VA mode liquid crystal display device, as a result of suppressing the reflected light caused by internal reflection, an amount of the reflected light caused by surface reflection has a remarkable influence on visibility of the display screen. Accordingly, by taking measures for the circularly polarizing VA mode liquid crystal display device to reduce the reflected light caused by surface reflection, extremely high contrast ratio can be obtained in the bright environment, and therefore an observer of the display screen can realize a remarkable improvement of the display quality.

Figures 37, 38:
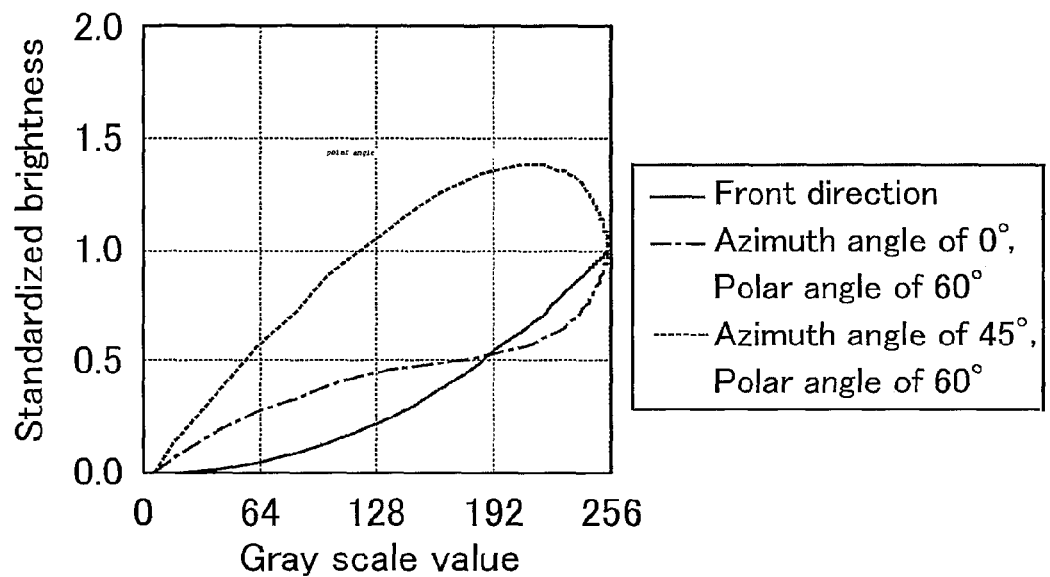
FIG. 37 is a graph showing a gamma curve obtained by measuring the liquid crystal display device of Comparative Example 6.
FIG. 38($a$) is an expanded schematic cross-sectional view of a moss-eye film, and FIG. 38($b$) is an explanatory view showing a variation of refractive indices on an interface between the moss-eye film and an air layer.

As a film for preventing reflection used for suppressing the surface reflection, there is a reflection preventive film formed by stacking a plurality of films having different refractive indices, and a reflection preventive film having micro-protrusions and dents formed on the surface, can be given. Above all, a "moss-eye film", being a kind of the latter reflection preventive film, has a structure that a plurality of protrusions smaller than a wavelength (380 nm to 780 nm) of a visible light are provided on the surface, which is capable of exhibiting an extremely excellent effect for suppressing the surface reflection. As shown in FIG. 38($a$), the light incident on the moss-eye film reaches a film base part 362 through micro-protrusions 361 provided on the surface. Therefore, a region between the air layer and the film base part in which protrusions and an air layer coexist (region between A-B in the figure), can be regarded as the region having an intermediate refractive index between the refractive index of a material forming the film (about 1.5 in a case of a resin film), and the refractive index of the air (1.0). Namely, as shown in FIG. 38($b$), the refractive index of this region becomes continuously gradually larger within a shorter distance than the wavelength of the visible light, up to the refractive index of the material for forming the film, from the refractive index of the air that is brought into contact with the surface of the film. As a result, the light incident on the moss-eye film does not recognize an interface between air and film as an interface with different refractive indices, and therefore the reflection of light generated on the interface can be considerably suppressed. According to the moss-eye film, for example, a surface reflectance of the visible light can be suppressed to about 0.15%.

The moss-eye film is capable of exhibiting an effect of reducing the reflectance, if it is disposed on the interface having different refractive indices. However, in the structure of FIG. 13, the internal reflection generated more inside than the second polarizer 350 can be suppressed by the circularly polarizing plate composed of a combination of the second polarizer 350 and the second λ/4 plate 340. Accordingly, when the moss-eye film is added to the structure of FIG. 13, it is arranged on the more display screen side than the second polarizer 350, like the moss-eye film 360 shown in FIG. 39. When a member such as a protective plate is disposed on the more display screen side than the second polarizer 350, and there are a plurality of interfaces, the moss-eye film may be provided on each interface, and is preferably disposed at least on a face exposed to outside the liquid crystal display device.

A resin film can be given as a specific example of the moss-eye film, wherein a plurality of nearly conical protrusions with a height of about 200 nm is formed on the surface, with inter-tops distance being about 200 nm.

As a method for manufacturing the moss-eye film, there is a so-called nanoimprint technique, wherein a minute unevenness with a nanometer size (1 to 1000 μm) carved into a metal mold is pressed against a resin material with which the substrate is coated, and a shape thereof is transferred thereto. As a method for curing the resin material in the nanoimprint technique, a thermal nanoimprint technique and a UV nanoimprint technique, etc., can be given. In the UV nanoimprint technique, a thin film made of UV curing resin is formed on a transparent substrate, and by pressing the metal mold onto the thin film and thereafter by irradiation of UV-light, a thin film having a moss-eye structure with an inversion shape of the metal mold is formed on the transparent substrate.

In order to manufacture the thin film having the moss-eye structure massively and inexpensively based on the nanoimprint technique, a roll-to-roll process is more preferably used than a batch process. According to the roll-to-roll process, the thin film having the moss-eye structure can be manufactured continuously using a mold roll. For example, such a mold roll is obtained by forming dents of a nanometer size by an anode oxidation method, on an outer peripheral surface of a polished columnar or cylindrical aluminum pipe. According to the anode oxidation method, the dents of the nanometer size can be randomly and approximately uniformly formed on the surface, and a seamless moss-eye structure suitable for continuous production can be formed on the surface of the mold roll.

Each one of the aforementioned embodiments may be combined, within a range not departing from the gist of the present invention.

The present application claims priority to Patent Application No. 2009-178238 filed in Japan on Jul. 30, 2009 under the Paris Convention and provisions of national law in a designated State, the entire contents of which are hereby incorporated by reference.

EXPLANATION OF REFERENCE NUMERALS

100: Circularly polarizing VA mode liquid crystal display device
110: First polarizer
111: Absorption axis of the first polarizer
120: First λ/4 plate
121: Slow axis of the first λ/4 plate
130: VA mode liquid crystal cell 140: Second λ/4 plate
141: Slow axis of the second λ/4 plate
150: Second polarizer
151: Absorption axis of the second polarizer
200: Circularly polarizing VA mode liquid crystal display device
210: First polarizer
220: First λ/4 plate
230: VA mode liquid crystal cell
235: Third-type birefringent layer
240: Second λ/4 plate
250: Second polarizer
300: Circularly polarizing VA mode liquid crystal display device
310: First polarizer
320: First λ/4 plate
330: VA mode liquid crystal cell
335: Third-type birefringent layer
340: Second λ/4 plate
345: Second-type birefringent layer
350: Second polarizer
360: Moss-eye film
400: Circularly polarizing VA mode liquid crystal display device
410: First polarizer
420: First λ/4 plate
430: VA mode liquid crystal cell
440: Second λ/4 plate
445: Second-type birefringent layer
450: Second polarizer
500: Circularly polarizing VA mode liquid crystal display device
510: First polarizer
515: First second-type birefringent layer
520: First λ/4 plate
530: VA mode liquid crystal cell
535: Third-type birefringent layer
540: Second λ/4 plate
545: Second second-type birefringent layer
550: Second polarizer

The invention claimed is:

1. A liquid crystal display device, comprising:
a first polarizer;
a first λ/4 plate with an in-plane phase difference adjusted to λ/4;
liquid crystal cells including a liquid crystal layer between a pair of opposing substrates;
a second λ/4 plate with an in-plane phase difference adjusted to λ/4; and
a second polarizer, in this order, wherein
when an azimuth angle of an absorption axis of the second polarizer is defined as 0°,
an in-plane slow axis of the second λ/4 plate forms an angle of approximately 45°,
an in-plane slow axis of the first λ/4 plate forms an angle of approximately 135°,
the absorption axis of the first polarizer forms an angle of approximately 90°, and wherein
a display brightness is varied by changing an alignment state of liquid crystal molecules in the liquid crystal layer from a state where the liquid crystal molecules are approximately vertically aligned over a substrate surface, to a state where the liquid crystal molecules are tilted over the substrate surface;
the liquid crystal layer includes a domain in which liquid crystal molecules are tilted in an azimuth angle range of 12.5° to 32.5°, a domain in which the liquid crystal molecules are tilted in an azimuth angle range of 102.5° to 122.5°, and a domain in which the liquid crystal molecules are tilted in an azimuth angle range of 192.5° to 212.5°, and a domain in which the liquid crystal molecules are tilted in an azimuth angle range of 282.5° to 302.5°;
the liquid crystal layer does not include a domain in which the liquid crystal molecules are tiled in an azimuth angle range of 45°, a domain in which the liquid crystal molecules are tilted in an azimuth angle range of 135°, a domain in which the liquid crystal molecules are tiled in an azimuth angle range of 225°, and a domain in which the liquid crystal molecules are tilted in an azimuth angle range of 315°; and
wherein a birefringent layer satisfying nx>ny≥nz is defined as a first-type birefringent layer, and a birefringent layer satisfying nx<ny≤nz is defined as a second-type birefringent layer, the first and second λ/4 plates are first-type birefringent layers having approximately the same Nz-coefficients, and
the second-type birefringent layer is provided between the second λ/4 plate and the second polarizer, one surface of the second-type birefringent layer is adjacent to the second λ/4 plate, another surface of the second-type birefringent layer is adjacent the second polarizer, and
an in-plane fast axis of the second-type birefringent layer is approximately orthogonally crossing the absorption axis of the second polarizer.

2. The liquid crystal display device according to claim 1, wherein when a birefringent layer satisfying nx≅ny≥nz is defined as a third-type birefringent layer, at least one third-type birefringent layer is provided at least between the first λ/4 plate and the liquid crystal cells, or between the liquid crystal cells and the second λ/4 plate.

3. The liquid crystal display device according to claim 2, wherein when a Nz-coefficient of the first and second λ/4 plates is defined as Nzq, and a phase difference of the liquid crystal cells in a perpendicular direction at a black display time is defined Rlc, and a sum total of the phase difference in the perpendicular direction of at least one third-type birefringent layer arranged between the first λ/4 plate and the second λ/4 plate is defined R3, the following formulas (1) to (3) are satisfied:

$$1.0 \leq Nzq \leq 2.9 \quad (1)$$

$$(169 \text{ nm} \times Nzq - 81 \text{ nm}) - 30 \text{ nm} \leq Rlc + R3 \quad (2)$$

$$Rlc + R3 \leq (169 \text{ nm} \times Nzq - 81 \text{ nm}) + 30 \text{ nm} \quad (3).$$

4. The liquid crystal display device according to claim 3, wherein when the Nz-coefficient of the second-type birefringent layer is defined as Nz2, and an in-plane phase difference is defined as R2, the following formulas (4) to (7) are satisfied:

$$(-0.63 \times Nzq^2 + 0.56 \times Nzq + 0.40) - 0.35 \leq Nz2 \quad (4)$$

$$Nz2 \leq (-0.63 \times Nzq^2 + 0.56 \times Nzq + 0.40) + 0.35 \quad (5)$$

$$(43 \text{ nm} \times Nzq^2 - 226 \text{ nm} \times Nzq + 370 \text{ nm}) - 30 \text{ nm} \leq R2 \quad (6)$$

$$R2 (43 \text{ nm} \times Nzq^2 - 226 \text{ nm} \times Nzq + 370 \text{ nm}) + 30 \text{ nm} \quad (7).$$

5. The liquid crystal display device according to claim 4, wherein 1.40≤Nzq is satisfied.

6. The liquid crystal display device according to claim 2, wherein when the Nz-coefficient of the first and second λ/4 plates is defined as Nzq, 2.00<Nzq is satisfied.

7. The liquid crystal display device according to claim 2, wherein when the Nz-coefficient of the first and second λ/4 plates is defined as Nzq, the Nz-coefficient of the second-type birefringent layer is defined as Nz2, and the in-plane phase difference of the second-type birefringent layer is defined as R2, Nzq<1.40 is satisfied, −0.35≤Nz2≤0 is satisfied, and 108 nm≤R2≤168 nm is satisfied.

8. The liquid crystal display device according to claim 1, wherein when a birefringent layer satisfying nx ny nz is defined as a third-type birefringent layer, the third-type birefringent layer is not included between the first first-type birefringent layer and the liquid crystal cells, and between the liquid crystal cells and the second first-type birefringent layer.

9. The liquid crystal display device according to claim 8, wherein when the Nz-coefficient of the first and second λ/4 plates is defined as Nzq, and a phase difference of the liquid crystal cells at black display time in a perpendicular direction is defined as Rlc, the following formulas (1), (8), and (9) are satisfied:

$$1.0 \leq Nzq \leq 2.9 \quad (1)$$

$$(169\ nm \times Nzq - 81\ nm) - 30\ nm \leq Rlc \quad (8)$$

$$Rlc \leq (169\ nm \times Nzq - 81\ nm) + 30\ nm \quad (9).$$

10. The liquid crystal display device according to claim 9, wherein when the Nz-coefficient of the second-type birefringent layer is defined as Nz2, and an in-plane phase difference of the second-type birefringent layer is defined as R2, the following formulas (4) to (7) are satisfied:

$$(-0.63 \times Nzq^2 + 0.56 \times Nzq + 0.40) - 0.35 \leq Nz2 \quad (4)$$

$$Nz2 \leq (-0.63 \times Nzq^2 + 0.56 \times Nzq + 0.40) + 0.35 \quad (5)$$

$$(43\ nm \times Nzq^2 - 226\ nm \times Nzq + 370\ nm) - 30\ nm \leq R2 \quad (6)$$

$$R2 \leq (43\ nm \times Nzq^2 - 226\ nm \times Nzq + 370\ nm) + 30\ nm \quad (7).$$

11. The liquid crystal display device according to claim 10, wherein 1.40≤Nzq is satisfied.

12. The liquid crystal display device according to claim 8, wherein when the Nz-coefficient of the first and second λ/4 plates is defined as Nzq, and the Nz-coefficient of the second-type birefringent layer is defined as Nz2, and an in-plane phase difference of the second-type birefringent layer is defined as R2, Nzq<1.40 is satisfied, −0.35≤Nz2≤0 is satisfied, and 108 nm≤R2≤168 nm is satisfied.

13. The liquid crystal display device according to claim 8, wherein when the Nz-coefficient of the first and second λ/4 plates is defined as Nzq, 2.00≤Nzq is satisfied.

14. The liquid crystal display device according to claim 1, wherein when a birefringent layer satisfying nx>ny≥nz is defined as a first-type birefringent layer, and a birefringent layer satisfying nx<ny≤nz is defined as a second-type birefringent layer, the first and second λ/4 plates are first-type birefringent layers having approximately the same Nz-coefficients;
a first second-type birefringent layer is provided between the first λ/4 plate and the first polarizer;
a second second-type birefringent layer is provided between the second λ/4 plate and the second polarizer;
the first second-type birefringent layer and the second second-type birefringent layer have approximately the same Nz-coefficients and in-plane phase differences;
an in-plane fast axis of the first second-type birefringent layer is approximately orthogonally crossing an absorption axis of the first polarizer; and an in-plane fast axis of the second second-type birefringent layer is approximately orthogonally crossing an absorption axis of the second polarizer.

15. The liquid crystal display device according to claim 14, wherein when a birefringent layer satisfying nx≈ny≥nz is defined as a third-type birefringent layer, at least one third-type birefringent layers is provided at least between the first λ/4 plate and the liquid crystal cells, or between the liquid crystal cells and the second λ/4 plate.

16. The liquid crystal display device according to claim 15, wherein when the Nz-coefficient of the first and second λ/4 plates is defined as Nzq, a phase difference of the liquid crystal cells in a perpendicular direction at a black display time is defined as Rlc, and a total sum of the phase difference in the perpendicular direction of at least one third-type birefringent layer arranged between the first λ/4 plate and the second λ/4 plate is defined as R3, the following formulas (1) to (3) are satisfied:

$$1.0 \leq Nzq \leq 2.9 \quad (1)$$

$$(169\ nm \times Nzq - 81\ nm) - 30\ nm \leq Rlc + R3 \quad (2)$$

$$Rlc + R3 \leq (169\ nm \times Nzq - 81\ nm) + 30\ nm \quad (3).$$

17. The liquid crystal display device according to claim 16, wherein when the Nz-coefficient of the first and second second-type birefringent layers is defined as Nz2, and an in-plane phase difference of the first and second second-type birefringent is defined as R2, the following formulas (10) to (13) are satisfied:

$$(-0.87 \times Nzq^2 + 2.15 \times Nzq - 0.76) - 0.45 \leq Nz2 \quad (10)$$

$$Nz2 \leq (-0.87 \times Nzq^2 + 2.15 \times Nzq - 0.76) + 0.45 \quad (11)$$

$$(25\ nm \times Nzq^2 - 159\ nm \times Nzq + 311\ nm) - 40\ nm \leq R2 \quad (12)$$

$$R2 \leq (25\ nm \times Nzq^2 - 159\ nm \times Nzq + 311\ nm) + 40\ nm \quad (13).$$

18. The liquid crystal display device according to claim 15, wherein when the Nz-coefficient of the first and second first-type birefringent layers is defined as Nzq, and the Nz-coefficient of the first and second second-type birefringent layers is defined as Nz2, and an in-plane phase difference of the first and second second-type birefringent layers is defined as R2, Nzq<2.00 is satisfied, −0.45≤Nz2≤0 is satisfied, and 5 nm≤R2≤133 nm is satisfied.

19. The liquid crystal display device according to claim 1, further comprising a reflection preventive film, the reflection preventive film including a plurality of protrusions smaller than a wavelength of a visible light, and wherein the reflection preventive film is arranged on a face exposed to outside the liquid crystal display device.

* * * * *